US012809132B2

(12) United States Patent
Hsieh et al.

(10) Patent No.: US 12,809,132 B2
(45) Date of Patent: Nov. 24, 2026

(54) OPTICAL IMAGING LENS

(71) Applicant: Genius Electronic Optical (Xiamen) Co., Ltd., Xiamen (CN)

(72) Inventors: Hung-Chien Hsieh, Taichung City (TW); Fensha Cai, Xiamen (CN); Xue Li, Xiamen (CN)

(73) Assignee: Genius Electronic Optical (Xiamen) Co., Ltd., Xiamen (CN)

( * ) Notice: Subject to any disclaimer, the term of this patent is extended or adjusted under 35 U.S.C. 154(b) by 226 days.

(21) Appl. No.: 18/903,309

(22) Filed: Oct. 1, 2024

(65) Prior Publication Data

US 2025/0164751 A1 May 22, 2025

Related U.S. Application Data

(63) Continuation of application No. 18/511,087, filed on Nov. 16, 2023, now Pat. No. 12,140,737, which is a continuation of application No. 18/060,664, filed on Dec. 1, 2022, now Pat. No. 11,860,343, which is a continuation of application No. 17/032,659, filed on Sep. 25, 2020, now Pat. No. 11,550,128, which is a continuation of application No. 16/567,208, filed on Sep. 11, 2019, now Pat. No. 10,976,526, which is a continuation of application No. 15/821,917, filed on Nov. 24, 2017, now Pat. No. 10,459,200.

(30) Foreign Application Priority Data

Sep. 29, 2017 (CN) ......................... 201710906238.4

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC ... G02B 13/0045; G02B 9/64; G02B 13/0015
See application file for complete search history.

(56) References Cited

U.S. PATENT DOCUMENTS

2018/0196225 A1* 7/2018 Chang ................ G02B 13/0045

* cited by examiner

*Primary Examiner* — James C. Jones
(74) *Attorney, Agent, or Firm* — Chen Yoshimura LLP

(57) ABSTRACT

Present embodiments provide for optical imaging lenses. An optical imaging lens may include at least seven lens elements positioned sequentially from an object side to an image side. Through arrangement of the convex or concave surfaces of the lens elements, the length of the optical imaging lens may be shortened while providing better optical characteristics and imaging quality.

20 Claims, 58 Drawing Sheets

| Effective focal length (EFL) = 4.045 mm, HFOV (Half field of view) = 38.202deg., TTL = 5.718 mm, Image height= 3.129 mm, Fno = 1.400 | | | | | | | |
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 100 | Aperture stop | INFINITY | -0.488 | | | | |
| 111 | 1st lens element | 2.140 | 0.227 | 1.545 | 55.987 | 31.794 | Plastic |
| 112 | | 2.349 | 0.240 | | | | |
| 121 | 2nd lens element | 2.207 | 0.196 | 1.661 | 20.412 | -24.939 | Plastic |
| 122 | | 1.879 | 0.056 | | | | |
| 131 | 3rd lens element | 2.611 | 0.640 | 1.545 | 55.987 | 4.401 | Plastic |
| 132 | | -27.664 | 0.174 | | | | |
| 141 | 4th lens element | 2.632 | 0.132 | 1.661 | 20.412 | -23.891 | Plastic |
| 142 | | 2.214 | 0.607 | | | | |
| 151 | 5th lens element | 9.393 | 0.366 | 1.545 | 55.987 | -97.670 | Plastic |
| 152 | | 7.877 | 0.219 | | | | |
| 161 | 6th lens element | -11.577 | 0.557 | 1.545 | 55.987 | 7.340 | Plastic |
| 162 | | -3.029 | 0.051 | | | | |
| 181 | 8th lens element | 3.278 | 0.694 | 1.545 | 55.987 | 11.805 | Plastic |
| 182 | | 6.167 | 0.691 | | | | |
| 171 | 7th lens element | -2.841 | 0.263 | 1.545 | 55.987 | -3.480 | Plastic |
| 172 | | 5.933 | 0.200 | | | | |
| 191 | IR cut filter | INFINITY | 0.289 | 1.517 | 64.167 | | |
| 192 | | INFINITY | 0.116 | | | | |
| IM1 | Image plane | INFINITY | 0.00 | | | | |

FIG. 8

| Aspherical parameters | | | | | |
|---|---|---|---|---|---|
| Surface # | K | $a_2$ | $a_4$ | $a_6$ | $a_8$ |
| 111 | 0.000000E+00 | 0.000000E+00 | -7.784112E-03 | -1.314514E-03 | 0.000000E+00 |
| 112 | 0.000000E+00 | 0.000000E+00 | -1.786246E-02 | -1.328148E-03 | 0.000000E+00 |
| 121 | 0.000000E+00 | 0.000000E+00 | -5.742963E-02 | -6.660676E-03 | 0.000000E+00 |
| 122 | 0.000000E+00 | 0.000000E+00 | -5.775505E-02 | -1.242688E-02 | 0.000000E+00 |
| 131 | 0.000000E+00 | 0.000000E+00 | -9.138783E-03 | -8.541494E-05 | -8.092411E-03 |
| 132 | 0.000000E+00 | 0.000000E+00 | -2.072913E-02 | -3.945653E-03 | 3.578303E-03 |
| 141 | 0.000000E+00 | 0.000000E+00 | -7.966186E-02 | 3.260100E-04 | -2.561110E-03 |
| 142 | 0.000000E+00 | 0.000000E+00 | -6.922794E-02 | -2.070766E-03 | 2.578159E-03 |
| 151 | 0.000000E+00 | 0.000000E+00 | -5.699585E-02 | 1.327463E-02 | -4.237955E-03 |
| 152 | 0.000000E+00 | 0.000000E+00 | -4.808300E-02 | -1.260728E-03 | -3.125410E-03 |
| 161 | 0.000000E+00 | 0.000000E+00 | 4.005308E-02 | -1.922741E-02 | -3.603491E-03 |
| 162 | 0.000000E+00 | 0.000000E+00 | 3.191112E-03 | 2.985404E-03 | -2.318995E-03 |
| 181 | 0.000000E+00 | 0.000000E+00 | -4.405927E-02 | 5.291014E-03 | -1.002905E-02 |
| 182 | 0.000000E+00 | 0.000000E+00 | 7.469377E-03 | -1.435749E-02 | 8.584306E-04 |
| 171 | 0.000000E+00 | 0.000000E+00 | -6.293639E-03 | -6.090910E-04 | 2.996833E-03 |
| 172 | 0.000000E+00 | 0.000000E+00 | -2.075016E-02 | -4.591016E-03 | 3.353284E-03 |
| Surface # | $a_{10}$ | $a_{12}$ | $a_{14}$ | $a_{16}$ | |
| 111 | 0.000000E+00 | 0.000000E+00 | 0.000000E+00 | 0.000000E+00 | |
| 112 | 0.000000E+00 | 0.000000E+00 | 0.000000E+00 | 0.000000E+00 | |
| 121 | 0.000000E+00 | 0.000000E+00 | 0.000000E+00 | 0.000000E+00 | |
| 122 | 0.000000E+00 | 0.000000E+00 | 0.000000E+00 | 0.000000E+00 | |
| 131 | 3.641804E-03 | -9.235594E-05 | -3.287409E-04 | 6.129957E-05 | |
| 132 | -1.432050E-03 | 6.133205E-04 | -1.826800E-04 | 1.577543E-05 | |
| 141 | 3.106983E-03 | -4.419227E-04 | 2.088206E-05 | -1.700680E-05 | |
| 142 | 6.343023E-04 | -1.365133E-04 | 4.568240E-05 | -1.028227E-05 | |
| 151 | 8.904238E-04 | -1.528314E-05 | -9.197995E-06 | 5.413726E-06 | |
| 152 | 3.347901E-03 | -8.228738E-04 | 7.325973E-05 | -4.219548E-06 | |
| 161 | 5.789915E-03 | -1.984153E-03 | 2.924608E-04 | -1.540003E-05 | |
| 162 | 5.393807E-04 | -5.445378E-05 | -1.322866E-05 | 4.571625E-06 | |
| 181 | 4.173732E-03 | -1.043126E-03 | 9.460569E-05 | 3.816778E-07 | |
| 182 | 2.834634E-04 | -2.273281E-05 | -5.491150E-07 | -1.381770E-08 | |
| 171 | -5.397211E-04 | 2.950473E-05 | 3.286118E-07 | -2.893872E-08 | |
| 172 | -6.656272E-04 | 5.753683E-05 | -1.778372E-06 | -1.108790E-08 | |

FIG. 9

| Effective focal length (EFL) = 4.331 mm, HFOV (Half field of view) = 38.209deg., TTL = 5.260 mm, Image height= 2.43 mm, Fno = 1.400 | | | | | | | |
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 200 | Aperture stop | INFINITY | -0.376 | | | | |
| 211 | 1st lens element | 2.788 | 0.288 | 1.545 | 55.987 | -52.905 | Plastic |
| 212 | | 2.450 | 0.118 | | | | |
| 221 | 2nd lens element | 2.086 | 0.239 | 1.661 | 20.412 | -1661.331 | Plastic |
| 222 | | 1.987 | 0.045 | | | | |
| 231 | 3rd lens element | 2.924 | 0.633 | 1.545 | 55.987 | 5.159 | Plastic |
| 232 | | -72.195 | 0.044 | | | | |
| 241 | 4th lens element | 2.803 | 0.193 | 1.661 | 20.412 | -20.879 | Plastic |
| 242 | | 2.269 | 0.354 | | | | |
| 251 | 5th lens element | 41.538 | 0.395 | 1.545 | 55.987 | -415.768 | Plastic |
| 252 | | 34.998 | 0.176 | | | | |
| 261 | 6th lens element | -18.013 | 0.500 | 1.545 | 55.987 | 5.278 | Plastic |
| 262 | | -2.510 | 0.148 | | | | |
| 281 | 8th lens element | 2.546 | 0.494 | 1.545 | 55.987 | 18.392 | Plastic |
| 282 | | 3.176 | 0.382 | | | | |
| 271 | 7th lens element | -15.390 | 0.322 | 1.545 | 55.987 | -5.369 | Plastic |
| 272 | | 3.650 | 0.240 | | | | |
| 291 | IR cut filter | INFINITY | 0.289 | 1.517 | 64.167 | | |
| 292 | | INFINITY | 0.400 | | | | |
| IM2 | Image plane | INFINITY | 0.000 | | | | |

FIG. 12

| Aspherical parameters | | | | | |
|---|---|---|---|---|---|
| Surface # | K | $a_2$ | $a_4$ | $a_6$ | $a_8$ |
| 211 | 0.000000E+00 | 0.000000E+00 | -5.521115E-03 | -2.439745E-03 | 0.000000E+00 |
| 212 | 0.000000E+00 | 0.000000E+00 | -2.749741E-02 | -4.890977E-03 | 0.000000E+00 |
| 221 | 0.000000E+00 | 0.000000E+00 | -4.657341E-02 | -1.119754E-02 | 0.000000E+00 |
| 222 | 0.000000E+00 | 0.000000E+00 | -5.452832E-02 | -1.258390E-02 | 0.000000E+00 |
| 231 | 0.000000E+00 | 0.000000E+00 | -9.176334E-03 | 2.036761E-03 | -9.377995E-03 |
| 232 | 0.000000E+00 | 0.000000E+00 | -1.666658E-02 | -3.706147E-03 | 3.196307E-03 |
| 241 | 0.000000E+00 | 0.000000E+00 | -7.181632E-02 | -3.682493E-03 | -4.394534E-03 |
| 242 | 0.000000E+00 | 0.000000E+00 | -6.871413E-02 | -6.760992E-03 | 1.267254E-03 |
| 251 | 0.000000E+00 | 0.000000E+00 | -5.784479E-02 | 1.923072E-02 | -4.118363E-03 |
| 252 | 0.000000E+00 | 0.000000E+00 | -2.955894E-02 | -4.306362E-03 | -3.006090E-03 |
| 261 | 0.000000E+00 | 0.000000E+00 | 5.978480E-02 | -2.058610E-02 | -4.382563E-03 |
| 262 | 0.000000E+00 | 0.000000E+00 | 2.173030E-02 | 8.626283E-03 | -1.859648E-03 |
| 281 | 0.000000E+00 | 0.000000E+00 | -4.620605E-02 | 1.011444E-02 | -1.072608E-02 |
| 282 | 0.000000E+00 | 0.000000E+00 | -1.045060E-02 | -1.251970E-02 | 8.526026E-04 |
| 271 | 0.000000E+00 | 0.000000E+00 | -7.794842E-03 | -5.996641E-03 | 3.293074E-03 |
| 272 | 0.000000E+00 | 0.000000E+00 | -3.807399E-02 | -2.543008E-03 | 3.339523E-03 |
| Surface # | $a_{10}$ | $a_{12}$ | $a_{14}$ | $a_{16}$ | |
| 211 | 0.000000E+00 | 0.000000E+00 | 0.000000E+00 | 0.000000E+00 | |
| 212 | 0.000000E+00 | 0.000000E+00 | 0.000000E+00 | 0.000000E+00 | |
| 221 | 0.000000E+00 | 0.000000E+00 | 0.000000E+00 | 0.000000E+00 | |
| 222 | 0.000000E+00 | 0.000000E+00 | 0.000000E+00 | 0.000000E+00 | |
| 231 | 3.405921E-03 | -1.175281E-04 | -3.279575E-04 | 6.674831E-05 | |
| 232 | -1.748071E-03 | 5.771992E-04 | -1.521135E-04 | 1.945703E-05 | |
| 241 | 2.897961E-03 | -4.348506E-04 | 3.155814E-05 | -2.305710E-06 | |
| 242 | 3.080093E-04 | -1.742132E-04 | 5.431422E-05 | -6.856718E-06 | |
| 251 | 8.774296E-04 | -3.232204E-05 | -1.706537E-05 | 1.605699E-06 | |
| 252 | 3.337772E-03 | -8.242419E-04 | 6.975307E-05 | -5.245311E-07 | |
| 261 | 5.717740E-03 | -1.994559E-03 | 2.895515E-04 | -1.527638E-05 | |
| 262 | 5.344755E-04 | -5.643993E-05 | -1.270720E-05 | 3.923922E-06 | |
| 281 | 4.239744E-03 | -9.293643E-04 | 1.113373E-04 | -5.401213E-06 | |
| 282 | 2.232294E-04 | -2.843921E-05 | -4.907740E-07 | 5.233808E-08 | |
| 271 | -5.022864E-04 | 2.822041E-05 | -2.034947E-07 | -5.435518E-08 | |
| 272 | -6.874377E-04 | 5.784513E-05 | -1.904595E-06 | -3.024906E-08 | |

FIG. 13

| Effective focal length（EFL）= 3.373 mm，HFOV（Half field of view）= 38.762deg.，TTL = 6.874 mm，Image height= 3.551 mm，Fno = 1.400 | | | | | | | |
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 300 | Aperture stop | INFINITY | -0.173 | | | | |
| 311 | 1st lens element | 3.473 | 0.348 | 1.545 | 55.987 | -39.212 | Plastic |
| 312 | | 2.882 | 0.188 | | | | |
| 321 | 2nd lens element | 2.106 | 0.373 | 1.661 | 20.412 | -435.741 | Plastic |
| 322 | | 1.943 | 0.166 | | | | |
| 331 | 3rd lens element | 3.246 | 0.611 | 1.545 | 55.987 | 5.382 | Plastic |
| 332 | | -29.102 | 0.155 | | | | |
| 341 | 4th lens element | 2.889 | 0.320 | 1.661 | 20.412 | -41.166 | Plastic |
| 342 | | 2.498 | 0.622 | | | | |
| 351 | 5th lens element | 10.914 | 0.465 | 1.545 | 55.987 | 26.156 | Plastic |
| 352 | | 45.513 | 0.357 | | | | |
| 361 | 6th lens element | -50.199 | 0.991 | 1.545 | 55.987 | 4.383 | Plastic |
| 362 | | -2.301 | 0.025 | | | | |
| 381 | 8th lens element | 2.489 | 0.373 | 1.545 | 55.987 | 15.659 | Plastic |
| 382 | | 3.324 | 0.306 | | | | |
| 371 | 7th lens element | -16.320 | 0.813 | 1.545 | 55.987 | -23.996 | Plastic |
| 372 | | 67.789 | 0.197 | | | | |
| 391 | IR cut filter | INFINITY | 0.289 | 1.517 | 64.167 | | |
| 392 | | INFINITY | 0.275 | | | | |
| IM3 | Image plane | INFINITY | 0.000 | | | | |

FIG. 16

Aspherical parameters

| Surface # | K | $a_2$ | $a_4$ | $a_6$ | $a_8$ |
|---|---|---|---|---|---|
| 311 | 0.000000E+00 | 0.000000E+00 | -5.643058E-03 | -1.274316E-03 | 0.000000E+00 |
| 312 | 0.000000E+00 | 0.000000E+00 | -2.112055E-02 | -5.859439E-03 | 0.000000E+00 |
| 321 | 0.000000E+00 | 0.000000E+00 | -4.922224E-02 | -9.732359E-03 | 0.000000E+00 |
| 322 | 0.000000E+00 | 0.000000E+00 | -5.580089E-02 | -1.253808E-02 | 0.000000E+00 |
| 331 | 0.000000E+00 | 0.000000E+00 | -8.790283E-03 | 2.217989E-03 | -9.658636E-03 |
| 332 | 0.000000E+00 | 0.000000E+00 | -1.277375E-02 | -4.105262E-03 | 3.342957E-03 |
| 341 | 0.000000E+00 | 0.000000E+00 | -7.582818E-02 | -3.983776E-03 | -4.458898E-03 |
| 342 | 0.000000E+00 | 0.000000E+00 | -6.748376E-02 | -6.279201E-03 | 1.394266E-03 |
| 351 | 0.000000E+00 | 0.000000E+00 | -6.695863E-02 | 1.899068E-02 | -4.109506E-03 |
| 352 | 0.000000E+00 | 0.000000E+00 | -2.690090E-02 | -4.882314E-03 | -3.010888E-03 |
| 361 | 0.000000E+00 | 0.000000E+00 | 4.910699E-02 | -2.029180E-02 | -4.370935E-03 |
| 362 | 0.000000E+00 | 0.000000E+00 | 5.981224E-03 | 5.936555E-03 | -2.031612E-03 |
| 381 | 0.000000E+00 | 0.000000E+00 | -9.079856E-02 | 1.283461E-02 | -1.060125E-02 |
| 382 | 0.000000E+00 | 0.000000E+00 | -2.787389E-02 | -1.410784E-02 | 9.607894E-04 |
| 371 | 0.000000E+00 | 0.000000E+00 | -2.227087E-02 | -3.802034E-03 | 3.216788E-03 |
| 372 | 0.000000E+00 | 0.000000E+00 | -1.220353E-02 | -3.377915E-03 | 3.297104E-03 |

| Surface # | $a_{10}$ | $a_{12}$ | $a_{14}$ | $a_{16}$ | |
|---|---|---|---|---|---|
| 311 | 0.000000E+00 | 0.000000E+00 | 0.000000E+00 | 0.000000E+00 | |
| 312 | 0.000000E+00 | 0.000000E+00 | 0.000000E+00 | 0.000000E+00 | |
| 321 | 0.000000E+00 | 0.000000E+00 | 0.000000E+00 | 0.000000E+00 | |
| 322 | 0.000000E+00 | 0.000000E+00 | 0.000000E+00 | 0.000000E+00 | |
| 331 | 3.348126E-03 | -1.009277E-04 | -3.161622E-04 | 6.573113E-05 | |
| 332 | -1.657017E-03 | 5.903443E-04 | -1.521028E-04 | 2.159979E-05 | |
| 341 | 2.918587E-03 | -4.169329E-04 | 3.544218E-05 | -4.059892E-06 | |
| 342 | 3.084020E-04 | -1.812423E-04 | 5.274976E-05 | -6.725918E-06 | |
| 351 | 8.946026E-04 | -2.840238E-05 | -1.620302E-05 | 1.495459E-06 | |
| 352 | 3.349606E-03 | -8.229363E-04 | 6.995102E-05 | -3.904521E-07 | |
| 361 | 5.726072E-03 | -1.976768E-03 | 2.912551E-04 | -1.513729E-05 | |
| 362 | 5.303682E-04 | -5.630395E-05 | -1.329119E-05 | 3.663049E-06 | |
| 381 | 4.207048E-03 | -9.363458E-04 | 1.115562E-04 | -5.284475E-06 | |
| 382 | 2.497028E-04 | -2.497857E-05 | -4.456120E-07 | 1.302375E-07 | |
| 371 | -5.087904E-04 | 2.903609E-05 | 1.042160E-07 | -6.572331E-08 | |
| 372 | -6.878852E-04 | 5.797252E-05 | -1.811945E-06 | 3.583688E-09 | |

FIG. 17

| Effective focal length（EFL）= 4.455 mm，HFOV（Half field of view）= 38.214deg.，TTL = 5.764 mm，Image height= 4.607 mm，Fno = 1.400 | | | | | | | |
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 400 | Aperture stop | INFINITY | -0.601 | | | | |
| 411 | 1st lens element | 2.243 | 0.632 | 1.545 | 55.987 | 17.203 | Plastic |
| 412 | | 2.653 | 0.107 | | | | |
| 421 | 2nd lens element | 2.177 | 0.240 | 1.661 | 20.412 | -30.436 | Plastic |
| 422 | | 1.880 | 0.042 | | | | |
| 431 | 3rd lens element | 2.585 | 0.650 | 1.545 | 55.987 | 5.406 | Plastic |
| 432 | | 18.864 | 0.094 | | | | |
| 441 | 4th lens element | 2.591 | 0.146 | 1.661 | 20.412 | -79.190 | Plastic |
| 442 | | 2.415 | 0.432 | | | | |
| 451 | 5th lens element | 16.182 | 0.382 | 1.545 | 55.987 | -40.081 | Plastic |
| 452 | | 9.227 | 0.243 | | | | |
| 461 | 6th lens element | 13.228 | 0.470 | 1.545 | 55.987 | 6.405 | Plastic |
| 462 | | -4.698 | 0.512 | | | | |
| 481 | 8th lens element | 4.750 | 0.328 | 1.545 | 55.987 | 76.140 | Plastic |
| 482 | | 5.231 | 0.584 | | | | |
| 471 | 7th lens element | -3.237 | 0.200 | 1.545 | 55.987 | -3.694 | Plastic |
| 472 | | 5.477 | 0.357 | | | | |
| 491 | IR cut filter | INFINITY | 0.289 | 1.517 | 64.167 | | |
| 492 | | INFINITY | 0.057 | | | | |
| IM4 | Image plane | INFINITY | 0.000 | | | | |

FIG. 20

| Aspherical parameters | | | | | |
|---|---|---|---|---|---|
| Surface # | K | $a_2$ | $a_4$ | $a_6$ | $a_8$ |
| 411 | 0.000000E+00 | 0.000000E+00 | -2.582045E-03 | -1.064016E-03 | 0.000000E+00 |
| 412 | 0.000000E+00 | 0.000000E+00 | -1.625368E-02 | -7.000955E-03 | 0.000000E+00 |
| 421 | 0.000000E+00 | 0.000000E+00 | -5.746304E-02 | -5.824073E-03 | 0.000000E+00 |
| 422 | 0.000000E+00 | 0.000000E+00 | -5.854194E-02 | -1.128705E-02 | 0.000000E+00 |
| 431 | 0.000000E+00 | 0.000000E+00 | -1.268109E-02 | -1.410712E-03 | -9.053533E-03 |
| 432 | 0.000000E+00 | 0.000000E+00 | -1.507400E-02 | -3.173796E-03 | 3.301566E-03 |
| 441 | 0.000000E+00 | 0.000000E+00 | -7.362186E-02 | -5.632607E-04 | -3.853312E-03 |
| 442 | 0.000000E+00 | 0.000000E+00 | -5.936790E-02 | -3.615236E-03 | 2.450087E-03 |
| 451 | 0.000000E+00 | 0.000000E+00 | -5.681146E-02 | 1.892735E-02 | -4.024100E-03 |
| 452 | 0.000000E+00 | 0.000000E+00 | -5.454154E-02 | -3.541223E-03 | -2.349238E-03 |
| 461 | 0.000000E+00 | 0.000000E+00 | 1.551363E-02 | -1.992721E-02 | -6.253052E-03 |
| 462 | 0.000000E+00 | 0.000000E+00 | 1.762232E-02 | -1.332079E-03 | -3.626644E-03 |
| 481 | 0.000000E+00 | 0.000000E+00 | -7.785393E-02 | 1.041149E-02 | -1.166250E-02 |
| 482 | 0.000000E+00 | 0.000000E+00 | -2.147671E-02 | -1.275301E-02 | 1.066586E-03 |
| 471 | 0.000000E+00 | 0.000000E+00 | -4.604021E-03 | -5.109458E-03 | 3.060189E-03 |
| 472 | 0.000000E+00 | 0.000000E+00 | -4.144233E-02 | -1.958567E-03 | 3.310489E-03 |
| Surface # | $a_{10}$ | $a_{12}$ | $a_{14}$ | $a_{16}$ | |
| 411 | 0.000000E+00 | 0.000000E+00 | 0.000000E+00 | 0.000000E+00 | |
| 412 | 0.000000E+00 | 0.000000E+00 | 0.000000E+00 | 0.000000E+00 | |
| 421 | 0.000000E+00 | 0.000000E+00 | 0.000000E+00 | 0.000000E+00 | |
| 422 | 0.000000E+00 | 0.000000E+00 | 0.000000E+00 | 0.000000E+00 | |
| 431 | 3.684010E-03 | -6.354158E-05 | -3.242812E-04 | 6.002615E-05 | |
| 432 | -1.749236E-03 | 5.485463E-04 | -1.626874E-04 | 1.794637E-05 | |
| 441 | 2.864865E-03 | -4.631363E-04 | 2.309634E-05 | -4.455352E-06 | |
| 442 | 6.530460E-04 | -9.503368E-05 | 7.224979E-05 | 2.173608E-07 | |
| 451 | 9.601608E-04 | -9.190813E-07 | -6.047547E-06 | 3.994152E-06 | |
| 452 | 3.301371E-03 | -8.824556E-04 | 5.599180E-05 | -7.609750E-06 | |
| 461 | 5.285795E-03 | -2.024380E-03 | 2.830465E-04 | -2.739867E-05 | |
| 462 | 3.036519E-04 | -6.376867E-05 | 6.212298E-08 | 1.081623E-05 | |
| 481 | 3.878442E-03 | -7.361031E-04 | 1.463437E-04 | -2.644853E-05 | |
| 482 | 2.885674E-04 | -2.522278E-05 | -1.788209E-07 | -9.395337E-08 | |
| 471 | -5.056027E-04 | 3.245262E-05 | 4.891906E-07 | -1.164281E-07 | |
| 472 | -6.864232E-04 | 5.787725E-05 | -1.809729E-06 | 2.980897E-09 | |

FIG. 21

| Effective focal length（EFL）= 4.111 mm，HFOV（Half field of view）= 38.209deg.，TTL = 6.776 mm，Image height= 3.042 mm，Fno = 1.400 | | | | | | | |
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 500 | Aperture stop | INFINITY | -0.310 | | | | |
| 511 | 1st lens element | 2.930 | 0.365 | 1.545 | 55.987 | -42.642 | Plastic |
| 512 | | 2.488 | 0.140 | | | | |
| 521 | 2nd lens element | 2.065 | 0.204 | 1.661 | 20.412 | -138.083 | Plastic |
| 522 | | 1.939 | 0.100 | | | | |
| 531 | 3rd lens element | 3.025 | 0.951 | 1.545 | 55.987 | 4.730 | Plastic |
| 532 | | -15.735 | 0.102 | | | | |
| 541 | 4th lens element | 2.817 | 0.306 | 1.661 | 20.412 | -20.896 | Plastic |
| 542 | | 2.242 | 0.455 | | | | |
| 551 | 5th lens element | 17.718 | 0.519 | 1.545 | 55.987 | -48.837 | Plastic |
| 552 | | 10.537 | 0.131 | | | | |
| 561 | 6th lens element | -11.761 | 0.811 | 1.545 | 55.987 | 5.203 | Plastic |
| 562 | | -2.346 | 0.000 | | | | |
| 581 | 8th lens element | 2.474 | 0.659 | 1.545 | 55.987 | 16.468 | Plastic |
| 582 | | 3.086 | 0.647 | | | | |
| 571 | 7th lens element | -7.337 | 0.718 | 1.545 | 55.987 | -4.161 | Plastic |
| 572 | | 3.407 | 0.350 | | | | |
| 591 | IR cut filter | INFINITY | 0.289 | 1.517 | 64.167 | | |
| 592 | | INFINITY | 0.031 | | | | |
| IM5 | Image plane | INFINITY | 0.000 | | | | |

FIG. 24

| Aspherical parameters | | | | | |
|---|---|---|---|---|---|
| Surface # | K | $a_2$ | $a_4$ | $a_6$ | $a_8$ |
| 511 | 0.000000E+00 | 0.000000E+00 | -9.613216E-03 | -1.270253E-03 | 0.000000E+00 |
| 512 | 0.000000E+00 | 0.000000E+00 | -2.357620E-02 | -5.765444E-03 | 0.000000E+00 |
| 521 | 0.000000E+00 | 0.000000E+00 | -4.988660E-02 | -1.024886E-02 | 0.000000E+00 |
| 522 | 0.000000E+00 | 0.000000E+00 | -5.227720E-02 | -1.208132E-02 | 0.000000E+00 |
| 531 | 0.000000E+00 | 0.000000E+00 | -8.572351E-03 | 2.382325E-03 | -9.277676E-03 |
| 532 | 0.000000E+00 | 0.000000E+00 | -1.899009E-02 | -4.289996E-03 | 3.154914E-03 |
| 541 | 0.000000E+00 | 0.000000E+00 | -7.427262E-02 | -3.908573E-03 | -4.438723E-03 |
| 542 | 0.000000E+00 | 0.000000E+00 | -6.447187E-02 | -6.321628E-03 | 1.344682E-03 |
| 551 | 0.000000E+00 | 0.000000E+00 | -6.031324E-02 | 1.902758E-02 | -4.142722E-03 |
| 552 | 0.000000E+00 | 0.000000E+00 | -2.895990E-02 | -4.403229E-03 | -3.013075E-03 |
| 561 | 0.000000E+00 | 0.000000E+00 | 6.033557E-02 | -1.972813E-02 | -4.194887E-03 |
| 562 | 0.000000E+00 | 0.000000E+00 | 1.903770E-02 | 7.022518E-03 | -2.159623E-03 |
| 581 | 0.000000E+00 | 0.000000E+00 | -4.212133E-02 | 1.037933E-02 | -1.080002E-02 |
| 582 | 0.000000E+00 | 0.000000E+00 | -1.074247E-02 | -1.184845E-02 | 9.219377E-04 |
| 571 | 0.000000E+00 | 0.000000E+00 | -1.851903E-02 | -5.598049E-03 | 3.346674E-03 |
| 572 | 0.000000E+00 | 0.000000E+00 | -3.530360E-02 | -3.423565E-03 | 3.344331E-03 |
| Surface # | $a_{10}$ | $a_{12}$ | $a_{14}$ | $a_{16}$ | |
| 511 | 0.000000E+00 | 0.000000E+00 | 0.000000E+00 | 0.000000E+00 | |
| 512 | 0.000000E+00 | 0.000000E+00 | 0.000000E+00 | 0.000000E+00 | |
| 521 | 0.000000E+00 | 0.000000E+00 | 0.000000E+00 | 0.000000E+00 | |
| 522 | 0.000000E+00 | 0.000000E+00 | 0.000000E+00 | 0.000000E+00 | |
| 531 | 3.429883E-03 | -1.181857E-04 | -3.276528E-04 | 6.654929E-05 | |
| 532 | -1.748473E-03 | 5.768581E-04 | -1.520152E-04 | 1.935672E-05 | |
| 541 | 2.892971E-03 | -4.344839E-04 | 3.151020E-05 | -2.384988E-06 | |
| 542 | 3.199845E-04 | -1.745505E-04 | 5.418125E-05 | -6.921492E-06 | |
| 551 | 8.786256E-04 | -3.257345E-05 | -1.674567E-05 | 1.648941E-06 | |
| 552 | 3.336262E-03 | -8.248242E-04 | 6.908910E-05 | -6.926383E-07 | |
| 561 | 5.759554E-03 | -1.986207E-03 | 2.910272E-04 | -1.531042E-05 | |
| 562 | 4.829028E-04 | -6.406021E-05 | -1.379195E-05 | 3.779738E-06 | |
| 581 | 4.213876E-03 | -9.346240E-04 | 1.103624E-04 | -5.515580E-06 | |
| 582 | 2.268949E-04 | -2.840486E-05 | -4.643509E-07 | 6.616579E-08 | |
| 571 | -4.892735E-04 | 2.921298E-05 | -1.741053E-07 | -8.575990E-08 | |
| 572 | -6.788523E-04 | 5.869700E-05 | -1.805653E-06 | -1.340603E-08 | |

FIG. 25

| Effective focal length（EFL）= 3.866 mm，HFOV（Half field of view）= 38.212deg.，TTL = 6.113 mm，Image height= 2.938 mm，Fno = 1.400 | | | | | | | |
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 600 | Aperture stop | INFINITY | -0.322 | | | | |
| 611 | 1st lens element | 2.594 | 0.194 | 1.545 | 55.987 | 221.356 | Plastic |
| 612 | | 2.580 | 0.205 | | | | |
| 621 | 2nd lens element | 2.353 | 0.259 | 1.661 | 20.412 | -78.930 | Plastic |
| 622 | | 2.153 | 0.049 | | | | |
| 631 | 3rd lens element | 3.304 | 1.050 | 1.545 | 55.987 | 3.965 | Plastic |
| 632 | | -5.585 | 0.001 | | | | |
| 641 | 4th lens element | 3.249 | 0.275 | 1.661 | 20.412 | -11.386 | Plastic |
| 642 | | 2.199 | 0.368 | | | | |
| 651 | 5th lens element | 11.902 | 0.459 | 1.545 | 55.987 | -75.276 | Plastic |
| 652 | | 9.105 | 0.150 | | | | |
| 661 | 6th lens element | -15.282 | 0.907 | 1.545 | 55.987 | 5.298 | Plastic |
| 662 | | -2.484 | 0.017 | | | | |
| 681 | 8th lens element | 2.852 | 0.626 | 1.545 | 55.987 | 26.447 | Plastic |
| 682 | | 3.279 | 0.842 | | | | |
| 671 | 7th lens element | -3.447 | 0.181 | 1.545 | 55.987 | -3.724 | Plastic |
| 672 | | 5.054 | 0.210 | | | | |
| 691 | IR cut filter | INFINITY | 0.289 | 1.517 | 64.167 | | |
| 692 | | INFINITY | 0.033 | | | | |
| IM6 | Image plane | INFINITY | 0.000 | | | | |

FIG. 28

Aspherical parameters

| Surface # | K | $a_2$ | $a_4$ | $a_6$ | $a_8$ |
|---|---|---|---|---|---|
| 611 | 0.000000E+00 | 0.000000E+00 | -8.725436E-03 | -2.446856E-03 | 0.000000E+00 |
| 612 | 0.000000E+00 | 0.000000E+00 | -2.361482E-02 | -5.330409E-03 | 0.000000E+00 |
| 621 | 0.000000E+00 | 0.000000E+00 | -5.148780E-02 | -1.025890E-02 | 0.000000E+00 |
| 622 | 0.000000E+00 | 0.000000E+00 | -5.511180E-02 | -1.217699E-02 | 0.000000E+00 |
| 631 | 0.000000E+00 | 0.000000E+00 | -1.439054E-02 | 3.908188E-04 | -8.166803E-03 |
| 632 | 0.000000E+00 | 0.000000E+00 | -2.161803E-02 | -1.475733E-03 | 3.192324E-03 |
| 641 | 0.000000E+00 | 0.000000E+00 | -7.106613E-02 | -3.360844E-03 | -3.424111E-03 |
| 642 | 0.000000E+00 | 0.000000E+00 | -6.423820E-02 | -4.550207E-03 | 1.584810E-03 |
| 651 | 0.000000E+00 | 0.000000E+00 | -5.887285E-02 | 1.881638E-02 | -4.017852E-03 |
| 652 | 0.000000E+00 | 0.000000E+00 | -3.036181E-02 | -4.851328E-03 | -3.027454E-03 |
| 661 | 0.000000E+00 | 0.000000E+00 | 5.502739E-02 | -1.884229E-02 | -4.225617E-03 |
| 662 | 0.000000E+00 | 0.000000E+00 | 1.476534E-02 | 6.720669E-03 | -2.183564E-03 |
| 681 | 0.000000E+00 | 0.000000E+00 | -4.500493E-02 | 6.276349E-03 | -9.506279E-03 |
| 682 | 0.000000E+00 | 0.000000E+00 | -1.949270E-02 | -9.477269E-03 | 8.269376E-04 |
| 671 | 0.000000E+00 | 0.000000E+00 | -1.543937E-02 | -2.466510E-03 | 3.185437E-03 |
| 672 | 0.000000E+00 | 0.000000E+00 | -2.468783E-02 | -3.452066E-03 | 3.281181E-03 |

| Surface # | $a_{10}$ | $a_{12}$ | $a_{14}$ | $a_{16}$ | |
|---|---|---|---|---|---|
| 611 | 0.000000E+00 | 0.000000E+00 | 0.000000E+00 | 0.000000E+00 | |
| 612 | 0.000000E+00 | 0.000000E+00 | 0.000000E+00 | 0.000000E+00 | |
| 621 | 0.000000E+00 | 0.000000E+00 | 0.000000E+00 | 0.000000E+00 | |
| 622 | 0.000000E+00 | 0.000000E+00 | 0.000000E+00 | 0.000000E+00 | |
| 631 | 3.444732E-03 | -2.080951E-04 | -3.528198E-04 | 6.975888E-05 | |
| 632 | -1.726300E-03 | 5.626722E-04 | -1.620923E-04 | 1.926489E-05 | |
| 641 | 2.974370E-03 | -4.548835E-04 | 2.439966E-05 | -4.915386E-06 | |
| 642 | 3.649521E-04 | -1.744336E-04 | 5.251841E-05 | -7.116988E-06 | |
| 651 | 9.014363E-04 | -2.396348E-05 | -1.587750E-05 | 1.473430E-06 | |
| 652 | 3.355215E-03 | -8.280774E-04 | 6.684501E-05 | -9.180134E-07 | |
| 661 | 5.700728E-03 | -1.995839E-03 | 2.907977E-04 | -1.525979E-05 | |
| 662 | 4.689554E-04 | -7.088320E-05 | -1.525356E-05 | 3.691683E-06 | |
| 681 | 4.155540E-03 | -9.893079E-04 | 1.040365E-04 | -3.473885E-06 | |
| 682 | 2.249642E-04 | -2.755581E-05 | -3.277498E-07 | 8.574899E-08 | |
| 671 | -5.161874E-04 | 2.889841E-05 | -1.135834E-07 | -3.599355E-08 | |
| 672 | -6.920759E-04 | 5.943083E-05 | -1.242987E-06 | -6.404072E-08 | |

FIG. 29

| Effective focal length（EFL）= 4.073 mm，HFOV（Half field of view）= 38.221deg.，TTL = 6.598 mm，Image height= 3.045 mm，Fno = 1.400 | | | | | | | |
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 700 | Aperture stop | INFINITY | -0.365 | | | | |
| 711 | 1st lens element | 2.513 | 0.301 | 1.545 | 55.987 | -218.416 | Plastic |
| 712 | | 2.357 | 0.307 | | | | |
| 721 | 2nd lens element | 2.358 | 0.324 | 1.661 | 20.412 | -26.393 | Plastic |
| 722 | | 1.965 | 0.052 | | | | |
| 731 | 3rd lens element | 2.701 | 0.839 | 1.545 | 55.987 | 4.314 | Plastic |
| 732 | | -16.445 | 0.300 | | | | |
| 741 | 4th lens element | 3.137 | 0.160 | 1.661 | 20.412 | -19.280 | Plastic |
| 742 | | 2.470 | 0.182 | | | | |
| 751 | 5th lens element | 8.625 | 0.625 | 1.545 | 55.987 | -330.059 | Plastic |
| 752 | | 8.020 | 0.193 | | | | |
| 761 | 6th lens element | -14.414 | 0.891 | 1.545 | 55.987 | 5.139 | Plastic |
| 762 | | -2.401 | 0.010 | | | | |
| 781 | 8th lens element | 2.420 | 0.449 | 1.545 | 55.987 | 12.844 | Plastic |
| 782 | | 3.451 | 0.743 | | | | |
| 771 | 7th lens element | -5.831 | 0.450 | 1.545 | 55.987 | -3.689 | Plastic |
| 772 | | 3.163 | 0.457 | | | | |
| 791 | IR cut filter | INFINITY | 0.289 | 1.517 | 64.167 | | |
| 792 | | INFINITY | 0.026 | | | | |
| IM7 | Image plane | INFINITY | 0.000 | | | | |

FIG. 32

| Aspherical parameters | | | | | |
|---|---|---|---|---|---|
| Surface # | K | $a_2$ | $a_4$ | $a_6$ | $a_8$ |
| 711 | 0.000000E+00 | 0.000000E+00 | -1.129850E-02 | -2.244285E-03 | 0.000000E+00 |
| 712 | 0.000000E+00 | 0.000000E+00 | -2.814196E-02 | -4.913188E-03 | 0.000000E+00 |
| 721 | 0.000000E+00 | 0.000000E+00 | -5.039604E-02 | -7.341984E-03 | 0.000000E+00 |
| 722 | 0.000000E+00 | 0.000000E+00 | -5.649740E-02 | -1.174735E-02 | 0.000000E+00 |
| 731 | 0.000000E+00 | 0.000000E+00 | -2.058863E-02 | 1.418845E-03 | -9.057235E-03 |
| 732 | 0.000000E+00 | 0.000000E+00 | -2.684028E-02 | -2.233801E-03 | 3.558698E-03 |
| 741 | 0.000000E+00 | 0.000000E+00 | -7.647989E-02 | -5.868949E-03 | -4.123987E-03 |
| 742 | 0.000000E+00 | 0.000000E+00 | -6.663911E-02 | -5.205376E-03 | 1.410899E-03 |
| 751 | 0.000000E+00 | 0.000000E+00 | -6.093862E-02 | 1.908059E-02 | -4.137123E-03 |
| 752 | 0.000000E+00 | 0.000000E+00 | -2.860858E-02 | -5.746873E-03 | -3.064913E-03 |
| 761 | 0.000000E+00 | 0.000000E+00 | 5.060429E-02 | -1.867465E-02 | -4.375797E-03 |
| 762 | 0.000000E+00 | 0.000000E+00 | 1.076267E-02 | 6.998171E-03 | -2.144411E-03 |
| 781 | 0.000000E+00 | 0.000000E+00 | -4.778989E-02 | 8.512954E-03 | -1.038293E-02 |
| 782 | 0.000000E+00 | 0.000000E+00 | -1.220349E-02 | -1.375158E-02 | 9.157846E-04 |
| 771 | 0.000000E+00 | 0.000000E+00 | -2.704239E-02 | -5.438574E-03 | 3.347102E-03 |
| 772 | 0.000000E+00 | 0.000000E+00 | -3.534985E-02 | -2.931457E-03 | 3.141683E-03 |
| Surface # | $a_{10}$ | $a_{12}$ | $a_{14}$ | $a_{16}$ | |
| 711 | 0.000000E+00 | 0.000000E+00 | 0.000000E+00 | 0.000000E+00 | |
| 712 | 0.000000E+00 | 0.000000E+00 | 0.000000E+00 | 0.000000E+00 | |
| 721 | 0.000000E+00 | 0.000000E+00 | 0.000000E+00 | 0.000000E+00 | |
| 722 | 0.000000E+00 | 0.000000E+00 | 0.000000E+00 | 0.000000E+00 | |
| 731 | 3.529707E-03 | -7.635674E-05 | -3.264228E-04 | 6.134006E-05 | |
| 732 | -1.710719E-03 | 5.618199E-04 | -1.605683E-04 | 1.888601E-05 | |
| 741 | 2.957900E-03 | -4.367949E-04 | 2.797001E-05 | -3.220644E-06 | |
| 742 | 3.336921E-04 | -1.705072E-04 | 5.489029E-05 | -6.800842E-06 | |
| 751 | 8.692553E-04 | -3.330101E-05 | -1.716358E-05 | 1.754390E-06 | |
| 752 | 3.344379E-03 | -8.242167E-04 | 6.898384E-05 | -7.689433E-07 | |
| 761 | 5.703591E-03 | -1.991430E-03 | 2.915035E-04 | -1.503067E-05 | |
| 762 | 4.765429E-04 | -6.784375E-05 | -1.449675E-05 | 3.771420E-06 | |
| 781 | 4.167324E-03 | -9.514719E-04 | 1.097829E-04 | -4.800950E-06 | |
| 782 | 2.586866E-04 | -2.912024E-05 | -3.955352E-07 | 1.364611E-07 | |
| 771 | -4.735945E-04 | 3.392436E-05 | -3.330666E-07 | -2.123442E-07 | |
| 772 | -6.774682E-04 | 6.110407E-05 | -1.791676E-06 | -3.252461E-08 | |

FIG. 33

| Effective focal length（EFL）= 4.181 mm，HFOV（Half field of view）= 38.499deg.，TTL = 6.613 mm，Image height= 3.391 mm，Fno = 1.400 | | | | | | | |
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 800 | Aperture stop | INFINITY | -0.278 | | | | |
| 811 | 1st lens element | 3.341 | 0.282 | 1.545 | 55.987 | -33.317 | Plastic |
| 812 | | 2.739 | 0.003 | | | | |
| 821 | 2nd lens element | 2.052 | 0.239 | 1.661 | 20.412 | -225.370 | Plastic |
| 822 | | 1.930 | 0.150 | | | | |
| 831 | 3rd lens element | 2.962 | 1.122 | 1.545 | 55.987 | 4.501 | Plastic |
| 832 | | -12.540 | 0.016 | | | | |
| 841 | 4th lens element | 2.842 | 0.324 | 1.661 | 20.412 | -19.581 | Plastic |
| 842 | | 2.227 | 0.395 | | | | |
| 851 | 5th lens element | 18.363 | 0.602 | 1.545 | 55.987 | -275.697 | Plastic |
| 852 | | 16.178 | 0.263 | | | | |
| 861 | 6th lens element | -7.695 | 0.584 | 1.545 | 55.987 | 6.106 | Plastic |
| 862 | | -2.389 | 0.170 | | | | |
| 881 | 8th lens element | 2.493 | 0.643 | 1.545 | 55.987 | 16.149 | Plastic |
| 882 | | 3.159 | 0.577 | | | | |
| 871 | 7th lens element | -10.657 | 0.409 | 1.545 | 55.987 | -4.705 | Plastic |
| 872 | | 3.433 | 0.247 | | | | |
| 891 | IR cut filter | INFINITY | 0.289 | 1.517 | 64.167 | | |
| 892 | | INFINITY | 0.299 | | | | |
| IM8 | Image plane | INFINITY | 0.000 | | | | |

FIG. 36

| Aspherical parameters | | | | | |
|---|---|---|---|---|---|
| Surface # | K | $a_2$ | $a_4$ | $a_6$ | $a_8$ |
| 811 | 0.000000E+00 | 0.000000E+00 | -7.943375E-03 | -6.677197E-04 | 0.000000E+00 |
| 812 | 0.000000E+00 | 0.000000E+00 | -2.212660E-02 | -5.753382E-03 | 0.000000E+00 |
| 821 | 0.000000E+00 | 0.000000E+00 | -5.016926E-02 | -9.810997E-03 | 0.000000E+00 |
| 822 | 0.000000E+00 | 0.000000E+00 | -5.181886E-02 | -1.201945E-02 | 0.000000E+00 |
| 831 | 0.000000E+00 | 0.000000E+00 | -8.109021E-03 | 1.792373E-03 | -9.354012E-03 |
| 832 | 0.000000E+00 | 0.000000E+00 | -2.006910E-02 | -3.809157E-03 | 3.185876E-03 |
| 841 | 0.000000E+00 | 0.000000E+00 | -7.299148E-02 | -3.867020E-03 | -4.398294E-03 |
| 842 | 0.000000E+00 | 0.000000E+00 | -6.488861E-02 | -6.273405E-03 | 1.371630E-03 |
| 851 | 0.000000E+00 | 0.000000E+00 | -5.880841E-02 | 1.887483E-02 | -4.194714E-03 |
| 852 | 0.000000E+00 | 0.000000E+00 | -3.290180E-02 | -4.794420E-03 | -3.047286E-03 |
| 861 | 0.000000E+00 | 0.000000E+00 | 5.814687E-02 | -1.952505E-02 | -4.196291E-03 |
| 862 | 0.000000E+00 | 0.000000E+00 | 2.374683E-02 | 7.158712E-03 | -2.119947E-03 |
| 881 | 0.000000E+00 | 0.000000E+00 | -5.416058E-02 | 1.113183E-02 | -1.055166E-02 |
| 882 | 0.000000E+00 | 0.000000E+00 | -1.187414E-02 | -1.188686E-02 | 9.708293E-04 |
| 871 | 0.000000E+00 | 0.000000E+00 | -2.097450E-02 | -5.663574E-03 | 3.343338E-03 |
| 872 | 0.000000E+00 | 0.000000E+00 | -4.035776E-02 | -2.564096E-03 | 3.342207E-03 |
| Surface # | $a_{10}$ | $a_{12}$ | $a_{14}$ | $a_{16}$ | |
| 811 | 0.000000E+00 | 0.000000E+00 | 0.000000E+00 | 0.000000E+00 | |
| 812 | 0.000000E+00 | 0.000000E+00 | 0.000000E+00 | 0.000000E+00 | |
| 821 | 0.000000E+00 | 0.000000E+00 | 0.000000E+00 | 0.000000E+00 | |
| 822 | 0.000000E+00 | 0.000000E+00 | 0.000000E+00 | 0.000000E+00 | |
| 831 | 3.442851E-03 | -1.094469E-04 | -3.267796E-04 | 6.540793E-05 | |
| 832 | -1.738548E-03 | 5.800980E-04 | -1.513522E-04 | 1.903367E-05 | |
| 841 | 2.895662E-03 | -4.348901E-04 | 3.147397E-05 | -2.453621E-06 | |
| 842 | 3.279868E-04 | -1.741772E-04 | 5.406285E-05 | -6.994212E-06 | |
| 851 | 8.691431E-04 | -3.334474E-05 | -1.670525E-05 | 1.655844E-06 | |
| 852 | 3.333333E-03 | -8.256935E-04 | 6.892309E-05 | -7.026439E-07 | |
| 861 | 5.751031E-03 | -1.987690E-03 | 2.910410E-04 | -1.521638E-05 | |
| 862 | 4.937703E-04 | -6.266417E-05 | -1.375312E-05 | 3.756574E-06 | |
| 881 | 4.222977E-03 | -9.397146E-04 | 1.092817E-04 | -5.575313E-06 | |
| 882 | 2.268849E-04 | -2.837038E-05 | -3.845880E-07 | 9.283830E-08 | |
| 871 | -4.903117E-04 | 2.936153E-05 | -1.534799E-07 | -5.670903E-08 | |
| 872 | -6.870578E-04 | 5.808890E-05 | -1.775227E-06 | -4.134914E-09 | |

FIG. 37

| Effective focal length（EFL）= 4.037 mm，HFOV（Half field of view）= 37.796deg.，TTL = 6.673 mm，Image height= 2.900 mm，Fno = 1.400 | | | | | | | |
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 900 | Aperture stop | INFINITY | -0.310 | | | | |
| 911 | 1st lens element | 2.884 | 0.266 | 1.545 | 55.987 | -45.591 | Plastic |
| 912 | | 2.500 | 0.142 | | | | |
| 921 | 2nd lens element | 2.073 | 0.247 | 1.661 | 20.412 | -185.496 | Plastic |
| 922 | | 1.941 | 0.149 | | | | |
| 931 | 3rd lens element | 2.967 | 0.708 | 1.545 | 55.987 | 4.648 | Plastic |
| 932 | | -16.121 | 0.055 | | | | |
| 941 | 4th lens element | 2.881 | 0.292 | 1.661 | 20.412 | -19.163 | Plastic |
| 942 | | 2.256 | 0.495 | | | | |
| 951 | 5th lens element | 57.742 | 0.503 | 1.545 | 55.987 | -44.586 | Plastic |
| 952 | | 17.078 | 0.024 | | | | |
| 961 | 6th lens element | -8.726 | 0.733 | 1.545 | 55.987 | 5.689 | Plastic |
| 962 | | -2.360 | 0.190 | | | | |
| 981 | 8th lens element | 4.172 | 1.553 | 1.545 | 55.987 | 94.818 | Plastic |
| 982 | | 3.941 | 0.562 | | | | |
| 971 | 7th lens element | -47.054 | 0.196 | 1.545 | 55.987 | -6.178 | Plastic |
| 972 | | 3.641 | 0.200 | | | | |
| 991 | IR cut filter | INFINITY | 0.289 | 1.517 | 64.167 | | |
| 992 | | INFINITY | 0.068 | | | | |
| IM9 | Image plane | INFINITY | 0.000 | | | | |

FIG. 40

| Aspherical parameters | | | | | |
|---|---|---|---|---|---|
| Surface # | K | $a_2$ | $a_4$ | $a_6$ | $a_8$ |
| 911 | 0.000000E+00 | 0.000000E+00 | -8.269238E-03 | -1.561393E-03 | 0.000000E+00 |
| 912 | 0.000000E+00 | 0.000000E+00 | -2.500411E-02 | -5.146535E-03 | 0.000000E+00 |
| 921 | 0.000000E+00 | 0.000000E+00 | -4.831243E-02 | -1.033451E-02 | 0.000000E+00 |
| 922 | 0.000000E+00 | 0.000000E+00 | -5.290356E-02 | -1.193908E-02 | 0.000000E+00 |
| 931 | 0.000000E+00 | 0.000000E+00 | -1.130600E-02 | 3.001010E-03 | -9.100161E-03 |
| 932 | 0.000000E+00 | 0.000000E+00 | -1.650016E-02 | -4.439743E-03 | 2.979575E-03 |
| 941 | 0.000000E+00 | 0.000000E+00 | -7.700122E-02 | -3.916589E-03 | -4.361286E-03 |
| 942 | 0.000000E+00 | 0.000000E+00 | -6.447527E-02 | -6.111406E-03 | 1.342041E-03 |
| 951 | 0.000000E+00 | 0.000000E+00 | -6.139813E-02 | 1.931661E-02 | -4.164485E-03 |
| 952 | 0.000000E+00 | 0.000000E+00 | -3.243708E-02 | -4.617344E-03 | -3.057395E-03 |
| 961 | 0.000000E+00 | 0.000000E+00 | 5.971339E-02 | -2.017918E-02 | -4.111556E-03 |
| 962 | 0.000000E+00 | 0.000000E+00 | 1.593651E-02 | 6.968117E-03 | -2.183808E-03 |
| 981 | 0.000000E+00 | 0.000000E+00 | -4.287398E-02 | 1.173487E-02 | -1.005246E-02 |
| 982 | 0.000000E+00 | 0.000000E+00 | 4.556283E-04 | -1.106698E-02 | 8.374246E-04 |
| 971 | 0.000000E+00 | 0.000000E+00 | -1.644127E-02 | -6.661351E-03 | 3.260034E-03 |
| 972 | 0.000000E+00 | 0.000000E+00 | -4.333878E-02 | -1.939079E-03 | 3.334484E-03 |
| Surface # | $a_{10}$ | $a_{12}$ | $a_{14}$ | $a_{16}$ | |
| 911 | 0.000000E+00 | 0.000000E+00 | 0.000000E+00 | 0.000000E+00 | |
| 912 | 0.000000E+00 | 0.000000E+00 | 0.000000E+00 | 0.000000E+00 | |
| 921 | 0.000000E+00 | 0.000000E+00 | 0.000000E+00 | 0.000000E+00 | |
| 922 | 0.000000E+00 | 0.000000E+00 | 0.000000E+00 | 0.000000E+00 | |
| 931 | 3.403279E-03 | -1.548094E-04 | -3.137543E-04 | 6.547297E-05 | |
| 932 | -1.723700E-03 | 5.747334E-04 | -1.521161E-04 | 2.084753E-05 | |
| 941 | 2.851071E-03 | -4.335830E-04 | 2.972853E-05 | -1.499516E-06 | |
| 942 | 3.126168E-04 | -1.765168E-04 | 5.395881E-05 | -6.771709E-06 | |
| 951 | 8.733184E-04 | -3.333922E-05 | -1.704495E-05 | 1.585801E-06 | |
| 952 | 3.313748E-03 | -8.269019E-04 | 6.945648E-05 | -7.106247E-07 | |
| 961 | 5.751361E-03 | -1.995619E-03 | 2.920030E-04 | -1.497607E-05 | |
| 962 | 4.830873E-04 | -6.203919E-05 | -1.385179E-05 | 3.746657E-06 | |
| 981 | 4.282481E-03 | -9.618662E-04 | 1.115321E-04 | -5.481606E-06 | |
| 982 | 2.215890E-04 | -2.819773E-05 | -3.156440E-07 | 9.821423E-08 | |
| 971 | -4.850847E-04 | 2.865617E-05 | -5.612955E-08 | -5.934791E-08 | |
| 972 | -6.844590E-04 | 5.777952E-05 | -1.859751E-06 | -2.251459E-09 | |

FIG. 41

| Effective focal length（EFL）= 4.166 mm，HFOV（Half field of view）= 38.757deg.，TTL = 6.435 mm，Image height= 3.514 mm，Fno = 1.400 | | | | | | | |
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 10'00 | Aperture stop | INFINITY | -0.354 | | | | |
| 10'11 | 1st lens element | 2.941 | 0.893 | 1.545 | 55.987 | 83.386 | Plastic |
| 10'12 | | 2.807 | 0.101 | | | | |
| 10'21 | 2nd lens element | 2.184 | 0.259 | 1.661 | 20.412 | -78.702 | Plastic |
| 10'22 | | 1.997 | 0.066 | | | | |
| 10'31 | 3rd lens element | 2.807 | 0.669 | 1.545 | 55.987 | 5.225 | Plastic |
| 10'32 | | 154.741 | 0.118 | | | | |
| 10'41 | 4th lens element | 2.760 | 0.233 | 1.661 | 20.412 | -23.231 | Plastic |
| 10'42 | | 2.264 | 0.288 | | | | |
| 10'51 | 5th lens element | 6.566 | 0.284 | 1.545 | 55.987 | 75.828 | Plastic |
| 10'52 | | 7.684 | 0.076 | | | | |
| 10'61 | 6th lens element | -18.643 | 1.078 | 1.545 | 55.987 | 4.952 | Plastic |
| 10'62 | | -2.410 | 0.157 | | | | |
| 10'81 | 8th lens element | 2.897 | 0.546 | 1.545 | 55.987 | 77.268 | Plastic |
| 10'82 | | 2.903 | 0.687 | | | | |
| 10'71 | 7th lens element | -7.416 | 0.236 | 1.545 | 55.987 | -4.678 | Plastic |
| 10'72 | | 3.943 | 0.178 | | | | |
| 10'91 | IR cut filter | INFINITY | 0.289 | 1.517 | 64.167 | | |
| 10'92 | | INFINITY | 0.275 | | | | |
| IM10 | Image plane | INFINITY | 0.000 | | | | |

FIG. 44

| Aspherical parameters | | | | | |
|---|---|---|---|---|---|
| Surface # | K | $a_2$ | $a_4$ | $a_6$ | $a_8$ |
| 10'11 | 0.000000E+00 | 0.000000E+00 | -3.231484E-03 | -7.013634E-04 | 0.000000E+00 |
| 10'12 | 0.000000E+00 | 0.000000E+00 | -2.599284E-02 | -6.751394E-03 | 0.000000E+00 |
| 10'21 | 0.000000E+00 | 0.000000E+00 | -5.393933E-02 | -1.084306E-02 | 0.000000E+00 |
| 10'22 | 0.000000E+00 | 0.000000E+00 | -5.326740E-02 | -1.305725E-02 | 0.000000E+00 |
| 10'31 | 0.000000E+00 | 0.000000E+00 | -1.488082E-02 | 1.126895E-03 | -9.472525E-03 |
| 10'32 | 0.000000E+00 | 0.000000E+00 | -1.071083E-02 | -5.011025E-03 | 3.100557E-03 |
| 10'41 | 0.000000E+00 | 0.000000E+00 | -7.514601E-02 | -3.837419E-03 | -4.443214E-03 |
| 10'42 | 0.000000E+00 | 0.000000E+00 | -6.437872E-02 | -5.514787E-03 | 1.552796E-03 |
| 10'51 | 0.000000E+00 | 0.000000E+00 | -6.557276E-02 | 1.956894E-02 | -4.072881E-03 |
| 10'52 | 0.000000E+00 | 0.000000E+00 | -2.258373E-02 | -5.081530E-03 | -3.025434E-03 |
| 10'61 | 0.000000E+00 | 0.000000E+00 | 5.560806E-02 | -1.928950E-02 | -4.350474E-03 |
| 10'62 | 0.000000E+00 | 0.000000E+00 | 7.101143E-03 | 6.745724E-03 | -1.926308E-03 |
| 10'81 | 0.000000E+00 | 0.000000E+00 | -4.964281E-02 | 9.856108E-03 | -1.072402E-02 |
| 10'82 | 0.000000E+00 | 0.000000E+00 | -1.588450E-02 | -1.145666E-02 | 9.275608E-04 |
| 10'71 | 0.000000E+00 | 0.000000E+00 | -1.863947E-02 | -5.009598E-03 | 3.245960E-03 |
| 10'72 | 0.000000E+00 | 0.000000E+00 | -3.602371E-02 | -3.144940E-03 | 3.390441E-03 |
| Surface # | $a_{10}$ | $a_{12}$ | $a_{14}$ | $a_{16}$ | |
| 10'11 | 0.000000E+00 | 0.000000E+00 | 0.000000E+00 | 0.000000E+00 | |
| 10'12 | 0.000000E+00 | 0.000000E+00 | 0.000000E+00 | 0.000000E+00 | |
| 10'21 | 0.000000E+00 | 0.000000E+00 | 0.000000E+00 | 0.000000E+00 | |
| 10'22 | 0.000000E+00 | 0.000000E+00 | 0.000000E+00 | 0.000000E+00 | |
| 10'31 | 3.445728E-03 | -8.316248E-05 | -3.169359E-04 | 6.331558E-05 | |
| 10'32 | -1.738950E-03 | 5.779057E-04 | -1.533841E-04 | 2.117765E-05 | |
| 10'41 | 2.905440E-03 | -4.207597E-04 | 3.411547E-05 | -4.096812E-06 | |
| 10'42 | 3.205218E-04 | -1.800395E-04 | 5.297260E-05 | -6.666558E-06 | |
| 10'51 | 8.926485E-04 | -3.079187E-05 | -1.723798E-05 | 1.177130E-06 | |
| 10'52 | 3.346750E-03 | -8.232944E-04 | 7.017444E-05 | -2.589217E-07 | |
| 10'61 | 5.721627E-03 | -1.985800E-03 | 2.929868E-04 | -1.476170E-05 | |
| 10'62 | 5.286083E-04 | -6.173493E-05 | -1.493406E-05 | 3.317071E-06 | |
| 10'81 | 4.239848E-03 | -9.348584E-04 | 1.103918E-04 | -5.461602E-06 | |
| 10'82 | 2.273015E-04 | -2.790970E-05 | -2.446408E-07 | 7.179740E-08 | |
| 10'71 | -5.010712E-04 | 2.950746E-05 | 1.387333E-07 | -6.910681E-08 | |
| 10'72 | -6.823886E-04 | 5.775237E-05 | -1.844151E-06 | 2.676597E-09 | |

FIG. 45

| Effective focal length（EFL）= 4.160 mm，HFOV（Half field of view）= 38.761deg.，TTL = 6.650 mm，Image height= 3.487 mm，Fno = 1.400 | | | | | | | |
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 11'00 | Aperture stop | INFINITY | -0.328 | | | | |
| 11'11 | 1st lens element | 2.870 | 0.272 | 1.545 | 55.987 | -42.581 | Plastic |
| 11'12 | | 2.469 | 0.080 | | | | |
| 11'21 | 2nd lens element | 1.999 | 0.242 | 1.661 | 20.412 | -186.074 | Plastic |
| 11'22 | | 1.872 | 0.126 | | | | |
| 11'31 | 3rd lens element | 3.065 | 0.846 | 1.545 | 55.987 | 4.865 | Plastic |
| 11'32 | | -18.050 | 0.254 | | | | |
| 11'41 | 4th lens element | 2.721 | 0.250 | 1.661 | 20.412 | -22.500 | Plastic |
| 11'42 | | 2.219 | 0.391 | | | | |
| 11'51 | 5th lens element | 6.369 | 0.282 | 1.545 | 55.987 | -3705.268 | Plastic |
| 11'52 | | 6.250 | 0.167 | | | | |
| 11'61 | 6th lens element | -14.384 | 1.149 | 1.545 | 55.987 | 4.887 | Plastic |
| 11'62 | | -2.315 | 0.029 | | | | |
| 11'81 | 8th lens element | 2.538 | 0.591 | 1.545 | 55.987 | 33.410 | Plastic |
| 11'82 | | 2.705 | 0.540 | | | | |
| 11'71 | 7th lens element | -14.394 | 0.483 | 1.545 | 55.987 | -5.144 | Plastic |
| 11'72 | | 3.533 | 0.384 | | | | |
| 11'91 | IR cut filter | INFINITY | 0.289 | 1.517 | 64.167 | | |
| 11'92 | | INFINITY | 0.275 | | | | |
| IM11 | Image plane | INFINITY | 0.000 | | | | |

FIG. 48

| Aspherical parameters | | | | | |
|---|---|---|---|---|---|
| Surface # | K | $a_2$ | $a_4$ | $a_6$ | $a_8$ |
| 11'11 | 0.000000E+00 | 0.000000E+00 | -9.438126E-03 | -1.260233E-03 | 0.000000E+00 |
| 11'12 | 0.000000E+00 | 0.000000E+00 | -2.224465E-02 | -5.531681E-03 | 0.000000E+00 |
| 11'21 | 0.000000E+00 | 0.000000E+00 | -5.071520E-02 | -1.004798E-02 | 0.000000E+00 |
| 11'22 | 0.000000E+00 | 0.000000E+00 | -5.376309E-02 | -1.282018E-02 | 0.000000E+00 |
| 11'31 | 0.000000E+00 | 0.000000E+00 | -1.180113E-02 | 2.142699E-03 | -9.340917E-03 |
| 11'32 | 0.000000E+00 | 0.000000E+00 | -1.610895E-02 | -4.325058E-03 | 3.165786E-03 |
| 11'41 | 0.000000E+00 | 0.000000E+00 | -7.575184E-02 | -3.572159E-03 | -4.323779E-03 |
| 11'42 | 0.000000E+00 | 0.000000E+00 | -6.572437E-02 | -6.198125E-03 | 1.417802E-03 |
| 11'51 | 0.000000E+00 | 0.000000E+00 | -6.246306E-02 | 1.920480E-02 | -4.144478E-03 |
| 11'52 | 0.000000E+00 | 0.000000E+00 | -2.727320E-02 | -4.726655E-03 | -2.981656E-03 |
| 11'61 | 0.000000E+00 | 0.000000E+00 | 5.610972E-02 | -1.967330E-02 | -4.293888E-03 |
| 11'62 | 0.000000E+00 | 0.000000E+00 | 1.134334E-02 | 6.778215E-03 | -2.002954E-03 |
| 11'81 | 0.000000E+00 | 0.000000E+00 | -4.948297E-02 | 1.090395E-02 | -1.084594E-02 |
| 11'82 | 0.000000E+00 | 0.000000E+00 | -1.696783E-02 | -1.199051E-02 | 9.558503E-04 |
| 11'71 | 0.000000E+00 | 0.000000E+00 | -1.488843E-02 | -5.566348E-03 | 3.252917E-03 |
| 11'72 | 0.000000E+00 | 0.000000E+00 | -3.267488E-02 | -3.315774E-03 | 3.335276E-03 |
| Surface # | $a_{10}$ | $a_{12}$ | $a_{14}$ | $a_{16}$ | |
| 11'11 | 0.000000E+00 | 0.000000E+00 | 0.000000E+00 | 0.000000E+00 | |
| 11'12 | 0.000000E+00 | 0.000000E+00 | 0.000000E+00 | 0.000000E+00 | |
| 11'21 | 0.000000E+00 | 0.000000E+00 | 0.000000E+00 | 0.000000E+00 | |
| 11'22 | 0.000000E+00 | 0.000000E+00 | 0.000000E+00 | 0.000000E+00 | |
| 11'31 | 3.435845E-03 | -9.676878E-05 | -3.228286E-04 | 6.684689E-05 | |
| 11'32 | -1.721391E-03 | 5.816190E-04 | -1.539524E-04 | 1.787336E-05 | |
| 11'41 | 2.907173E-03 | -4.290118E-04 | 3.255044E-05 | -2.952109E-06 | |
| 11'42 | 3.257865E-04 | -1.757622E-04 | 5.305382E-05 | -6.997082E-06 | |
| 11'51 | 8.795670E-04 | -3.245085E-05 | -1.692299E-05 | 1.412950E-06 | |
| 11'52 | 3.352867E-03 | -8.222372E-04 | 7.005993E-05 | -5.372192E-07 | |
| 11'61 | 5.737291E-03 | -1.986936E-03 | 2.920911E-04 | -1.495040E-05 | |
| 11'62 | 5.202891E-04 | -6.121274E-05 | -1.458900E-05 | 3.356029E-06 | |
| 11'81 | 4.165865E-03 | -9.413875E-04 | 1.111025E-04 | -4.942915E-06 | |
| 11'82 | 2.316096E-04 | -2.788565E-05 | -4.800020E-07 | 5.964533E-08 | |
| 11'71 | -4.997833E-04 | 2.903060E-05 | -2.525936E-08 | -4.990580E-08 | |
| 11'72 | -6.839251E-04 | 5.805738E-05 | -1.802148E-06 | -1.096158E-09 | |

FIG. 49

| Effective focal length（EFL）= 4.194 mm，HFOV（Half field of view）= 38.763deg.，TTL = 6.623 mm，Image height= 3.484 mm，Fno = 1.400 | | | | | | | |
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 12'00 | Aperture stop | INFINITY | -0.359 | | | | |
| 12'11 | 1st lens element | 2.983 | 0.395 | 1.545 | 55.987 | -68.146 | Plastic |
| 12'12 | | 2.632 | 0.096 | | | | |
| 12'21 | 2nd lens element | 2.152 | 0.308 | 1.661 | 20.412 | -192.927 | Plastic |
| 12'22 | | 1.995 | 0.113 | | | | |
| 12'31 | 3rd lens element | 2.916 | 0.570 | 1.545 | 55.987 | 5.265 | Plastic |
| 12'32 | | -195.671 | 0.023 | | | | |
| 12'41 | 4th lens element | 2.704 | 0.322 | 1.661 | 20.412 | -26.133 | Plastic |
| 12'42 | | 2.230 | 0.494 | | | | |
| 12'51 | 5th lens element | 7.411 | 0.333 | 1.545 | 55.987 | -591.956 | Plastic |
| 12'52 | | 7.130 | 0.153 | | | | |
| 12'61 | 6th lens element | -17.471 | 1.123 | 1.545 | 55.987 | 4.797 | Plastic |
| 12'62 | | -2.330 | 0.028 | | | | |
| 12'81 | 8th lens element | 2.623 | 0.600 | 1.545 | 55.987 | 38.500 | Plastic |
| 12'82 | | 2.755 | 0.575 | | | | |
| 12'71 | 7th lens element | -9.497 | 0.679 | 1.545 | 55.987 | -4.787 | Plastic |
| 12'72 | | 3.700 | 0.250 | | | | |
| 12'91 | IR cut filter | INFINITY | 0.289 | 1.517 | 64.167 | | |
| 12'92 | | INFINITY | 0.275 | | | | |
| IM12 | Image plane | INFINITY | 0.000 | | | | |

FIG. 52

| Aspherical parameters | | | | | |
|---|---|---|---|---|---|
| Surface # | K | $a_2$ | $a_4$ | $a_6$ | $a_8$ |
| 12'11 | 0.000000E+00 | 0.000000E+00 | -2.269390E-03 | -5.220283E-04 | 0.000000E+00 |
| 12'12 | 0.000000E+00 | 0.000000E+00 | -2.469694E-02 | -6.318669E-03 | 0.000000E+00 |
| 12'21 | 0.000000E+00 | 0.000000E+00 | -5.038209E-02 | -1.014728E-02 | 0.000000E+00 |
| 12'22 | 0.000000E+00 | 0.000000E+00 | -5.546457E-02 | -1.305928E-02 | 0.000000E+00 |
| 12'31 | 0.000000E+00 | 0.000000E+00 | -1.285431E-02 | 1.474927E-03 | -9.538595E-03 |
| 12'32 | 0.000000E+00 | 0.000000E+00 | -1.307179E-02 | -4.219929E-03 | 3.255613E-03 |
| 12'41 | 0.000000E+00 | 0.000000E+00 | -7.603284E-02 | -4.124570E-03 | -4.427341E-03 |
| 12'42 | 0.000000E+00 | 0.000000E+00 | -6.379193E-02 | -5.639563E-03 | 1.482756E-03 |
| 12'51 | 0.000000E+00 | 0.000000E+00 | -6.362083E-02 | 1.935519E-02 | -4.097520E-03 |
| 12'52 | 0.000000E+00 | 0.000000E+00 | -2.499770E-02 | -4.899181E-03 | -3.044906E-03 |
| 12'61 | 0.000000E+00 | 0.000000E+00 | 5.377886E-02 | -1.958869E-02 | -4.284118E-03 |
| 12'62 | 0.000000E+00 | 0.000000E+00 | 1.112331E-02 | 6.600910E-03 | -2.039439E-03 |
| 12'81 | 0.000000E+00 | 0.000000E+00 | -4.811742E-02 | 1.077984E-02 | -1.076578E-02 |
| 12'82 | 0.000000E+00 | 0.000000E+00 | -1.860893E-02 | -1.164601E-02 | 9.777523E-04 |
| 12'71 | 0.000000E+00 | 0.000000E+00 | -1.512004E-02 | -5.254591E-03 | 3.228378E-03 |
| 12'72 | 0.000000E+00 | 0.000000E+00 | -3.532632E-02 | -3.114406E-03 | 3.377275E-03 |
| Surface # | $a_{10}$ | $a_{12}$ | $a_{14}$ | $a_{16}$ | |
| 12'11 | 0.000000E+00 | 0.000000E+00 | 0.000000E+00 | 0.000000E+00 | |
| 12'12 | 0.000000E+00 | 0.000000E+00 | 0.000000E+00 | 0.000000E+00 | |
| 12'21 | 0.000000E+00 | 0.000000E+00 | 0.000000E+00 | 0.000000E+00 | |
| 12'22 | 0.000000E+00 | 0.000000E+00 | 0.000000E+00 | 0.000000E+00 | |
| 12'31 | 3.395449E-03 | -9.625030E-05 | -3.195512E-04 | 6.371098E-05 | |
| 12'32 | -1.685327E-03 | 5.875153E-04 | -1.524618E-04 | 2.136079E-05 | |
| 12'41 | 2.925877E-03 | -4.117088E-04 | 3.766619E-05 | -3.199670E-06 | |
| 12'42 | 3.190033E-04 | -1.789232E-04 | 5.303085E-05 | -6.754314E-06 | |
| 12'51 | 8.899088E-04 | -3.101296E-05 | -1.697753E-05 | 1.292915E-06 | |
| 12'52 | 3.340321E-03 | -8.242000E-04 | 6.995093E-05 | -3.553686E-07 | |
| 12'61 | 5.742265E-03 | -1.985504E-03 | 2.923224E-04 | -1.494027E-05 | |
| 12'62 | 5.174110E-04 | -6.068965E-05 | -1.434375E-05 | 3.432319E-06 | |
| 12'81 | 4.180299E-03 | -9.421330E-04 | 1.108118E-04 | -5.057650E-06 | |
| 12'82 | 2.341347E-04 | -2.820817E-05 | -4.560781E-07 | 6.671273E-08 | |
| 12'71 | -5.000210E-04 | 2.980249E-05 | 1.306659E-07 | -7.921888E-08 | |
| 12'72 | -6.840962E-04 | 5.763511E-05 | -1.842920E-06 | 4.055291E-09 | |

FIG. 53

| Effective focal length（EFL）= 3.572 mm，HFOV（Half field of view）= 38.295deg.，TTL = 6.731 mm，Image height= 3.099 mm，Fno = 1.400 | | | | | | | |
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 13'00 | Aperture stop | INFINITY | -0.289 | | | | |
| 13'11 | 1st lens element | 2.275 | 0.234 | 1.545 | 55.987 | -331.381 | Plastic |
| 13'12 | | 2.165 | 0.330 | | | | |
| 13'21 | 2nd lens element | 2.771 | 0.232 | 1.661 | 20.412 | -21.069 | Plastic |
| 13'22 | | 2.237 | 0.051 | | | | |
| 13'31 | 3rd lens element | 3.545 | 1.194 | 1.545 | 55.987 | 5.399 | Plastic |
| 13'32 | | -15.451 | 0.009 | | | | |
| 13'41 | 4th lens element | 5.654 | 0.591 | 1.661 | 20.412 | -20.483 | Plastic |
| 13'42 | | 3.832 | 0.436 | | | | |
| 13'51 | 5th lens element | 5.911 | 0.511 | 1.545 | 55.987 | 4.393 | Plastic |
| 13'52 | | -3.917 | 0.187 | | | | |
| 13'61 | 6th lens element | -6.484 | 0.816 | 1.545 | 55.987 | 7.104 | Plastic |
| 13'62 | | -2.536 | 1.110 | | | | |
| 13'71 | 7th lens element | -7.626 | 0.237 | 1.545 | 55.987 | -4.025 | Plastic |
| 13'72 | | 3.124 | 0.500 | | | | |
| 13'81 | IR cut filter | INFINITY | 0.210 | 1.517 | 64.167 | | |
| 13'82 | | INFINITY | 0.083 | | | | |
| IM13 | Image plane | INFINITY | 0.000 | | | | |

FIG. 56

| Aspherical parameters | | | | | |
|---|---|---|---|---|---|
| Surface # | K | $a_2$ | $a_4$ | $a_6$ | $a_8$ |
| 13'11 | 0.000000E+00 | 0.000000E+00 | -2.772818E-02 | 3.050694E-04 | 0.000000E+00 |
| 13'12 | 0.000000E+00 | 0.000000E+00 | -2.783682E-02 | -7.134961E-03 | 0.000000E+00 |
| 13'21 | 0.000000E+00 | 0.000000E+00 | -4.204423E-02 | -1.002037E-02 | 0.000000E+00 |
| 13'22 | 0.000000E+00 | 0.000000E+00 | -5.081696E-02 | -7.288542E-03 | 0.000000E+00 |
| 13'31 | 0.000000E+00 | 0.000000E+00 | -1.324704E-02 | 3.731583E-03 | -3.723467E-03 |
| 13'32 | 0.000000E+00 | 0.000000E+00 | -3.071251E-02 | -1.938986E-02 | 7.950034E-03 |
| 13'41 | 0.000000E+00 | 0.000000E+00 | -7.302724E-02 | -1.857028E-03 | -1.326647E-03 |
| 13'42 | 0.000000E+00 | 0.000000E+00 | -6.755535E-02 | 1.472428E-02 | -6.795410E-03 |
| 13'51 | 0.000000E+00 | 0.000000E+00 | -6.796739E-02 | 7.002147E-03 | -3.239225E-03 |
| 13'52 | 0.000000E+00 | 0.000000E+00 | -3.398280E-03 | -9.176189E-03 | -1.970657E-03 |
| 13'61 | 0.000000E+00 | 0.000000E+00 | 4.133706E-02 | -7.747258E-03 | -1.914547E-04 |
| 13'62 | 0.000000E+00 | 0.000000E+00 | 3.937995E-02 | -3.416324E-03 | -1.489618E-03 |
| 13'71 | 0.000000E+00 | 0.000000E+00 | -7.011651E-02 | 1.991594E-02 | -6.103745E-03 |
| 13'72 | 0.000000E+00 | 0.000000E+00 | -4.164749E-02 | 4.521144E-03 | -4.591852E-05 |
| Surface # | $a_{10}$ | $a_{12}$ | $a_{14}$ | $a_{16}$ | |
| 13'11 | 0.000000E+00 | 0.000000E+00 | 0.000000E+00 | 0.000000E+00 | |
| 13'12 | 0.000000E+00 | 0.000000E+00 | 0.000000E+00 | 0.000000E+00 | |
| 13'21 | 0.000000E+00 | 0.000000E+00 | 0.000000E+00 | 0.000000E+00 | |
| 13'22 | 0.000000E+00 | 0.000000E+00 | 0.000000E+00 | 0.000000E+00 | |
| 13'31 | 9.262296E-04 | -6.637156E-05 | -4.623554E-05 | -1.225752E-07 | |
| 13'32 | -8.248067E-04 | 2.780258E-06 | -7.096693E-05 | 6.249896E-06 | |
| 13'41 | -1.236848E-04 | -2.141881E-04 | 3.054040E-05 | 1.464275E-05 | |
| 13'42 | 1.097886E-03 | 3.996156E-05 | -3.110319E-05 | 3.170824E-06 | |
| 13'51 | 8.650376E-04 | -1.190946E-05 | 3.305113E-05 | -1.099791E-05 | |
| 13'52 | 1.728563E-03 | -2.545911E-04 | 4.235690E-05 | -8.457510E-06 | |
| 13'61 | 6.936984E-04 | -2.114937E-04 | 3.000306E-05 | -1.898117E-06 | |
| 13'62 | 8.585157E-04 | -9.859416E-05 | -4.903934E-06 | 9.031641E-07 | |
| 13'71 | 1.552469E-03 | -1.856427E-04 | -2.657920E-06 | 9.734052E-07 | |
| 13'72 | 1.488692E-06 | -1.739035E-05 | 2.867128E-06 | -1.406091E-07 | |

FIG. 57

| Effective focal length (EFL) = 4.158 mm, HFOV (Half field of view) = 38.286deg., TTL = 5.259 mm, Image height= 2.402 mm, Fno = 1.400 | | | | | | | |
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 14'00 | Aperture stop | INFINITY | -0.409 | | | | |
| 14'11 | 1st lens element | 2.535 | 0.356 | 1.545 | 55.987 | 9.874 | Plastic |
| 14'12 | | 4.546 | 0.215 | | | | |
| 14'21 | 2nd lens element | 4.679 | 0.255 | 1.661 | 20.412 | -17.691 | Plastic |
| 14'22 | | 3.278 | 0.157 | | | | |
| 14'31 | 3rd lens element | 3.574 | 0.452 | 1.545 | 55.987 | 9.481 | Plastic |
| 14'32 | | 11.016 | 0.113 | | | | |
| 14'41 | 4th lens element | 6.543 | 0.228 | 1.661 | 20.412 | -147.861 | Plastic |
| 14'42 | | 6.050 | 0.299 | | | | |
| 14'51 | 5th lens element | 12.299 | 0.384 | 1.545 | 55.987 | 7.945 | Plastic |
| 14'52 | | -6.633 | 0.090 | | | | |
| 14'61 | 6th lens element | -5.604 | 0.641 | 1.545 | 55.987 | 5.829 | Plastic |
| 14'62 | | -2.112 | 0.763 | | | | |
| 14'71 | 7th lens element | -8.679 | 0.416 | 1.545 | 55.987 | -3.507 | Plastic |
| 14'72 | | 2.500 | 0.589 | | | | |
| 14'81 | IR cut filter | INFINITY | 0.210 | 1.517 | 64.167 | | |
| 14'82 | | INFINITY | 0.090 | | | | |
| IM14 | Image plane | INFINITY | 0.000 | | | | |

FIG. 60

| Aspherical parameters | | | | | |
|---|---|---|---|---|---|
| Surface # | K | $a_2$ | $a_4$ | $a_6$ | $a_8$ |
| 14'11 | 0.000000E+00 | 0.000000E+00 | -6.056783E-03 | -1.162978E-03 | 0.000000E+00 |
| 14'12 | 0.000000E+00 | 0.000000E+00 | -1.377891E-02 | -3.315534E-03 | 0.000000E+00 |
| 14'21 | 0.000000E+00 | 0.000000E+00 | -3.569259E-02 | -7.864410E-03 | 0.000000E+00 |
| 14'22 | 0.000000E+00 | 0.000000E+00 | -4.749644E-02 | -4.564500E-03 | 0.000000E+00 |
| 14'31 | 0.000000E+00 | 0.000000E+00 | -1.683834E-02 | -1.999059E-03 | -2.613117E-03 |
| 14'32 | 0.000000E+00 | 0.000000E+00 | -2.328723E-02 | -1.333944E-02 | 7.211885E-03 |
| 14'41 | 0.000000E+00 | 0.000000E+00 | -4.144403E-02 | -2.530034E-03 | 1.302285E-03 |
| 14'42 | 0.000000E+00 | 0.000000E+00 | -4.434910E-02 | 1.598530E-02 | -7.310501E-03 |
| 14'51 | 0.000000E+00 | 0.000000E+00 | -5.590037E-02 | 8.436202E-03 | -1.559524E-03 |
| 14'52 | 0.000000E+00 | 0.000000E+00 | 1.598375E-02 | -8.046724E-03 | -2.943870E-03 |
| 14'61 | 0.000000E+00 | 0.000000E+00 | 7.421315E-02 | -1.756971E-02 | 3.103846E-04 |
| 14'62 | 0.000000E+00 | 0.000000E+00 | 4.088564E-02 | 3.087173E-03 | -9.365662E-04 |
| 14'71 | 0.000000E+00 | 0.000000E+00 | -9.110002E-02 | 2.766276E-02 | -6.685393E-03 |
| 14'72 | 0.000000E+00 | 0.000000E+00 | -8.242749E-02 | 2.877013E-03 | 5.254364E-04 |
| Surface # | $a_{10}$ | $a_{12}$ | $a_{14}$ | $a_{16}$ | |
| 14'11 | 0.000000E+00 | 0.000000E+00 | 0.000000E+00 | 0.000000E+00 | |
| 14'12 | 0.000000E+00 | 0.000000E+00 | 0.000000E+00 | 0.000000E+00 | |
| 14'21 | 0.000000E+00 | 0.000000E+00 | 0.000000E+00 | 0.000000E+00 | |
| 14'22 | 0.000000E+00 | 0.000000E+00 | 0.000000E+00 | 0.000000E+00 | |
| 14'31 | 1.058902E-03 | -7.953150E-05 | -4.003682E-05 | 1.171424E-05 | |
| 14'32 | -7.552235E-04 | 9.270542E-05 | -4.809487E-05 | 9.746312E-06 | |
| 14'41 | 3.314216E-04 | -1.929108E-04 | 2.106774E-05 | 7.715085E-06 | |
| 14'42 | 1.038471E-03 | 3.973235E-05 | -2.313089E-05 | 7.735249E-06 | |
| 14'51 | 1.051537E-03 | 1.355688E-05 | 2.700101E-05 | -1.232236E-05 | |
| 14'52 | 1.720160E-03 | -2.124815E-04 | 5.651157E-05 | -2.957357E-06 | |
| 14'61 | 6.634020E-04 | -2.193989E-04 | 2.461453E-05 | -2.067013E-06 | |
| 14'62 | 9.653372E-04 | -1.055505E-04 | -8.791158E-06 | -2.020429E-06 | |
| 14'71 | 1.581997E-03 | -1.210195E-04 | -2.485724E-06 | -4.815337E-06 | |
| 14'72 | -6.978545E-05 | -8.050766E-06 | 3.575267E-07 | -2.543750E-07 | |

FIG. 61

| Effective focal length（EFL）= 3.889 mm，HFOV（Half field of view）= 38.296deg.，TTL = 6.350 mm，Image height= 3.050 mm，Fno = 1.400 | | | | | | | |
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 15'00 | Aperture stop | INFINITY | -0.360 | | | | |
| 15'11 | 1st lens element | 2.177 | 0.352 | 1.545 | 55.987 | 43.455 | Plastic |
| 15'12 | | 2.260 | 0.368 | | | | |
| 15'21 | 2nd lens element | 3.379 | 0.236 | 1.661 | 20.412 | -29.181 | Plastic |
| 15'22 | | 2.799 | 0.256 | | | | |
| 15'31 | 3rd lens element | 3.859 | 0.487 | 1.545 | 55.987 | 6.771 | Plastic |
| 15'32 | | -84.908 | 0.256 | | | | |
| 15'41 | 4th lens element | 2.918 | 0.091 | 1.661 | 20.412 | -49.508 | Plastic |
| 15'42 | | 2.648 | 0.408 | | | | |
| 15'51 | 5th lens element | 11.498 | 0.398 | 1.545 | 55.987 | 5.895 | Plastic |
| 15'52 | | -4.418 | 0.640 | | | | |
| 15'61 | 6th lens element | -3.722 | 0.408 | 1.545 | 55.987 | 13.267 | Plastic |
| 15'62 | | -2.554 | 1.436 | | | | |
| 15'71 | 7th lens element | 14.777 | 0.320 | 1.545 | 55.987 | -7.246 | Plastic |
| 15'72 | | 3.098 | 0.400 | | | | |
| 15'81 | IR cut filter | INFINITY | 0.210 | 1.517 | 64.167 | | |
| 15'82 | | INFINITY | 0.084 | | | | |
| IM15 | Image plane | INFINITY | 0.000 | | | | |

FIG. 64

| Aspherical parameters | | | | | |
|---|---|---|---|---|---|
| Surface # | K | $a_2$ | $a_4$ | $a_6$ | $a_8$ |
| 15'11 | 0.000000E+00 | 0.000000E+00 | -2.818799E-02 | -8.372440E-04 | 0.000000E+00 |
| 15'12 | 0.000000E+00 | 0.000000E+00 | -3.607075E-02 | -2.471728E-03 | 0.000000E+00 |
| 15'21 | 0.000000E+00 | 0.000000E+00 | -4.696317E-02 | -5.560349E-03 | 0.000000E+00 |
| 15'22 | 0.000000E+00 | 0.000000E+00 | -4.759529E-02 | -3.271981E-03 | 0.000000E+00 |
| 15'31 | 0.000000E+00 | 0.000000E+00 | -3.231014E-02 | 6.976733E-03 | -3.988880E-03 |
| 15'32 | 0.000000E+00 | 0.000000E+00 | -1.615719E-02 | -1.755770E-02 | 8.037375E-03 |
| 15'41 | 0.000000E+00 | 0.000000E+00 | -7.100992E-02 | -4.130203E-03 | -1.593210E-03 |
| 15'42 | 0.000000E+00 | 0.000000E+00 | -8.964636E-02 | 1.172877E-02 | -7.393163E-03 |
| 15'51 | 0.000000E+00 | 0.000000E+00 | -5.475265E-02 | 8.260501E-03 | -3.140737E-03 |
| 15'52 | 0.000000E+00 | 0.000000E+00 | -1.234946E-02 | -5.824023E-03 | -1.235797E-03 |
| 15'61 | 0.000000E+00 | 0.000000E+00 | 4.259124E-02 | -7.465179E-03 | -1.380877E-04 |
| 15'62 | 0.000000E+00 | 0.000000E+00 | 4.422550E-02 | -4.172829E-03 | -1.452960E-03 |
| 15'71 | 0.000000E+00 | 0.000000E+00 | -9.020681E-02 | 2.127901E-02 | -6.210736E-03 |
| 15'72 | 0.000000E+00 | 0.000000E+00 | -3.234355E-02 | -2.336994E-04 | 4.357942E-04 |
| Surface # | $a_{10}$ | $a_{12}$ | $a_{14}$ | $a_{16}$ | |
| 15'11 | 0.000000E+00 | 0.000000E+00 | 0.000000E+00 | 0.000000E+00 | |
| 15'12 | 0.000000E+00 | 0.000000E+00 | 0.000000E+00 | 0.000000E+00 | |
| 15'21 | 0.000000E+00 | 0.000000E+00 | 0.000000E+00 | 0.000000E+00 | |
| 15'22 | 0.000000E+00 | 0.000000E+00 | 0.000000E+00 | 0.000000E+00 | |
| 15'31 | 9.046638E-04 | -8.031307E-05 | -4.019287E-05 | 9.105136E-06 | |
| 15'32 | -1.105761E-03 | -3.301871E-05 | -4.359128E-05 | 1.683935E-05 | |
| 15'41 | 6.027053E-05 | -1.175135E-04 | 2.822808E-05 | 6.516051E-06 | |
| 15'42 | 9.320240E-04 | 4.619718E-05 | -2.477643E-05 | 3.040561E-06 | |
| 15'51 | 9.512600E-04 | -3.472413E-05 | 2.102299E-05 | -1.294972E-05 | |
| 15'52 | 1.614361E-03 | -2.825933E-04 | 3.823715E-05 | -1.068739E-05 | |
| 15'61 | 7.043380E-04 | -2.106976E-04 | 3.009107E-05 | -1.829010E-06 | |
| 15'62 | 8.566165E-04 | -9.620738E-05 | -4.354960E-06 | 9.267199E-07 | |
| 15'71 | 1.605820E-03 | -1.719219E-04 | -1.107534E-06 | 8.565369E-07 | |
| 15'72 | 1.590706E-05 | -1.974057E-05 | 2.599790E-06 | -1.202828E-07 | |

FIG. 65

| Effective focal length (EFL) = 3.650 mm, HFOV (Half field of view) = 38.295deg., TTL = 5.465 mm, Image height= 3.199 mm, Fno = 1.400 | | | | | | | |
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 16'00 | Aperture stop | INFINITY | -0.310 | | | | |
| 16'11 | 1st lens element | 2.531 | 0.980 | 1.545 | 55.987 | 8.724 | Plastic |
| 16'12 | | 4.660 | 0.383 | | | | |
| 16'21 | 2nd lens element | 14.272 | 0.236 | 1.661 | 20.412 | -20.515 | Plastic |
| 16'22 | | 6.940 | 0.015 | | | | |
| 16'31 | 3rd lens element | 3.233 | 0.508 | 1.545 | 55.987 | 8.232 | Plastic |
| 16'32 | | 10.870 | 0.067 | | | | |
| 16'41 | 4th lens element | 3.561 | 0.197 | 1.661 | 20.412 | 208.116 | Plastic |
| 16'42 | | 3.574 | 0.397 | | | | |
| 16'51 | 5th lens element | 27.280 | 0.310 | 1.545 | 55.987 | 8.984 | Plastic |
| 16'52 | | -5.960 | 0.073 | | | | |
| 16'61 | 6th lens element | -4.608 | 0.508 | 1.545 | 55.987 | 6.232 | Plastic |
| 16'62 | | -2.034 | 0.717 | | | | |
| 16'71 | 7th lens element | 56.086 | 0.177 | 1.545 | 55.987 | -5.960 | Plastic |
| 16'72 | | 3.074 | 0.589 | | | | |
| 16'81 | IR cut filter | INFINITY | 0.210 | 1.517 | 64.167 | | |
| 16'82 | | INFINITY | 0.099 | | | | |
| IM16 | Image plane | INFINITY | 0.000 | | | | |

FIG. 68

| Aspherical parameters | | | | | |
|---|---|---|---|---|---|
| Surface # | K | $a_2$ | $a_4$ | $a_6$ | $a_8$ |
| 16'11 | 0.000000E+00 | 0.000000E+00 | -5.775404E-03 | -9.574989E-04 | 0.000000E+00 |
| 16'12 | 0.000000E+00 | 0.000000E+00 | -1.274891E-02 | -3.133453E-03 | 0.000000E+00 |
| 16'21 | 0.000000E+00 | 0.000000E+00 | -3.773747E-02 | -8.459759E-03 | 0.000000E+00 |
| 16'22 | 0.000000E+00 | 0.000000E+00 | -4.690396E-02 | -4.843268E-03 | 0.000000E+00 |
| 16'31 | 0.000000E+00 | 0.000000E+00 | -1.652748E-02 | -1.666253E-03 | -2.474975E-03 |
| 16'32 | 0.000000E+00 | 0.000000E+00 | -2.085469E-02 | -1.390179E-02 | 7.116136E-03 |
| 16'41 | 0.000000E+00 | 0.000000E+00 | -4.273215E-02 | -2.108480E-03 | 1.382303E-03 |
| 16'42 | 0.000000E+00 | 0.000000E+00 | -3.348428E-02 | 1.601660E-02 | -7.345982E-03 |
| 16'51 | 0.000000E+00 | 0.000000E+00 | -6.315825E-02 | 9.712563E-03 | -1.302928E-03 |
| 16'52 | 0.000000E+00 | 0.000000E+00 | 1.504576E-02 | -7.351787E-03 | -3.339128E-03 |
| 16'61 | 0.000000E+00 | 0.000000E+00 | 4.989455E-02 | -1.527721E-02 | 4.049423E-04 |
| 16'62 | 0.000000E+00 | 0.000000E+00 | 2.278220E-02 | 3.655085E-03 | -8.562282E-04 |
| 16'71 | 0.000000E+00 | 0.000000E+00 | -9.669740E-02 | 1.959437E-02 | -5.772593E-03 |
| 16'72 | 0.000000E+00 | 0.000000E+00 | -4.062488E-02 | 1.603300E-04 | 5.897138E-04 |
| Surface # | $a_{10}$ | $a_{12}$ | $a_{14}$ | $a_{16}$ | |
| 16'11 | 0.000000E+00 | 0.000000E+00 | 0.000000E+00 | 0.000000E+00 | |
| 16'12 | 0.000000E+00 | 0.000000E+00 | 0.000000E+00 | 0.000000E+00 | |
| 16'21 | 0.000000E+00 | 0.000000E+00 | 0.000000E+00 | 0.000000E+00 | |
| 16'22 | 0.000000E+00 | 0.000000E+00 | 0.000000E+00 | 0.000000E+00 | |
| 16'31 | 1.079885E-03 | -8.991804E-05 | -4.380852E-05 | 1.038431E-05 | |
| 16'32 | -7.426468E-04 | 1.024649E-04 | -4.386177E-05 | 1.062316E-05 | |
| 16'41 | 3.320089E-04 | -1.939829E-04 | 1.927528E-05 | 7.221828E-06 | |
| 16'42 | 1.042273E-03 | 4.318728E-05 | -2.148174E-05 | 8.256480E-06 | |
| 16'51 | 1.105114E-03 | 1.591529E-05 | 2.726466E-05 | -1.252997E-05 | |
| 16'52 | 1.655840E-03 | -2.216435E-04 | 5.608510E-05 | -3.160864E-06 | |
| 16'61 | 7.823980E-04 | -1.950205E-04 | 2.738940E-05 | -2.919343E-06 | |
| 16'62 | 1.025988E-03 | -8.431957E-05 | -1.543667E-06 | 6.084121E-07 | |
| 16'71 | 1.340051E-03 | -2.154198E-04 | 1.408996E-05 | -9.824876E-07 | |
| 16'72 | -6.262397E-05 | -9.494817E-06 | 9.108978E-07 | -1.863334E-08 | |

FIG. 69

| Effective focal length (EFL) = 4.063 mm, HFOV (Half field of view) = 38.292deg., TTL = 6.032 mm, Image height= 3.433 mm, Fno = 1.400 | | | | | | | |
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 1700 | Aperture stop | INFINITY | -0.424 | | | | |
| 1711 | 1st lens element | 2.580 | 0.399 | 1.545 | 55.987 | 10.516 | Plastic |
| 1712 | | 4.427 | 0.081 | | | | |
| 1721 | 2nd lens element | 3.131 | 0.226 | 1.661 | 20.412 | -32.300 | Plastic |
| 1722 | | 2.655 | 0.264 | | | | |
| 1731 | 3rd lens element | 3.102 | 0.415 | 1.545 | 55.987 | 9.179 | Plastic |
| 1732 | | 7.752 | 0.103 | | | | |
| 1741 | 4th lens element | 5.537 | 0.248 | 1.661 | 20.412 | -39.088 | Plastic |
| 1742 | | 4.486 | 0.433 | | | | |
| 1751 | 5th lens element | 20.150 | 0.524 | 1.545 | 55.987 | 20.476 | Plastic |
| 1752 | | -24.912 | 0.128 | | | | |
| 1761 | 6th lens element | -3.268 | 0.427 | 1.545 | 55.987 | 13.001 | Plastic |
| 1762 | | -2.341 | 0.706 | | | | |
| 1771 | 7th lens element | 3.202 | 0.843 | 1.545 | 55.987 | 57.659 | Plastic |
| 1772 | | 3.233 | 0.635 | | | | |
| 1781 | IR cut filter | INFINITY | 0.210 | 1.517 | 64.167 | | |
| 1782 | | INFINITY | 0.391 | | | | |
| IM17 | Image plane | INFINITY | 0.000 | | | | |

FIG. 72

| Aspherical parameters | | | | | |
|---|---|---|---|---|---|
| Surface # | K | $a_2$ | $a_4$ | $a_6$ | $a_8$ |
| 17'11 | 0.000000E+00 | 0.000000E+00 | -2.706085E-05 | 7.804337E-04 | 0.000000E+00 |
| 17'12 | 0.000000E+00 | 0.000000E+00 | -1.328349E-03 | -1.798662E-05 | 0.000000E+00 |
| 17'21 | 0.000000E+00 | 0.000000E+00 | -3.158432E-02 | -2.793639E-03 | 0.000000E+00 |
| 17'22 | 0.000000E+00 | 0.000000E+00 | -4.565587E-02 | -4.367474E-03 | 0.000000E+00 |
| 17'31 | 0.000000E+00 | 0.000000E+00 | -1.707346E-02 | -2.901492E-03 | -2.427413E-03 |
| 17'32 | 0.000000E+00 | 0.000000E+00 | -2.040541E-02 | -1.253408E-02 | 7.283162E-03 |
| 17'41 | 0.000000E+00 | 0.000000E+00 | -3.792732E-02 | -1.585155E-03 | 1.597832E-03 |
| 17'42 | 0.000000E+00 | 0.000000E+00 | -3.209615E-02 | 1.623038E-02 | -7.456692E-03 |
| 17'51 | 0.000000E+00 | 0.000000E+00 | -5.984750E-02 | 8.540128E-03 | -1.778098E-03 |
| 17'52 | 0.000000E+00 | 0.000000E+00 | 2.125762E-03 | -5.368855E-03 | -3.622618E-03 |
| 17'61 | 0.000000E+00 | 0.000000E+00 | 7.287114E-02 | -1.933107E-02 | -4.869392E-04 |
| 17'62 | 0.000000E+00 | 0.000000E+00 | 1.667390E-02 | 3.184427E-03 | -1.738179E-03 |
| 17'71 | 0.000000E+00 | 0.000000E+00 | -5.517110E-02 | 1.368218E-02 | -5.870303E-03 |
| 17'72 | 0.000000E+00 | 0.000000E+00 | -8.242095E-03 | -5.049323E-03 | 8.247380E-04 |
| Surface # | $a_{10}$ | $a_{12}$ | $a_{14}$ | $a_{16}$ | |
| 17'11 | 0.000000E+00 | 0.000000E+00 | 0.000000E+00 | 0.000000E+00 | |
| 17'12 | 0.000000E+00 | 0.000000E+00 | 0.000000E+00 | 0.000000E+00 | |
| 17'21 | 0.000000E+00 | 0.000000E+00 | 0.000000E+00 | 0.000000E+00 | |
| 17'22 | 0.000000E+00 | 0.000000E+00 | 0.000000E+00 | 0.000000E+00 | |
| 17'31 | 1.123472E-03 | -3.080310E-05 | -3.837793E-05 | 8.493062E-06 | |
| 17'32 | -7.576012E-04 | 1.411140E-04 | -1.310871E-05 | 2.070202E-05 | |
| 17'41 | 3.601569E-04 | -1.909352E-04 | 2.513972E-05 | 1.046646E-05 | |
| 17'42 | 1.039970E-03 | 4.370590E-05 | -1.331654E-05 | 6.102766E-06 | |
| 17'51 | 9.886702E-04 | -2.317245E-05 | 1.900358E-05 | -7.181048E-06 | |
| 17'52 | 1.491640E-03 | -3.094584E-04 | 3.203079E-05 | -1.589559E-06 | |
| 17'61 | 7.188316E-04 | -2.003159E-04 | 2.949730E-05 | -2.173700E-06 | |
| 17'62 | 8.450971E-04 | -1.023213E-04 | 5.843371E-06 | 4.087482E-06 | |
| 17'71 | 1.364315E-03 | -1.925031E-04 | 1.694223E-05 | -6.680580E-07 | |
| 17'72 | -2.445935E-05 | -8.055929E-06 | 7.873040E-07 | -2.572999E-08 | |

FIG. 73

| Effective focal length (EFL) = 3.821 mm, HFOV (Half field of view) = 38.287deg., TTL = 5.861 mm, Image height= 3.088 mm, Fno = 1.400 | | | | | | | |
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 18'00 | Aperture stop | INFINITY | -0.287 | | | | |
| 18'11 | 1st lens element | 2.809 | 0.408 | 1.545 | 55.987 | 11.331 | Plastic |
| 18'12 | | 4.879 | 0.089 | | | | |
| 18'21 | 2nd lens element | 3.952 | 0.231 | 1.661 | 20.412 | -15.634 | Plastic |
| 18'22 | | 2.799 | 0.053 | | | | |
| 18'31 | 3rd lens element | 3.934 | 0.398 | 1.545 | 55.987 | 11.049 | Plastic |
| 18'32 | | 10.897 | 0.030 | | | | |
| 18'41 | 4th lens element | 5.870 | 0.191 | 1.661 | 20.412 | -64.498 | Plastic |
| 18'42 | | 5.098 | 0.298 | | | | |
| 18'51 | 5th lens element | 68.235 | 0.358 | 1.545 | 55.987 | 12.118 | Plastic |
| 18'52 | | -7.317 | 0.127 | | | | |
| 18'61 | 6th lens element | -3.948 | 0.538 | 1.545 | 55.987 | 7.369 | Plastic |
| 18'62 | | -2.089 | 1.946 | | | | |
| 18'71 | 7th lens element | 3.380 | 0.219 | 1.545 | 55.987 | 172.536 | Plastic |
| 18'72 | | 3.425 | 0.589 | | | | |
| 18'81 | IR cut filter | INFINITY | 0.210 | 1.517 | 64.167 | | |
| 18'82 | | INFINITY | 0.177 | | | | |
| IM18 | Image plane | INFINITY | 0.000 | | | | |

FIG. 76

| Aspherical parameters | | | | | |
|---|---|---|---|---|---|
| Surface # | K | $a_2$ | $a_4$ | $a_6$ | $a_8$ |
| 18'11 | 0.000000E+00 | 0.000000E+00 | -9.002371E-03 | -8.827032E-04 | 0.000000E+00 |
| 18'12 | 0.000000E+00 | 0.000000E+00 | -1.237439E-02 | -4.696528E-03 | 0.000000E+00 |
| 18'21 | 0.000000E+00 | 0.000000E+00 | -3.401129E-02 | -6.829494E-03 | 0.000000E+00 |
| 18'22 | 0.000000E+00 | 0.000000E+00 | -4.826812E-02 | -5.456422E-03 | 0.000000E+00 |
| 18'31 | 0.000000E+00 | 0.000000E+00 | -1.744420E-02 | -1.819163E-03 | -2.577923E-03 |
| 18'32 | 0.000000E+00 | 0.000000E+00 | -2.096240E-02 | -1.422637E-02 | 7.050111E-03 |
| 18'41 | 0.000000E+00 | 0.000000E+00 | -4.227331E-02 | -1.760107E-03 | 1.348794E-03 |
| 18'42 | 0.000000E+00 | 0.000000E+00 | -3.297097E-02 | 1.571569E-02 | -7.402550E-03 |
| 18'51 | 0.000000E+00 | 0.000000E+00 | -6.251412E-02 | 9.934889E-03 | -1.263226E-03 |
| 18'52 | 0.000000E+00 | 0.000000E+00 | 1.142578E-02 | -7.659963E-03 | -3.406973E-03 |
| 18'61 | 0.000000E+00 | 0.000000E+00 | 5.149294E-02 | -1.496311E-02 | 4.505824E-04 |
| 18'62 | 0.000000E+00 | 0.000000E+00 | 1.839752E-02 | 3.192430E-03 | -8.746319E-04 |
| 18'71 | 0.000000E+00 | 0.000000E+00 | -5.571849E-02 | 1.368252E-02 | -5.673072E-03 |
| 18'72 | 0.000000E+00 | 0.000000E+00 | -1.331843E-03 | -6.119619E-03 | 8.808820E-04 |
| Surface # | $a_{10}$ | $a_{12}$ | $a_{14}$ | $a_{16}$ | |
| 18'11 | 0.000000E+00 | 0.000000E+00 | 0.000000E+00 | 0.000000E+00 | |
| 18'12 | 0.000000E+00 | 0.000000E+00 | 0.000000E+00 | 0.000000E+00 | |
| 18'21 | 0.000000E+00 | 0.000000E+00 | 0.000000E+00 | 0.000000E+00 | |
| 18'22 | 0.000000E+00 | 0.000000E+00 | 0.000000E+00 | 0.000000E+00 | |
| 18'31 | 1.048369E-03 | -8.701933E-05 | -4.370096E-05 | 1.076488E-05 | |
| 18'32 | -7.503998E-04 | 9.829200E-05 | -4.483492E-05 | 1.026308E-05 | |
| 18'41 | 3.142660E-04 | -1.973553E-04 | 2.053730E-05 | 7.753520E-06 | |
| 18'42 | 1.028828E-03 | 3.478164E-05 | -2.344737E-05 | 7.696509E-06 | |
| 18'51 | 1.117147E-03 | 1.786664E-05 | 2.727327E-05 | -1.254078E-05 | |
| 18'52 | 1.651755E-03 | -2.188061E-04 | 5.744109E-05 | -3.042305E-06 | |
| 18'61 | 7.737971E-04 | -1.996714E-04 | 2.525968E-05 | -2.762825E-06 | |
| 18'62 | 1.050410E-03 | -7.596821E-05 | -1.448515E-06 | 1.559287E-06 | |
| 18'71 | 1.387756E-03 | -1.926747E-04 | 1.649219E-05 | -7.436114E-07 | |
| 18'72 | -3.344501E-05 | -4.432021E-06 | 7.449014E-07 | -5.295166E-08 | |

FIG. 77

| Embodiment | 1st | 2nd | 3rd | 4th | 5th | 6th | 7th | 8th | 9th |
|---|---|---|---|---|---|---|---|---|---|
| EFL | 4.045 | 4.331 | 3.373 | 4.455 | 4.111 | 3.866 | 4.073 | 4.181 | 4.037 |
| T1 | 0.227 | 0.288 | 0.348 | 0.632 | 0.365 | 0.194 | 0.301 | 0.282 | 0.266 |
| G12 | 0.240 | 0.118 | 0.188 | 0.107 | 0.140 | 0.205 | 0.307 | 0.003 | 0.142 |
| T2 | 0.196 | 0.239 | 0.373 | 0.240 | 0.204 | 0.259 | 0.324 | 0.239 | 0.247 |
| G23 | 0.056 | 0.045 | 0.166 | 0.042 | 0.100 | 0.049 | 0.052 | 0.150 | 0.149 |
| T3 | 0.640 | 0.633 | 0.611 | 0.650 | 0.951 | 1.050 | 0.839 | 1.122 | 0.708 |
| G34 | 0.174 | 0.044 | 0.155 | 0.094 | 0.102 | 0.001 | 0.300 | 0.016 | 0.055 |
| T4 | 0.132 | 0.193 | 0.320 | 0.146 | 0.306 | 0.275 | 0.160 | 0.324 | 0.292 |
| G45 | 0.607 | 0.354 | 0.622 | 0.432 | 0.455 | 0.368 | 0.182 | 0.395 | 0.495 |
| T5 | 0.366 | 0.395 | 0.465 | 0.382 | 0.519 | 0.459 | 0.625 | 0.602 | 0.503 |
| G56 | 0.219 | 0.176 | 0.357 | 0.243 | 0.131 | 0.150 | 0.193 | 0.263 | 0.024 |
| T6 | 0.557 | 0.500 | 0.991 | 0.470 | 0.811 | 0.907 | 0.891 | 0.584 | 0.733 |
| G67 | 1.436 | 1.024 | 0.703 | 1.424 | 1.306 | 1.484 | 1.202 | 1.390 | 2.305 |
| T7 | 0.263 | 0.322 | 0.813 | 0.200 | 0.718 | 0.181 | 0.450 | 0.409 | 0.196 |
| G7F | 0.200 | 0.240 | 0.197 | 0.357 | 0.350 | 0.210 | 0.457 | 0.247 | 0.200 |
| TF | 0.289 | 0.289 | 0.289 | 0.289 | 0.289 | 0.289 | 0.289 | 0.289 | 0.289 |
| GFP | 0.116 | 0.400 | 0.275 | 0.057 | 0.031 | 0.033 | 0.026 | 0.299 | 0.068 |
| BFL | 0.605 | 0.929 | 0.761 | 0.703 | 0.670 | 0.532 | 0.772 | 0.834 | 0.556 |
| ALT | 2.380 | 2.570 | 3.922 | 2.721 | 3.873 | 3.325 | 3.591 | 3.562 | 2.946 |
| AAG | 2.733 | 1.761 | 2.191 | 2.340 | 2.233 | 2.256 | 2.236 | 2.217 | 3.170 |
| TL | 5.113 | 4.331 | 6.113 | 5.062 | 6.106 | 5.581 | 5.827 | 5.779 | 6.116 |
| TTL | 5.718 | 5.260 | 6.874 | 5.764 | 6.776 | 6.113 | 6.598 | 6.613 | 6.673 |
| EFL/ALT | 1.700 | 1.685 | 0.860 | 1.637 | 1.061 | 1.163 | 1.134 | 1.174 | 1.370 |
| EFL/ImgH | 1.293 | 1.782 | 0.950 | 0.967 | 1.351 | 1.316 | 1.338 | 1.233 | 1.392 |
| TTL/ImgH | 1.827 | 2.165 | 1.936 | 1.251 | 2.227 | 2.081 | 2.167 | 1.950 | 2.300 |
| TL/AAG | 1.871 | 2.460 | 2.790 | 2.163 | 2.735 | 2.474 | 2.606 | 2.607 | 1.929 |
| (T1+T4+T7)/T2 | 3.177 | 3.366 | 3.972 | 4.081 | 6.798 | 2.512 | 2.811 | 4.250 | 3.047 |
| (T1+T4+T7)/T5 | 1.699 | 2.031 | 3.188 | 2.559 | 2.678 | 1.416 | 1.457 | 1.688 | 1.499 |
| (G23+T4+G45)/(G12+T2) | 1.823 | 1.662 | 1.977 | 1.785 | 2.504 | 1.492 | 0.624 | 3.599 | 2.405 |
| (G23+T4+G45)/(G34+T4) | 2.595 | 2.499 | 2.331 | 2.585 | 2.111 | 2.509 | 0.855 | 2.553 | 2.700 |
| (G23+G45+T5+G56)/T1 | 5.492 | 3.369 | 4.627 | 1.737 | 3.301 | 5.276 | 3.493 | 4.997 | 4.396 |
| (G23+G45+T5+G56)/T7 | 4.751 | 3.016 | 1.980 | 5.480 | 1.678 | 5.658 | 2.340 | 3.447 | 5.988 |
| (T1+T2+T3+T4+T5)/T6 | 2.801 | 3.496 | 2.136 | 4.359 | 2.891 | 2.468 | 2.523 | 4.399 | 2.751 |
| (T1+T2+T4+T5+T6)/T3 | 2.310 | 2.552 | 4.085 | 2.875 | 2.320 | 1.994 | 2.746 | 1.810 | 2.883 |
| (G12+G23+G34+BFL)/T2 | 5.496 | 4.758 | 3.404 | 3.942 | 4.950 | 3.037 | 4.412 | 4.200 | 3.644 |
| (G12+G23+G34+BFL)/T5 | 2.940 | 2.871 | 2.732 | 2.472 | 1.950 | 1.711 | 2.287 | 1.668 | 1.792 |
| ALT/G67 | 1.657 | 2.510 | 5.579 | 1.911 | 2.966 | 2.240 | 2.987 | 2.563 | 1.278 |
| (AAG+BFL)/G67 | 2.324 | 2.627 | 4.199 | 2.137 | 2.223 | 1.878 | 2.501 | 2.195 | 1.616 |
| ALT*Fno/(T3+G34) | 4.094 | 5.317 | 7.166 | 5.119 | 5.154 | 4.431 | 4.415 | 4.381 | 5.406 |
| ALT*Fno/(G12+T6) | 4.179 | 5.821 | 4.658 | 6.598 | 5.704 | 4.190 | 4.196 | 8.499 | 4.714 |

FIG. 78A

| Embodiment | 10th | 11th | 12th | 13rd | 14th | 15th | 16th | 17th | 18th |
|---|---|---|---|---|---|---|---|---|---|
| EFL | 4.166 | 4.160 | 4.194 | 3.572 | 4.158 | 3.889 | 3.650 | 4.063 | 3.821 |
| T1 | 0.893 | 0.272 | 0.395 | 0.234 | 0.356 | 0.352 | 0.980 | 0.399 | 0.408 |
| G12 | 0.101 | 0.080 | 0.096 | 0.330 | 0.215 | 0.368 | 0.383 | 0.081 | 0.089 |
| T2 | 0.259 | 0.242 | 0.308 | 0.232 | 0.255 | 0.236 | 0.236 | 0.226 | 0.231 |
| G23 | 0.066 | 0.126 | 0.113 | 0.051 | 0.157 | 0.256 | 0.015 | 0.264 | 0.053 |
| T3 | 0.669 | 0.846 | 0.570 | 1.194 | 0.452 | 0.487 | 0.508 | 0.415 | 0.398 |
| G34 | 0.118 | 0.254 | 0.023 | 0.009 | 0.113 | 0.256 | 0.067 | 0.103 | 0.030 |
| T4 | 0.233 | 0.250 | 0.322 | 0.591 | 0.228 | 0.091 | 0.197 | 0.248 | 0.191 |
| G45 | 0.288 | 0.391 | 0.494 | 0.436 | 0.299 | 0.408 | 0.397 | 0.433 | 0.298 |
| T5 | 0.284 | 0.282 | 0.333 | 0.511 | 0.384 | 0.398 | 0.310 | 0.524 | 0.358 |
| G56 | 0.076 | 0.167 | 0.153 | 0.187 | 0.090 | 0.640 | 0.073 | 0.128 | 0.127 |
| T6 | 1.078 | 1.149 | 1.123 | 0.816 | 0.641 | 0.408 | 0.508 | 0.427 | 0.538 |
| G67 | 1.391 | 1.160 | 1.203 | 1.110 | 0.763 | 1.436 | 0.717 | 0.706 | 1.946 |
| T7 | 0.236 | 0.483 | 0.679 | 0.237 | 0.416 | 0.320 | 0.177 | 0.843 | 0.219 |
| G7F | 0.178 | 0.384 | 0.250 | 0.500 | 0.589 | 0.400 | 0.589 | 0.635 | 0.589 |
| TF | 0.289 | 0.289 | 0.289 | 0.210 | 0.210 | 0.210 | 0.210 | 0.210 | 0.210 |
| GFP | 0.275 | 0.275 | 0.275 | 0.083 | 0.090 | 0.084 | 0.099 | 0.391 | 0.177 |
| BFL | 0.742 | 0.947 | 0.813 | 0.793 | 0.889 | 0.694 | 0.898 | 1.236 | 0.975 |
| ALT | 3.653 | 3.525 | 3.728 | 3.816 | 2.732 | 2.292 | 2.915 | 3.081 | 2.342 |
| AAG | 2.040 | 2.178 | 2.082 | 2.122 | 1.638 | 3.365 | 1.652 | 1.714 | 2.543 |
| TL | 5.693 | 5.703 | 5.810 | 5.938 | 4.370 | 5.656 | 4.567 | 4.796 | 4.885 |
| TTL | 6.435 | 6.650 | 6.623 | 6.731 | 5.259 | 6.350 | 5.465 | 6.032 | 5.861 |
| EFL/ALT | 1.140 | 1.180 | 1.125 | 0.936 | 1.522 | 1.697 | 1.252 | 1.319 | 1.631 |
| EFL/ImgH | 1.185 | 1.193 | 1.204 | 1.153 | 1.731 | 1.275 | 1.141 | 1.184 | 1.237 |
| TTL/ImgH | 1.831 | 1.907 | 1.901 | 2.172 | 2.189 | 2.082 | 1.708 | 1.757 | 1.898 |
| TL/AAG | 2.790 | 2.618 | 2.790 | 2.798 | 2.668 | 1.681 | 2.765 | 2.798 | 1.921 |
| (T1+T4+T7)/T2 | 5.251 | 4.159 | 4.536 | 4.571 | 3.926 | 3.239 | 5.729 | 6.595 | 3.551 |
| (T1+T4+T7)/T5 | 4.790 | 3.569 | 4.195 | 2.079 | 2.608 | 1.920 | 4.361 | 2.841 | 2.289 |
| (G23+T4+G45)/(G12+T2) | 1.631 | 2.380 | 2.302 | 1.916 | 1.454 | 1.252 | 0.983 | 3.079 | 1.700 |
| (G23+T4+G45)/(G34+T4) | 1.674 | 1.520 | 2.693 | 1.796 | 2.006 | 2.179 | 2.304 | 2.697 | 2.456 |
| (G23+G45+T5+G56)/T1 | 0.801 | 3.550 | 2.769 | 5.062 | 2.609 | 4.832 | 0.811 | 3.382 | 2.049 |
| (G23+G45+T5+G56)/T7 | 3.030 | 1.998 | 1.610 | 4.995 | 2.234 | 5.322 | 4.499 | 1.600 | 3.813 |
| (T1+T2+T3+T4+T5)/T6 | 2.169 | 1.647 | 1.716 | 3.387 | 2.613 | 3.834 | 4.394 | 4.247 | 2.945 |
| (T1+T2+T4+T5+T6)/T3 | 4.106 | 2.593 | 4.351 | 1.998 | 4.119 | 3.050 | 4.389 | 4.391 | 4.340 |
| (G12+G23+G34+BFL)/T2 | 3.959 | 5.825 | 3.400 | 5.087 | 5.393 | 6.677 | 5.773 | 7.454 | 4.975 |
| (G12+G23+G34+BFL)/T5 | 3.612 | 4.998 | 3.145 | 2.313 | 3.583 | 3.957 | 4.395 | 3.211 | 3.207 |
| ALT/G67 | 2.626 | 3.040 | 3.099 | 3.439 | 3.580 | 1.596 | 4.066 | 4.366 | 1.204 |
| (AAG+BFL)/G67 | 2.000 | 2.696 | 2.407 | 2.627 | 3.311 | 2.827 | 3.556 | 4.180 | 1.808 |
| ALT*Fno/(T3+G34) | 6.496 | 4.483 | 8.799 | 4.442 | 6.764 | 4.321 | 7.089 | 8.330 | 7.674 |
| ALT*Fno/(G12+T6) | 4.338 | 4.013 | 4.282 | 4.662 | 4.467 | 4.134 | 4.583 | 8.500 | 5.233 |

FIG. 78B

OPTICAL IMAGING LENS

CROSS-REFERENCE TO RELATED APPLICATIONS

This application is a continuation of U.S. patent application Ser. No. 18/511,087 titled "Optical Imaging Lens," filed on Nov. 16, 2023, which is a continuation of U.S. patent application Ser. No. 18/060,664 titled "Optical Imaging Lens," filed on Dec. 1, 2022, which is a continuation of U.S. patent application Ser. No. 17/032,659 titled "Optical Imaging Lens," filed on Sep. 25, 2020, which is a continuation of U.S. patent application Ser. No. 16/567,208 titled "Optical Imaging Lens," filed on Sep. 11, 2019.

TECHNICAL FIELD

The present disclosure relates to an optical imaging lens, and particularly, to an optical imaging lens having at least seven lens elements.

BACKGROUND

Technologies of mobile electronic products are constantly improving. As a result, optical imaging lens have developed in different ways. In some cases, there may be a demand for improved imaging quality of an optical imaging lens. There may also be demands for bigger apertures and field of views. Currently, an optical imaging lens used in a mobile phone may have an Fno range of about 1.7~2.6 and a range of field of view about 25 degrees to about 38 degrees. Industry designers have faced difficulties in decreasing the value of Fno to 1.4 or less and increasing the value of field of view to 38 degree or more.

However, a designer cannot simply reduce the thickness of the optical imaging lens to achieve miniaturization while maintaining image quality. Designing an optical imaging lens further involves a host of other considerations, including its material characteristic, production, assembly yield, and other production problems.

SUMMARY

The present disclosure is directed to optical imaging lenses. By designing the convex and/or concave surfaces of at least seven lens elements, the imaging quality and yield may be increased.

In the present disclosure, parameters used herein may be chosen from but not limited to the parameters listed below:

| Parameter | Definition |
|---|---|
| T1 | A thickness of the first lens element along the optical axis |
| G12 | A distance between the first lens element and the second lens element along the optical axis |
| T2 | A thickness of the second lens element along the optical axis |
| G23 | A distance between the second lens element and the third lens element along the optical axis |
| T3 | A thickness of the third lens element along the optical axis |
| G34 | A distance between the third lens element and the fourth lens element along the optical axis |
| T4 | A thickness of the fourth lens element along the optical axis |
| G45 | A distance between the fourth lens element and the fifth lens element along the optical axis |
| T5 | A thickness of the fifth lens element along the optical axis |
| G56 | A distance between the fifth lens element and the sixth lens element along the optical axis |

-continued

| Parameter | Definition |
|---|---|
| T6 | A thickness of the sixth lens element along the optical axis |
| G67 | A distance between the sixth lens element and the seventh lens element along the optical axis |
| G68 | A distance between the sixth lens element and the eighth lens element along the optical axis |
| T8 | A thickness of the eighth lens element along the optical axis |
| G87 | A distance between the eighth lens element and the seventh lens element along the optical axis |
| T7 | A thickness of the seventh lens element along the optical axis |
| G7F | A distance between the seventh lens element and the filtering unit along the optical axis |
| TF | A thickness of the filtering unit along the optical axis |
| GFP | A distance between the filtering unit and the image plane along the optical axis |
| f1 | A focusing length of the first lens element |
| f2 | A focusing length of the second lens element |
| f3 | A focusing length of the third lens element |
| f4 | A focusing length of the fourth lens element |
| f5 | A focusing length of the fifth lens element |
| f6 | A focusing length of the sixth lens element |
| f7 | A focusing length of the seventh lens element |
| f8 | A focusing length of the eighth lens element |
| n1 | A refracting index of the first lens element |
| n2 | A refracting index of the second lens element |
| n3 | A refracting index of the third lens element |
| n4 | A refracting index of the fourth lens element |
| n5 | A refracting index of the fifth lens element |
| n6 | A refracting index of the sixth lens element |
| n7 | A refracting index of the seventh lens element |
| n8 | A refracting index of the eighth lens element |
| V1 | An Abbe number of the first lens element |
| V2 | An Abbe number of the second lens element |
| V3 | An Abbe number of the third lens element |
| V4 | An Abbe number of the fourth lens element |
| V5 | An Abbe number of the fifth lens element |
| V6 | An Abbe number of the sixth lens element |
| V7 | An Abbe number of the seventh lens element |
| V8 | An Abbe number of the eighth lens element |
| HFOV | Half Field of View of the optical imaging lens |
| Fno | F-number of the optical imaging lens |
| EFL | An effective focal length of the optical imaging lens |
| TTL | A distance from the object-side surface of the first lens element to the image plane along the optical axis |
| ALT | A sum of the thicknesses of the first lens element, the second element, the third element, the forth element, the fifth element, the sixth element, and the seventh lens element along the optical axis |
| AAG | A sum of the a distance between the first lens element and the second lens element along the optical axis, a distance between the second lens element and the third lens element along the optical axis, a distance between the third lens element and the fourth lens element along the optical axis, a distance between the fourth lens element and the fifth lens element along the optical axis, a distance between the fifth lens element and the sixth lens element along the optical axis, and a distance between the sixth lens element and the seventh lens element along the optical axis |
| BFL | A back focal length of the optical imaging lens/A distance from the image-side surface of the seventh lens element to the image plane along the optical axis |
| TL | A distance from the object-side surface of the first lens element to the image-side surface of the seventh lens element along the optical axis |
| ImgH | An image height of the optical imaging lens |

According to one embodiment of the present disclosure, an optical imaging lens may comprise a first lens element, a second lens element, a third lens element, a fourth lens element, a fifth lens element, a sixth lens element, an eighth lens element, and a seventh lens element sequentially from an object side to an image side along an optical axis. The first lens element may be arranged to be a lens element in a first order from the object side to the image side. The second lens element may be arranged to be a lens element in a second order from the object side to the image side. The third lens element may be arranged to be a lens element in a third order from the object side to the image side. The fourth lens element may be arranged to be a lens element in a fourth order from the object side to the image side. The fifth lens element may be arranged to be a lens element in a fifth order from the object side to the image side. The sixth lens element may be arranged to be a lens element in a sixth order from the object side to the image side. The seventh lens element may be arranged to be a lens element in a last order from the object side to the image side. The eighth lens element is located between the sixth lens element and the seventh lens element. The first lens element to the seventh lens element each comprises an object-side surface facing toward the object side and allowing imaging rays to pass through and an image-side surface facing toward the image side and allowing the imaging rays to pass through. Lens elements of this optical imaging lens are only the first to eighth lens elements. The image-side surface of the second lens element comprises a concave portion in a vicinity of the optical axis. The fourth lens element has negative refracting power, and the object-side surface of the fourth lens element comprises a concave portion in a vicinity of a periphery of the fourth lens element. The object-side surface of the fifth lens element comprises a convex portion in a vicinity of the optical axis. The eighth lens element has positive refracting power, the object-side surface of the eighth lens element comprises a concave portion in a vicinity of a periphery of the eighth lens element, and the image-side surface of the eighth lens element comprises a convex portion in a vicinity of the periphery of the eighth lens element. The image-side surface of the seventh lens element comprises a concave portion in a vicinity of the optical axis.

According to another embodiment of the present disclosure, an optical imaging lens may comprise a first lens element, a second lens element, a third lens element, a fourth lens element, a fifth lens element, a sixth lens element, an eighth lens element and a seventh lens element sequentially from an object side to an image side along an optical axis. The first lens element may be arranged to be a lens element in a first order from the object side to the image side. The second lens element may be arranged to be a lens element in a second order from the object side to the image side. The third lens element may be arranged to be a lens element in a third order from the object side to the image side. The fourth lens element may be arranged to be a lens element in a fourth order from the object side to the image side. The fifth lens element may be arranged to be a lens element in a fifth order from the object side to the image side. The sixth lens element may be arranged to be a lens element in a sixth order from the object side to the image side. The seventh lens element may be arranged to be a lens element in a last order from the object side to the image side. The eighth lens element is located between the sixth lens element and the seventh lens element. The first lens element to the seventh lens element each comprises an object-side surface facing toward the object side and allowing imaging rays to pass through and an image-side surface facing toward the image side and allowing the imaging rays to pass through. Lens elements of this optical imaging lens are only the first to eighth lens elements. The object-side surface of the second lens element comprises a convex portion in a vicinity of the optical axis. The image-side surface of the third lens element comprises a convex portion in a vicinity of a periphery of the third lens element. The object-side surface of the fourth lens element comprises a convex portion in a vicinity of the optical axis, and the image-side surface of the fourth lens element comprises a concave portion in a vicinity of the optical axis. The image-side surface of the sixth lens element comprises a convex portion in a vicinity of the optical axis. The eighth lens element has positive refracting power.

According to yet another embodiment of the present disclosure, an optical imaging lens may comprise a first lens element, a second lens element, a third lens element, a fourth lens element, a fifth lens element, a sixth lens element, an eighth lens element, and a seventh lens element sequentially from an object side to an image side along an optical axis. The first lens element may be arranged to be a lens element in a first order from the object side to the image side. The second lens element may be arranged to be a lens element in a second order from the object side to the image side. The third lens element may be arranged to be a lens element in a third order from the object side to the image side. The fourth lens element may be arranged to be a lens element in a fourth order from the object side to the image side. The fifth lens element may be arranged to be a lens element in a fifth order from the object side to the image side. The sixth lens element may be arranged to be a lens element in a sixth order from the object side to the image side. The seventh lens element may be arranged to be a lens element in a last order from the object side to the image side. The eighth lens element is located between the sixth lens element and the seventh lens element. The first lens element to the seventh lens element each comprises an object-side surface facing toward the object side and allowing imaging rays to pass through and an image-side surface facing toward the image side and allowing the imaging rays to pass through. Lens elements of this optical imaging lens are only the first to eighth lens elements. The object-side surface of the second lens element comprises a convex portion in a vicinity of the optical axis. The image-side surface of the third lens element comprises a convex portion in a vicinity of a periphery of the third lens element. The object-side surface of the fourth lens element comprises a convex portion in a vicinity of the optical axis. The image-side surface of the sixth lens element comprises a convex portion in a vicinity of the optical axis. The eighth lens element has positive refracting power, the object-side surface of the eighth lens element comprises a convex portion in a vicinity of the optical axis, and the object-side surface of the eighth lens element comprises a concave portion in a vicinity of a periphery of the eighth lens element.

One embodiment of the optical imaging lens may satisfy any one of inequalities as follows:

| | |
|---|---|
| EFL/ALT ≤ 1.700 | inequality (1); |
| TTL/ImgH ≤ 2.300 | inequality (2); |
| (T1 + T4 + T7)/T2 ≤ 6.800 | inequality (3); |
| (G23 + T4 + G45)/(G12 + T2) ≤ 3.600 | inequality (4); |
| (G23 + G45 + T5 + G56)/T1 ≤ 5.700 | inequality (5); |
| (T1 + T2 + T3 + T4 + T5)/T6 ≤ 4.400 | inequality (6); |
| (G12 + G23 + G34 + BFL)/T2 ≤ 7.500 | inequality (7); |
| ALT/G67 ≤ 5.600 | inequality (8); |
| ALT*Fno/(T3 + G34) ≤ 8.800 | inequality (9); |
| EFL/ImgH ≤ 1.800 | inequality (10); |
| TL/AAG ≤ 2.800 | inequality (11); |
| (T1 + T4 + T7)/T5 ≤ 4.800 | inequality (12); |
| (G23 + T4 + G45)/(G34 + T4) ≤ 2.700 | inequality (13); |
| (G23 + G45 + T5 + G56)/T7 ≤ 6.000 | inequality (14); |
| (T1 + T2 + T4 + T5 + T6)/T3 ≤ 4.400 | inequality (15); |
| (G12 + G23 + G34 + BFL)/T5 ≤ 5.000 | inequality (16); |
| (AAG + BFL)/G67 ≤ 4.200 | inequality (17); and |
| ALT*Fno/(G12 + T6) ≤ 8.500 | inequality (18). |

BRIEF DESCRIPTION OF THE DRAWINGS

Exemplary embodiments will be more readily understood from the following detailed description when read in conjunction with the appended drawing, in which:

FIG. 8 depicts a table of optical data for each lens element of an optical imaging lens of a first embodiment of the present disclosure;

FIG. 9 depicts a table of aspherical data of a first embodiment of an optical imaging lens according to the present disclosure;

FIG. 12 depicts a table of optical data for each lens element of an optical imaging lens of a second embodiment of the present disclosure;

FIG. 13 depicts a table of aspherical data of a second embodiment of the optical imaging lens according to the present disclosure;

FIG. 16 depicts a table of optical data for each lens element of the optical imaging lens of a third embodiment of the present disclosure;

FIG. 17 depicts a table of aspherical data of a third embodiment of the optical imaging lens according to the present disclosure;

FIG. 20 depicts a table of optical data for each lens element of an optical imaging lens of a fourth embodiment of the present disclosure;

FIG. 21 depicts a table of aspherical data of a fourth embodiment of the optical imaging lens according to the present disclosure;

FIG. 24 depicts a table of optical data for each lens element of the optical imaging lens of a fifth embodiment of the present disclosure;

FIG. 25 depicts a table of aspherical data of a fifth embodiment of the optical imaging lens according to the present disclosure;

FIG. 28 depicts a table of optical data for each lens element of a sixth embodiment of an optical imaging lens according to the present disclosure;

FIG. 29 depicts a table of aspherical data of a sixth embodiment of the optical imaging lens according to the present disclosure;

FIG. 32 depicts a table of optical data for each lens element of a seventh embodiment of an optical imaging lens according to the present disclosure;

FIG. 33 depicts a table of aspherical data of a seventh embodiment of the optical imaging lens according to the present disclosure;

FIG. 36 depicts a table of optical data for each lens element of an eighth embodiment of an optical imaging lens according to the present disclosure;

FIG. 37 depicts a table of aspherical data of an eighth embodiment of the optical imaging lens according to the present disclosure;

FIG. 40 depicts a table of optical data for each lens element of a ninth embodiment of an optical imaging lens according to the present disclosure;

FIG. 41 depicts a table of aspherical data of a ninth embodiment of the optical imaging lens according to the present disclosure;

FIG. 44 depicts a table of optical data for each lens element of a tenth embodiment of an optical imaging lens according to the present disclosure;

FIG. 45 depicts a table of aspherical data of a tenth embodiment of the optical imaging lens according to the present disclosure;

FIG. 48 depicts a table of optical data for each lens element of an eleventh embodiment of an optical imaging lens according to the present disclosure;

FIG. 49 depicts a table of aspherical data of an eleventh embodiment of the optical imaging lens according to the present disclosure;

FIG. 52 depicts a table of optical data for each lens element of a twelfth embodiment of an optical imaging lens according to the present disclosure;

FIG. 53 depicts a table of aspherical data of a twelfth embodiment of the optical imaging lens according to the present disclosure;

FIG. 56 depicts a table of optical data for each lens element of a thirteenth embodiment of an optical imaging lens according to the present disclosure;

FIG. 57 depicts a table of aspherical data of a thirteenth embodiment of the optical imaging lens according to the present disclosure;

FIG. 60 depicts a table of optical data for each lens element of a fourteenth embodiment of an optical imaging lens according to the present disclosure;

FIG. 61 depicts a table of aspherical data of a fourteenth embodiment of the optical imaging lens according to the present disclosure;

FIG. 64 depicts a table of optical data for each lens element of a fifteenth embodiment of an optical imaging lens according to the present disclosure;

FIG. 65 depicts a table of aspherical data of a fifteenth embodiment of the optical imaging lens according to the present disclosure;

FIG. 68 depicts a table of optical data for each lens element of a sixteenth embodiment of an optical imaging lens according to the present disclosure;

FIG. 69 depicts a table of aspherical data of a sixteenth embodiment of the optical imaging lens according to the present disclosure;

FIG. 72 depicts a table of optical data for each lens element of a seventeenth embodiment of an optical imaging lens according to the present disclosure;

FIG. 73 depicts a table of aspherical data of a seventeenth embodiment of the optical imaging lens according to the present disclosure;

FIG. 76 depicts a table of optical data for each lens element of a eighteenth embodiment of an optical imaging lens according to the present disclosure;

FIG. 77 depicts a table of aspherical data of a eighteenth embodiment of the optical imaging lens according to the present disclosure;

FIGS. 78A and 78B are value tables reflecting determined values of EFL、T1 、G12 、T2、G23 、T3 、G34 、T4 、G45 、T5 、G56 、T6 、G67 、T7 、G7F 、TF 、GFP、BFL、ALT、AAG、TL、TTL、EFL/ALT、EFL/ImgH 、TTL/ImgH 、TL/ImgH 、TL/AAG 、(T1+T4+T7)/T2、(T1+T4+T7)/T5、(G23+T4+G45)/(G12+T2)、(G23+T4+G45)/(G34+T4) 、(G23+G45+T5+G56)/T1 、(G23+G45+T5+G56)/T7 、(T1+T2+T3+T4+T5)/T6 、(T1+T2+T4+T5+T6)/T3 、(G12+G23+G34+BFL)/T2 、(G12+G23+G34+BFL)/T5 、ALT/G67 、(AAG+BFL)/G67、ALT*Fno/(T3+G34)、ALT*Fno/(G12+T6) as determined in specific example embodiments.

DETAILED DESCRIPTION

Figure 2:
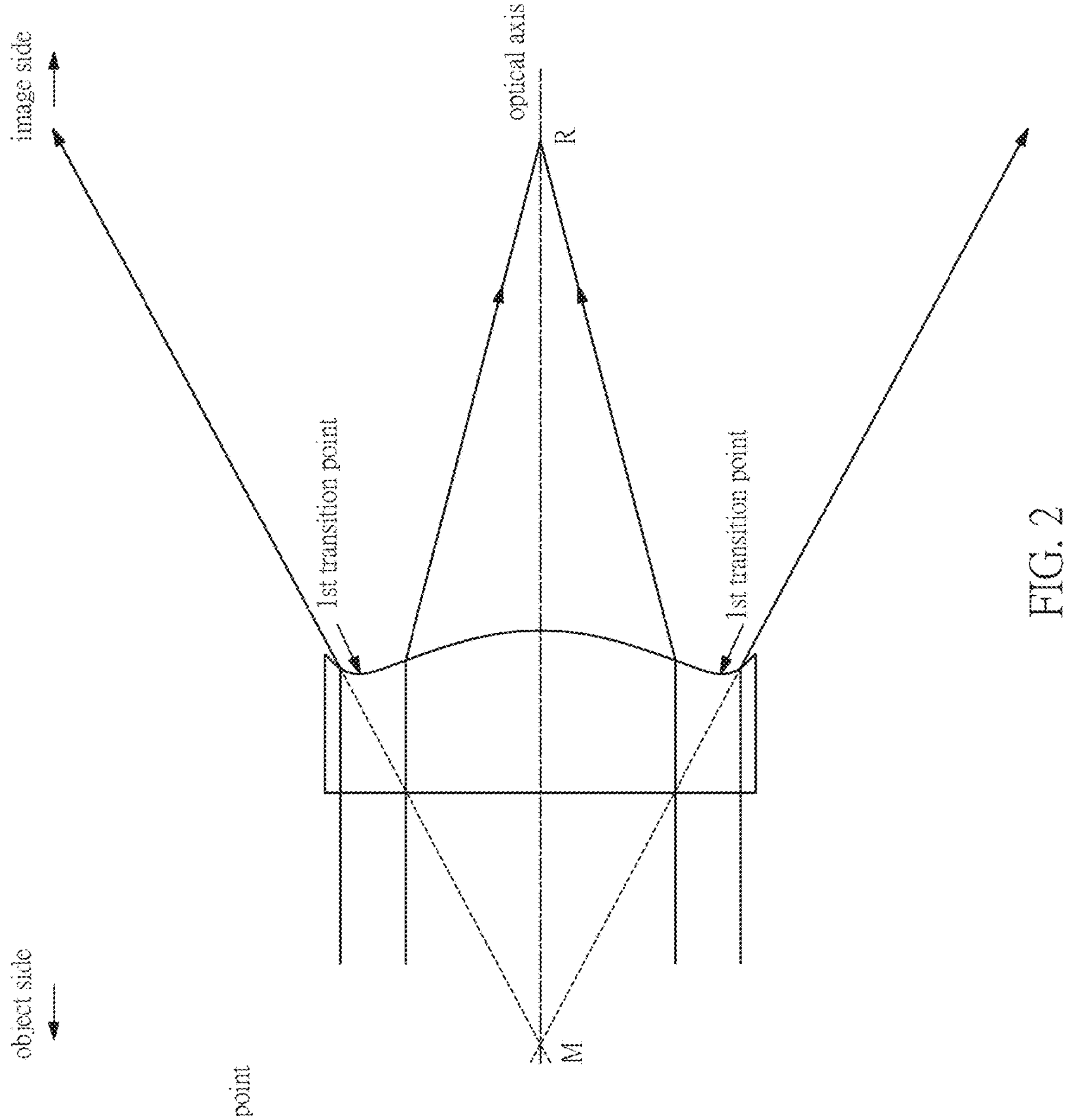
FIG. 2 depicts a schematic view of a relation between a surface shape and an optical focus of a lens element.

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present disclosure. Furthermore, the terminology as used herein is for the purpose of describing example embodiments only and is not intended to be a limitation of the disclosure. In this respect, as used herein, the term "in" may include "in" and "on," and the terms "a," "an," and "the" may include singular and plural references. Furthermore, as used herein, the term "by" may also mean "from," depending on the context. Furthermore, as used herein, the term "if" may also mean "when" or "upon," depending on the context. Furthermore, as used herein, the words "and/or" may refer to and encompass any and all possible combinations of one or more of the associated listed items.

In the present specification, the description "a lens element having positive refracting power (or negative refracting power)" means that the paraxial refracting power of the lens element in Gaussian optics is positive (or negative). The description "An object-side (or image-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element is rotationally symmetric, where the optical axis I is the axis of symmetry. The region A of the lens element is defined as "a portion in a vicinity of the optical axis," and the region C of the lens element is defined as "a portion in a vicinity of a periphery of the lens element." Besides, the lens element may also have an extending part E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted.

The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

Figure 1:
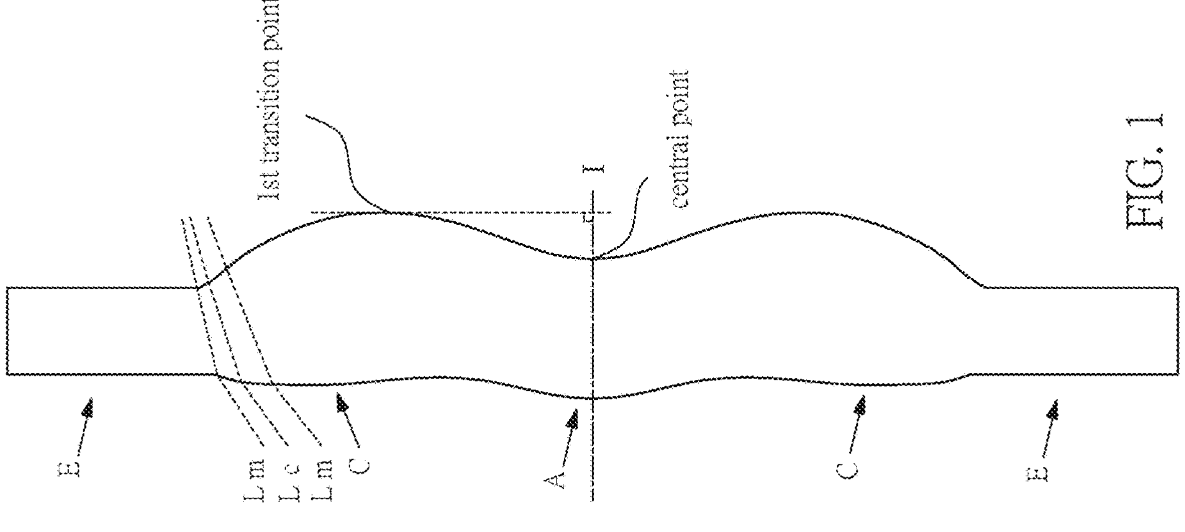
FIG. 1 depicts a cross-sectional view of one single lens element according to one embodiment of the present disclosure.

1. FIG. 1 is a radial cross-sectional view of a lens element. Before determining boundaries of those aforesaid portions, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

2. Referring to FIG. 2, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis I. The shape of that portion can be determined by whether the ray or its extension line meets (intersects) the optical axis (focal point) at the object-side or image-side. For instance, if the ray itself intersects the optical axis at the image side of the lens element after passing through a portion, i.e., the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e., the focal point of the ray is at the object side (see point M in FIG. 2), that portion will be determined as having a concave shape. Therefore, referring to FIG. 2, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value which is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

3. For none transition point cases, the portion in a vicinity of the optical axis is defined as the portion between 0-50% of the effective radius (radius of the clear aperture) of a surface, whereas the portion in a vicinity of a periphery of the lens element is defined as the portion between 50-100% of effective radius (radius of the clear aperture) of the surface.

Figure 3:
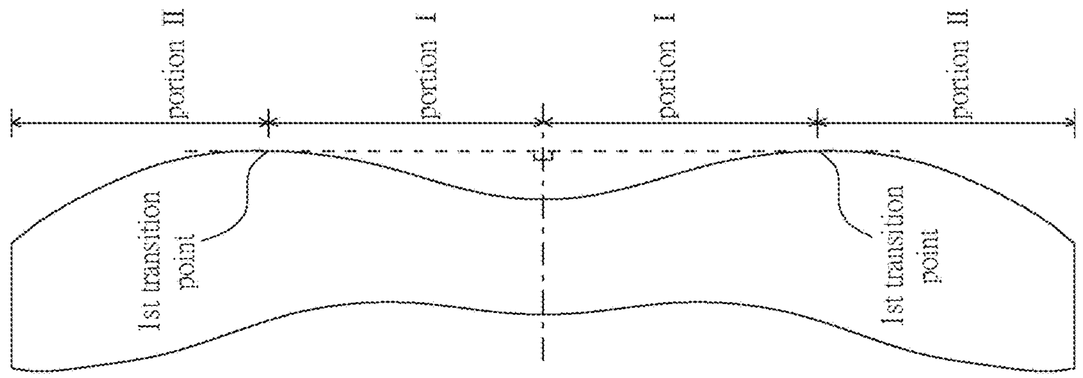
FIG. 3 depicts a schematic view of a first example of a surface shape and an effective radius of a lens element.

Referring to the first example depicted in FIG. 3, only one transition point, namely a first transition point, appears within the clear aperture of the image-side surface of the lens element. Portion I is a portion in a vicinity of the optical axis, and portion II is a portion in a vicinity of a periphery of the lens element. The portion in a vicinity of the optical axis is determined as having a concave surface due to the R value at the image-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Figure 4:
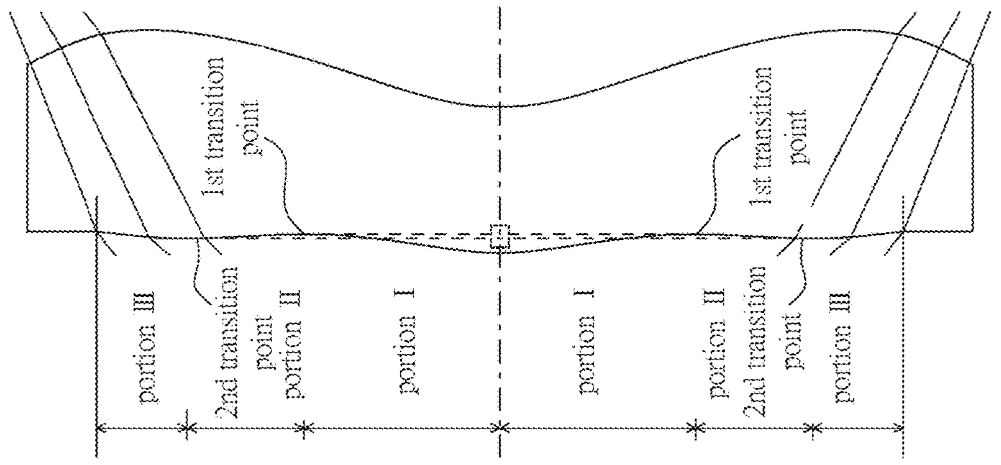
FIG. 4 depicts a schematic view of a second example of a surface shape and an effective radius of a lens element.

Referring to the second example depicted in FIG. 4, a first transition point and a second transition point exist on the object-side surface (within the clear aperture) of a lens element. In which portion I is the portion in a vicinity of the optical axis, and portion III is the portion in a vicinity of a periphery of the lens element. The portion in a vicinity of the optical axis has a convex shape because the R value at the object-side surface of the lens element is positive. The portion in a vicinity of a periphery of the lens element (portion III) has a convex shape. What is more, there is another portion having a concave shape existing between the first and second transition point (portion II).

Figure 5:
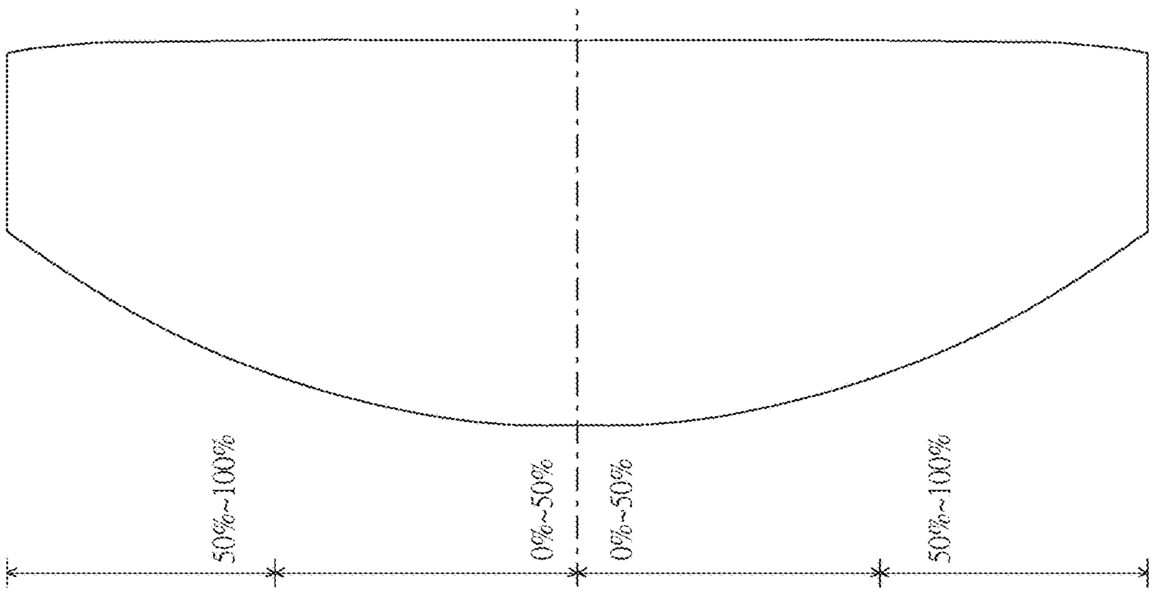
FIG. 5 depicts a schematic view of a third example of a surface shape and an effective radius of a lens element.

Referring to a third example depicted in FIG. 5, no transition point exists on the object-side surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the object-side surface of the lens element is determined as having a convex shape due to its positive R value, and the portion in a vicinity of a periphery of the lens element is determined as having a convex shape as well.

Figure 6:
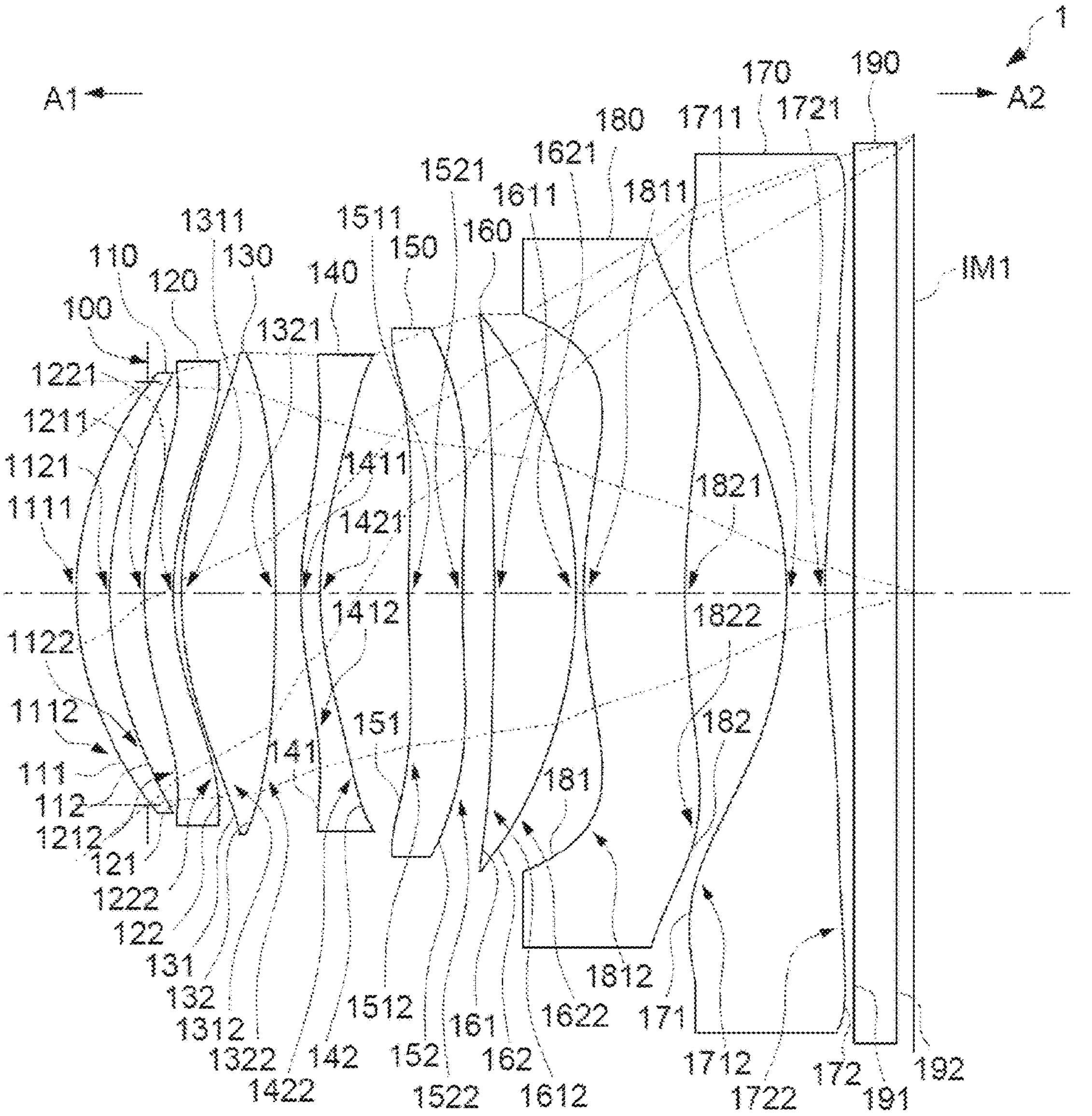
FIG. 6 depicts a cross-sectional view of a first embodiment of an optical imaging lens having eight lens elements according to one embodiment of the present disclosure.
Figure 7:
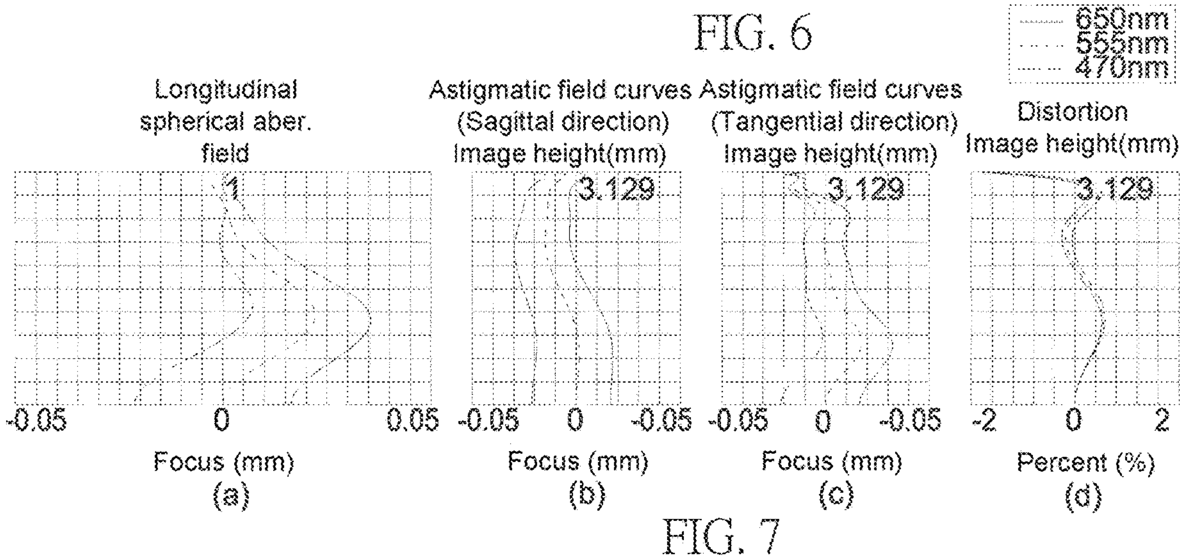
FIG. 7 depicts a chart of longitudinal spherical aberration and other kinds of optical aberrations of a first embodiment of an optical imaging lens according to the present disclosure.

Several exemplary embodiments and associated optical data will now be provided to illustrate non-limiting examples of optical imaging lens systems having good optical characteristics while increasing the field of view. Reference is now made to FIGS. 6-9. FIG. 6 illustrates an example cross-sectional view of an optical imaging lens 1 having eight lens elements according to a first example embodiment. FIG. 7 shows example charts of longitudinal spherical aberration and other kinds of optical aberrations of the optical imaging lens 1 according to the first example embodiment. FIG. 8 illustrates an example table of optical data of each lens element of the optical imaging lens 1 according to the first example embodiment. FIG. 9 depicts an example table of aspherical data of the optical imaging lens 1 according to the first example embodiment.

As shown in FIG. 6, the optical imaging lens 1 of the present embodiment may comprise, in order from an object side A1 to an image side A2 along an optical axis, an aperture stop 100, a first lens element 110, a second lens element 120, a third lens element 130, a fourth lens element 140, a fifth lens element 150 a sixth lens element 160, an eighth lens element 180 and a seventh lens element 170, the first lens element 110 being arranged to be a lens element having refracting power in a first order from the object side A1 to the image side A2, the second lens element 120 being arranged to be a lens element having refracting power in a second order from the object side A1 to the image side A2, the third lens element 130 being arranged to be a lens element having refracting power in a third order from the object side A1 to the image side A2, the fourth lens element 140 being arranged to be a lens element having refracting power in a fourth order from the object side A1 to the image side A2, the fifth lens element 150 being arranged to be a lens element having refracting power in a fifth order from the object side A1 to the image side A2, the sixth lens element 160 being arranged to be a lens element having refracting power in a sixth order from the object side A1 to the image side A2, the seventh lens element 170 being arranged to be a lens element having refracting power in a last order from the object side A1 to the image side A2 and the eighth lens element 180 may disposed between the sixth lens element 160 and the seventh lens element 170. A filtering unit 190 and an image plane IM1 of an image sensor (not shown) may be positioned at the image side A2 of the optical imaging lens 1. Each of the first, second, third, fourth, fifth sixth, seventh and eighth lens elements 110, 120, 130, 140, 150, 160, 170, 180 and the filtering unit 190 may comprise an object-side surface 111/121/131/141/151/161/171/181/191 facing toward the object side A1 and an image-side surface 112/122/132/142/152/162/172/182/192 facing toward the image side A2. The example embodiment of the filtering unit 190 illustrated may be an IR cut filter (infrared cut filter) positioned between the seventh lens element 170 and the image plane IM1. The filtering unit 190 may selectively absorb light passing optical imaging lens 1 that has a specific wavelength. For example, if IR light is absorbed, IR light which is not seen by human eyes may be prohibited from producing an image on the image plane IM1.

Exemplary embodiments of each lens element of the optical imaging lens 1 will now be described with reference to the drawings. The lens elements of the optical imaging lens 1 may be constructed using plastic materials in this embodiment.

An example embodiment of the first lens element 110 may have positive refracting power. The object-side surface 111 may comprise a convex portion 1111 in a vicinity of an optical axis and a convex portion 1112 in a vicinity of a periphery of the first lens element 110. The image-side surface 112 may comprise a concave portion 1121 in a vicinity of the optical axis and a concave portion 1122 in a vicinity of the periphery of the first lens element 110.

An example embodiment of the second lens element 120 may have negative refracting power. The object-side surface 121 may comprise a convex portion 1211 in a vicinity of the optical axis and a concave portion 1212 in a vicinity of a periphery of the second lens element 120. The image-side surface 122 may comprise a concave portion 1221 in a vicinity of the optical axis and a convex portion 1222 in a vicinity of the periphery of the second lens element 120.

An example embodiment of the third lens element 130 may have positive refracting power. The object-side surface 131 may comprise a convex portion 1311 in a vicinity of the optical axis and a convex portion 1312 in a vicinity of a periphery of the third lens element 130. The image-side surface 132 may comprise a convex portion 1321 in a vicinity of the optical axis and a convex portion 1322 in a vicinity of the periphery of the third lens element 130.

An example embodiment of the fourth lens element 140 may have negative refracting power. The object-side surface 141 may comprise a convex portion 1411 in a vicinity of the optical axis and a concave portion 1412 in a vicinity of a periphery of the fourth lens element 140. The image-side surface 142 may comprise a concave portion 1421 in a vicinity of the optical axis and a concave portion 1422 in a vicinity of the periphery of the fourth lens element 140.

An example embodiment of the fifth lens element 150 may have negative refracting power. The object-side surface 151 may comprise a convex portion 1511 in a vicinity of the optical axis and a concave portion 1512 in a vicinity of a periphery of the fifth lens element 150. The image-side surface 152 may comprise a concave portion 1521 in a vicinity of the optical axis and a convex portion 1522 in a vicinity of the periphery of the fifth lens element 150.

An example embodiment of the sixth lens element 160 may have positive refracting power. The object-side surface 161 may comprise a concave portion 1611 in a vicinity of the optical axis and a concave portion 1612 in a vicinity of a periphery of the sixth lens element 160. The image-side surface 162 may comprise a convex portion 1621 in a vicinity of the optical axis and a convex portion 1622 in a vicinity of the periphery of the sixth lens element 160.

An example embodiment of the eighth lens element 180 may have positive refracting power. The object-side surface 181 may comprise a convex portion 1811 in a vicinity of the optical axis and a concave portion 1812 in a vicinity of a periphery of the eighth lens element 180. The image-side surface 182 may comprise a concave portion 1821 in a vicinity of the optical axis and a convex portion 1822 in a vicinity of the periphery of the eighth lens element 180.

An example embodiment of the seventh lens element 170 may have negative refracting power. The object-side surface 171 may comprise a concave portion 1711 in a vicinity of the optical axis and a convex portion 1712 in a vicinity of a periphery of the seventh lens element 170. The image-side surface 172 may comprise a concave portion 1721 in a vicinity of the optical axis and a convex portion 1722 in a vicinity of the periphery of the seventh lens element 170.

The aspherical surfaces including the object-side surface 111 and the image-side surface 112 of the first lens element 110, the object-side surface 121 and the image-side surface 122 of the second lens element 120, the object-side surface 131 and the image-side surface 132 of the third lens element 130, the object-side surface 141 and the image-side surface 142 of the fourth lens element 140, the object-side surface 151 and the image-side surface 152 of the fifth lens element 150, the object-side surface 161 and the image-side surface 162 of the sixth lens element 160, the object-side surface 171 and the image-side surface 172 of the seventh lens element 170, and the object-side surface 181 and the image-side surface 182 of the eighth lens element 180 may all be defined by the following aspherical formula (1):

$$Z(Y) = \frac{Y^2}{R}\Bigg/\left(1 + \sqrt{1 - (1+K)\frac{Y^2}{R^2}}\right) + \sum_{i=1}^{n} a_{2i} \times Y^{2i} \quad \text{formula (1)}$$

wherein,

R represents the radius of curvature of the surface of the lens element;

Z represents the depth of the aspherical surface (i.e., the perpendicular distance between the point of the aspherical surface at a distance Y from the optical axis and the tangent plane of the vertex on the optical axis of the aspherical surface);

Y represents the perpendicular distance between the point of the aspherical surface and the optical axis;

K represents a conic constant; and $a_{2i}$ represents an aspherical coefficient of $2i^{th}$ level.

Values of each aspherical parameter are shown in FIG. 9.

FIG. 7(*a*) shows the longitudinal spherical aberration, wherein the horizontal axis of FIG. 7(*a*) defines the focus, and wherein the vertical axis of FIG. 7(*a*) defines the field of view. FIG. 7(*b*) shows the astigmatism aberration in the sagittal direction, wherein the horizontal axis of FIG. 7(*b*) defines the focus, and wherein the vertical axis of FIG. 7(*b*) defines the image height. FIG. 7(*c*) shows the astigmatism aberration in the tangential direction, wherein the horizontal axis of FIG. 7(*c*) defines the focus, and wherein the vertical axis of FIG. 7(*c*) defines the image height. FIG. 7(*d*) shows a variation of the distortion aberration, wherein the horizontal axis of FIG. 7(*d*) defines the percentage, and wherein the vertical axis of FIG. 7(*d*) defines the image height. The three curves with different wavelengths (470 nm, 555 nm, 650 nm) may represent that off-axis light with respect to these wavelengths may be focused around an image point. From the vertical deviation of each curve shown in FIG. 7(*a*), the offset of the off-axis light relative to the image point may be within about ±0.04 mm. Therefore, the first embodiment may improve the longitudinal spherical aberration with respect to different wavelengths. Referring to FIG. 7(*b*), the focus variation with respect to the three different wavelengths (470 nm, 555 nm, 650 nm) in the whole field may fall within about ±0.03 mm. Referring to FIG. 7(*c*), the focus variation with respect to the three different wavelengths (470 nm, 555 nm, 650 nm) in the whole field may fall within about ±0.035 mm. Referring to FIG. 7(*d*), the horizontal axis of FIG. 7(*d*), the variation of the distortion aberration may be within about ±2%.

The distance from the object-side surface 111 of the first lens element 110 to the image plane IM1 along the optical axis (TTL) may be about 5.718 mm, the value of Fno is 1.4, the half field of view (HFOV) is 38.202 degree. In accordance with aberration values described above, the present embodiment may provide an optical imaging lens 1 having a good imaging quality, moreover, the length of the optical imaging lens 1 may be shortened to about 7 mm or less and the optical imaging lens 1 may have a larger aperture and a bigger half field of view.

The values of EFL、T1、G12、T2、G23、T3、G34、T4、G45、T5、G56、T6、G67、T7、G7F、TF、GFP、BFL、ALT、AAG、TL、TTL、EFL/ALT、EFL/ImgH、TTL/ImgH、TL/ImgH、TL/AAG、(T1+T4+T7)/T2、(T1+T4+T7)/T5、(G23+T4+G45)/(G12+T2)、(G23+T4+G45)/(G34+T4)、(G23+G45+T5+G56)/T1、(G23+G45+T5+G56)/T7、(T1+T2+T3+T4+T5)/T6、(T1+T2+T4+T5+T6)/T3、(G12+G23+G34+BFL)/T2、(G12+G23+G34+BFL)/T5、ALT/G67、(AAG+BFL)/G67、ALT*Fno/(T3+G34)、ALT*Fno/(G12+T6) of this embodiment may be referred to FIG. 78A.

Figure 10:
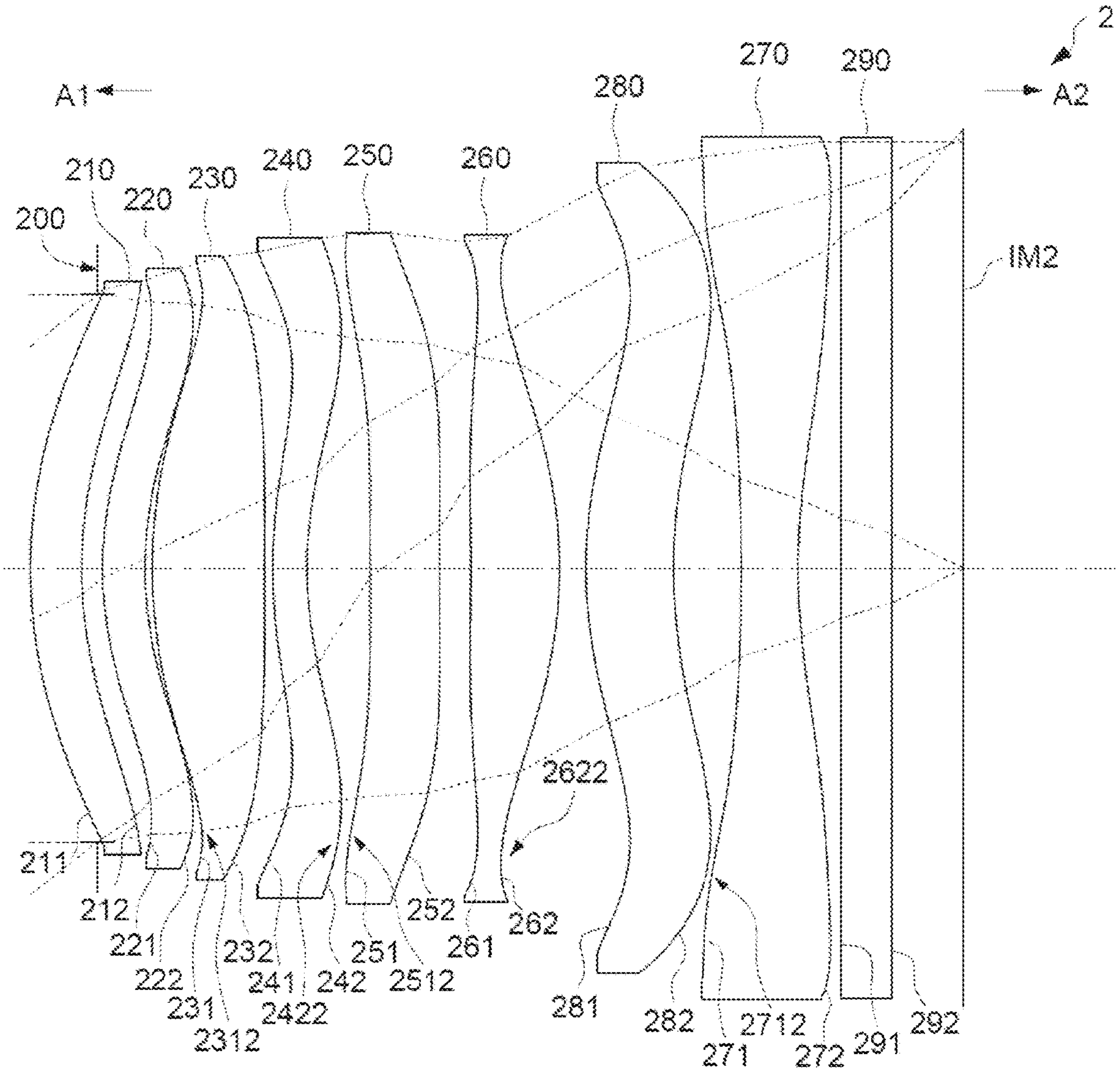
FIG. 10 depicts a cross-sectional view of a second embodiment of an optical imaging lens having eight lens elements according to the present disclosure.
Figure 11:
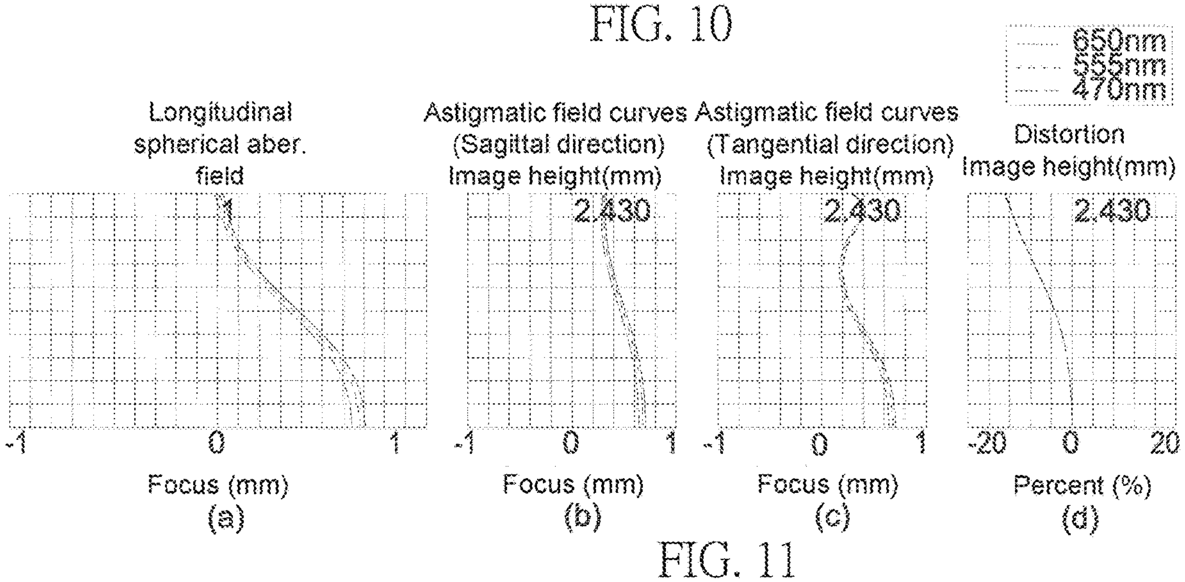
FIG. 11 depicts a chart of longitudinal spherical aberration and other kinds of optical aberrations of a second embodiment of an optical imaging lens according to one embodiment of the present disclosure.

Reference is now made to FIGS. 10-13. FIG. 10 illustrates an example cross-sectional view of an optical imaging lens 2 having eight lens elements according to a second example embodiment. FIG. 11 shows example charts of longitudinal spherical aberration and other kinds of optical aberrations of the optical imaging lens 2 according to the second example embodiment. FIG. 12 shows an example table of optical data of each lens element of the optical imaging lens 2 according to the second example embodiment. FIG. 13 shows an example table of aspherical data of the optical imaging lens 2 according to the second example embodiment. The reference numbers labeled in the present embodiment may be similar to those in the first embodiment for the similar elements, but here the reference numbers may be initialed with 2; for example, reference number 231 may label the object-side surface of the third lens element 230, reference number 232 may label the image-side surface of the third lens element 230, etc.

As shown in FIG. 10, the optical imaging lens 2 of the present embodiment, in an order from an object side A1 to an image side A2 along an optical axis, may comprise an aperture stop 200, a first lens element 210, a second lens element 220, a third lens element 230, a fourth lens element 240, a fifth lens element 250 a sixth lens element 260, an eighth lens element 280 and a seventh lens element 270.

The arrangements of convex or concave surface structures including the object-side surfaces 211, 221, 241, 261, 271 and the image-side surfaces 212, 222, 232, 252, 272, 282 may be generally similar to the optical imaging lens 1, but the differences between the optical imaging lens 1 and the optical imaging lens 2 may include the convex or concave surface structures of the object-side surfaces 231, 251, 271 and image-side surfaces 242, 262. Additional differences may include a radius of curvature, refracting power, a thickness, an aspherical data, and an effective focal length of each lens element. More specifically, the first lens element 210 has negative refracting power, the object-side surface 231 of the third lens element 230 may comprise a concave portion 2312 in a vicinity of a periphery of the third lens element 230, the image-side surface 242 of the fourth lens element 249 may comprise a convex portion 2422 in a vicinity of a periphery of the fourth lens element 240, the object-side surface 251 of the fifth lens element 250 may comprise a convex portion 2512 in a vicinity of a periphery of the fifth lens element 250, the image-side surface 262 of the sixth lens element 260 may comprise a concave portion 2622 in a vicinity of a periphery of the sixth lens element 260, the object-side surface 271 of the seventh lens element 270 may comprise a concave portion 2712 in a vicinity of a periphery of the seventh lens element 270.

Here, in the interest of clearly showing the drawings of a particular embodiment, only the surface shapes which are different from that in the first embodiment may be labeled. Please refer to FIG. 12 for the optical characteristics of each lens element in the optical imaging lens 2 of the present embodiment.

From the vertical deviation of each curve shown in FIG. 11(*a*), the offset of the off-axis light relative to the image point may be within about ±0.75 mm. Referring to FIG. 11(*b*), the focus variation with respect to the three different wavelengths (470 nm, 555 nm, 650 nm) in the whole field may fall within about +0.8 mm. Referring to FIG. 11(*c*), the focus variation with respect to the three different wavelengths (470 nm, 555 nm, 650 nm) in the whole field may fall within about +0.8 mm. Referring to FIG. 11(*d*), the variation of the distortion aberration of the optical imaging lens 2 may be within about +15%.

The values of EFL、T1、G12、T2、G23、T3、G34、T4、G45、T5、G56、T6、G67、T7、G7F、TF、GFP、BFL、ALT、AAG、TL、TTL、EFL/ALT、EFL/ImgH、TTL/ImgH、TL/ImgH、TL/AAG、(T1+T4+T7)/T2、(T1+T4+T7)/T5、(G23+T4+G45)/(G12+T2)、(G23+T4+G45)/(G34+T4)、(G23+G45+T5+G56)/T1、(G23+G45+T5+G56)/T7、(T1+T2+T3+T4+T5)/T6、(T1+T2+T4+T5+T6)/T3、(G12+G23+G34+BFL)/T2、(G12+G23+G34+BFL)/T5、ALT/G67、(AAG+BFL)/G67、ALT*Fno/(T3+G34)、ALT*Fno/(G12+T6) of this embodiment may be referred to FIG. 78A.

In comparison with the first embodiment, this embodiment may have a smaller value of TTL, a larger value of HFOV, and the difference between the thickness in a vicinity of the optical axis and the thickness in a vicinity of a periphery region may be smaller when compared to the first embodiment, so that this embodiment may be manufactured more easily and the yield rate may be higher when compared to the first embodiment.

Figure 14:
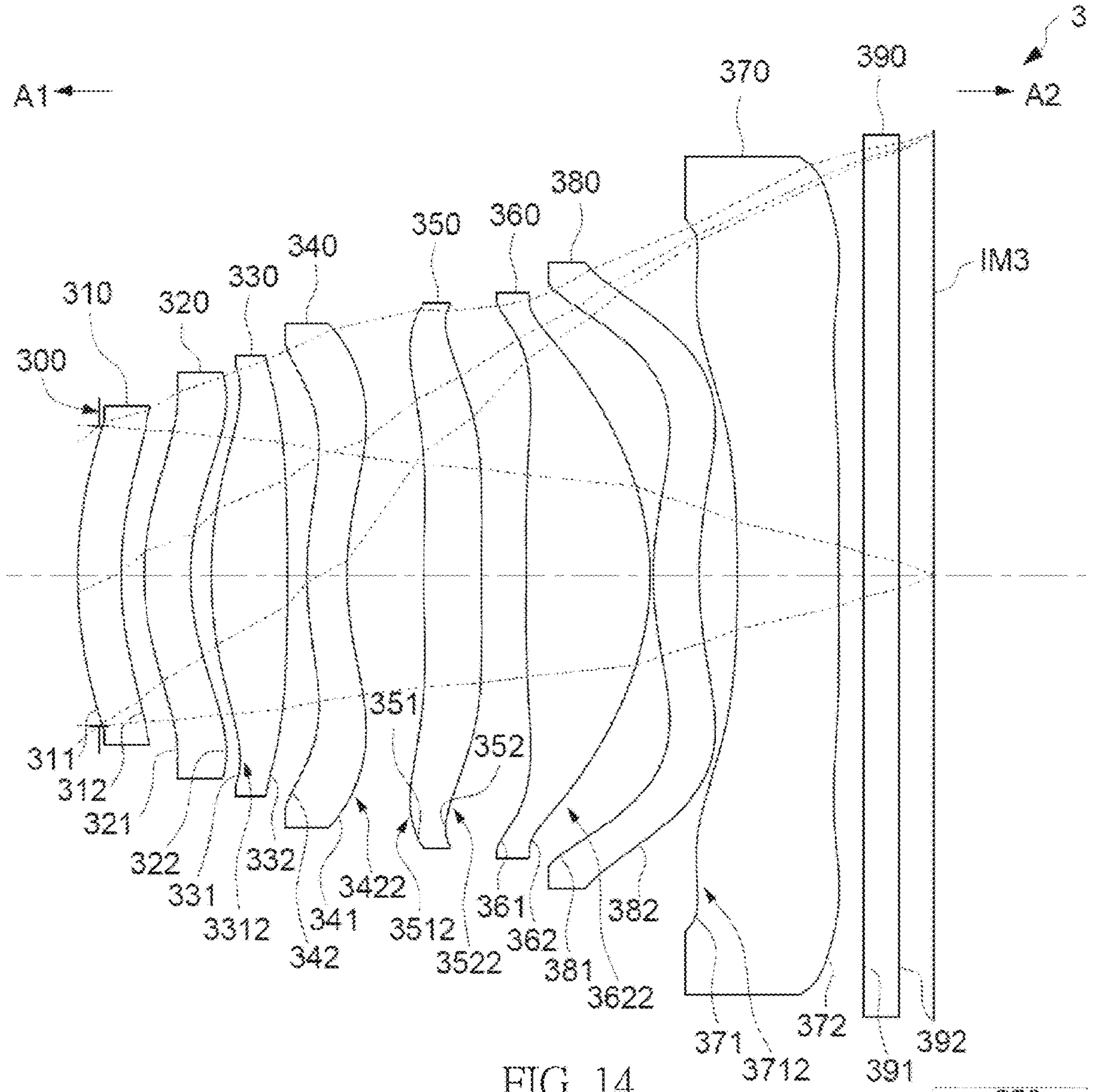
FIG. 14 depicts a cross-sectional view of a third embodiment of an optical imaging lens having eight lens elements according to the present disclosure.
Figure 15:
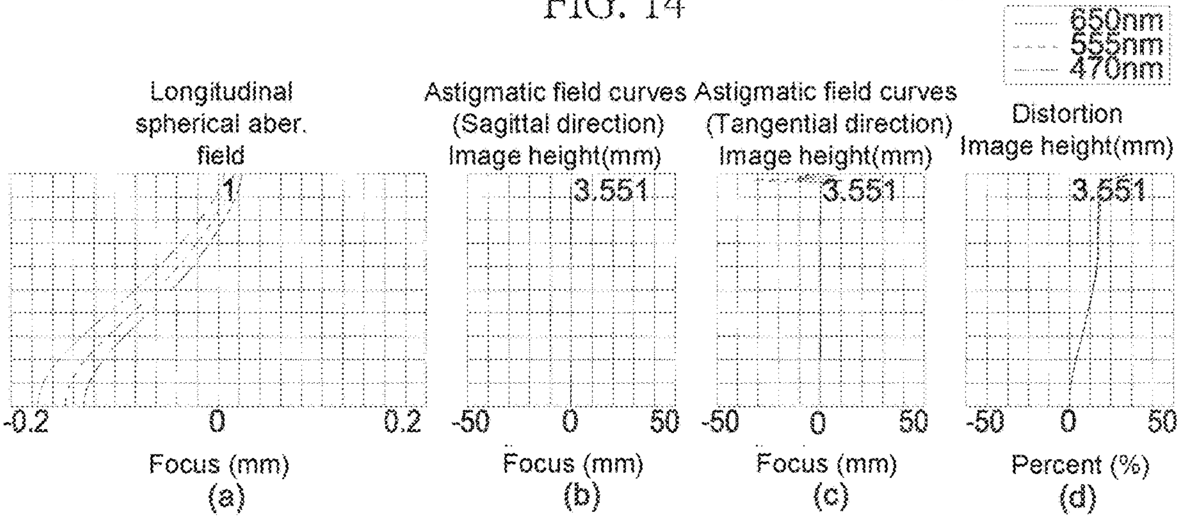
FIG. 15 depicts a chart of longitudinal spherical aberration and other kinds of optical aberrations of a third embodiment of an optical imaging lens according the present disclosure.

Reference is now made to FIGS. 14-17. FIG. 14 illustrates an example cross-sectional view of an optical imaging lens 3 having eight lens elements according to a third example embodiment. FIG. 15 shows example charts of longitudinal spherical aberration and other kinds of optical aberrations of the optical imaging lens 3 according to the third example embodiment. FIG. 16 shows an example table of optical data of each lens element of the optical imaging lens 3 according to the third example embodiment. FIG. 17 shows an example table of aspherical data of the optical imaging lens 3 according to the third example embodiment. The reference numbers labeled in the present embodiment may be similar to those in the first embodiment for the similar elements, but here the reference numbers may be initialed with 3; for example, reference number 331 may label the object-side surface of the third lens element 330, reference number 332 may label the image-side surface of the third lens element 330, etc.

As shown in FIG. 14, the optical imaging lens 3 of the third example embodiment, in an order from an object side A1 to an image side A2 along an optical axis, may comprise an aperture stop 300, a first lens element 310, a second lens element 320, a third lens element 330, a fourth lens element 340, a fifth lens element 350 a sixth lens element 360, an eighth lens element 380 and a seventh lens element 370.

The arrangements of the convex or concave surface structures in the third example embodiment, including the object-side surfaces 311, 321, 341, 361, 381 and the image-side surfaces 312, 322, 332, 372, 382 may be generally similar to the optical imaging lens 1 (FIG. 6 depicting the first example embodiment), but the differences between the optical imaging lens 1 and the optical imaging lens 3 may include the convex or concave surface structures of the object-side surfaces 331, 351, 371 and image-side surfaces 342, 352, 362. Additional differences may include a radius of curvature, refracting power, a thickness, an aspherical data, and an effective focal length of each lens element. More specifically, the first lens element 310 may have negative refracting power, the object-side surface 331 of the third lens element 330 may comprise a concave portion 3312 in a vicinity of a periphery of the third lens element 330, the image-side surface 342 of the fourth lens element 340 may comprise a convex portion 3422 in a vicinity of a periphery of the fourth lens element 340, the fifth lens element 350 may have positive refracting power, the object-side surface 351 of the fifth lens element 350 may comprise a convex portion 3512 in a vicinity of a periphery of the fifth lens element 350, the image-side surface 352 of the fifth lens element 350 may comprise a concave portion 3522 in a vicinity of a periphery of the fifth lens element 350, the image-side surface 362 of the sixth lens element 360 may comprise a concave portion 3622 in a vicinity of a periphery of the sixth lens element 360, the object-side surface 371 of the seventh lens element 370 may comprise a concave portion 3712 in a vicinity of a periphery of the seventh lens element 370.

Here, in the interest of clearly showing the drawings of a particular embodiment, only the surface shapes which are different from that in the first embodiment may be labeled.

Please refer to FIG. 16 for the optical characteristics of each lens element in the optical imaging lens 3 of the third example embodiment.

From the vertical deviation of each curve shown in FIG. 15(*a*), the offset of the off-axis light relative to the image point may be within about +0.18 mm. Referring to FIG. 15(*b*), the focus variation with respect to the three different wavelengths (470 nm, 555 nm, 650 nm) in the whole field may fall within about +35 mm. Referring to FIG. 15(*c*), the focus variation with respect to the three different wavelengths (470 nm, 555 nm, 650 nm) in the whole field may fall within about +35 mm. Referring to FIG. 15(*d*), the variation of the distortion aberration of the optical imaging lens 3 may be within about +30%.

The values of EFL、T1、G12、T2、G23、T3、G34、T4、G45、T5、G56、T6、G67、T7、G7F、TF、GFP、BFL、ALT、AAG、TL、TTL、EFL/ALT、EFL/ImgH、TTL/ImgH、TL/ImgH、TL/AAG、(T1+T4+T7)/T2、(T1+T4+T7)/T5、(G23+T4+G45)/(G12+T2)、(G23+T4+G45)/(G34+T4)、(G23+G45+T5+G56)/T1、(G23+G45+T5+G56)/T7、(T1+T2+T3+T4+T5)/T6、(T1+T2+T4+T5+T6)/T3、(G12+G23+G34+BFL)/T2、(G12+G23+G34+BFL)/T5、ALT/G67、(AAG+BFL)/G67、ALT*Fno/(T3+G34)、ALT*Fno/(G12+T6) of this embodiment may be referred to FIG. 78A.

In comparison with the first embodiment, this embodiment may have a smaller value of TTL and a larger value of HFOV, and the difference between the thickness in a vicinity of the optical axis and the thickness in a vicinity of a periphery region may be smaller when compared to the first embodiment, so that this embodiment may be manufactured more easily and the yield rate may be higher when compared to the first embodiment.

Figure 18:
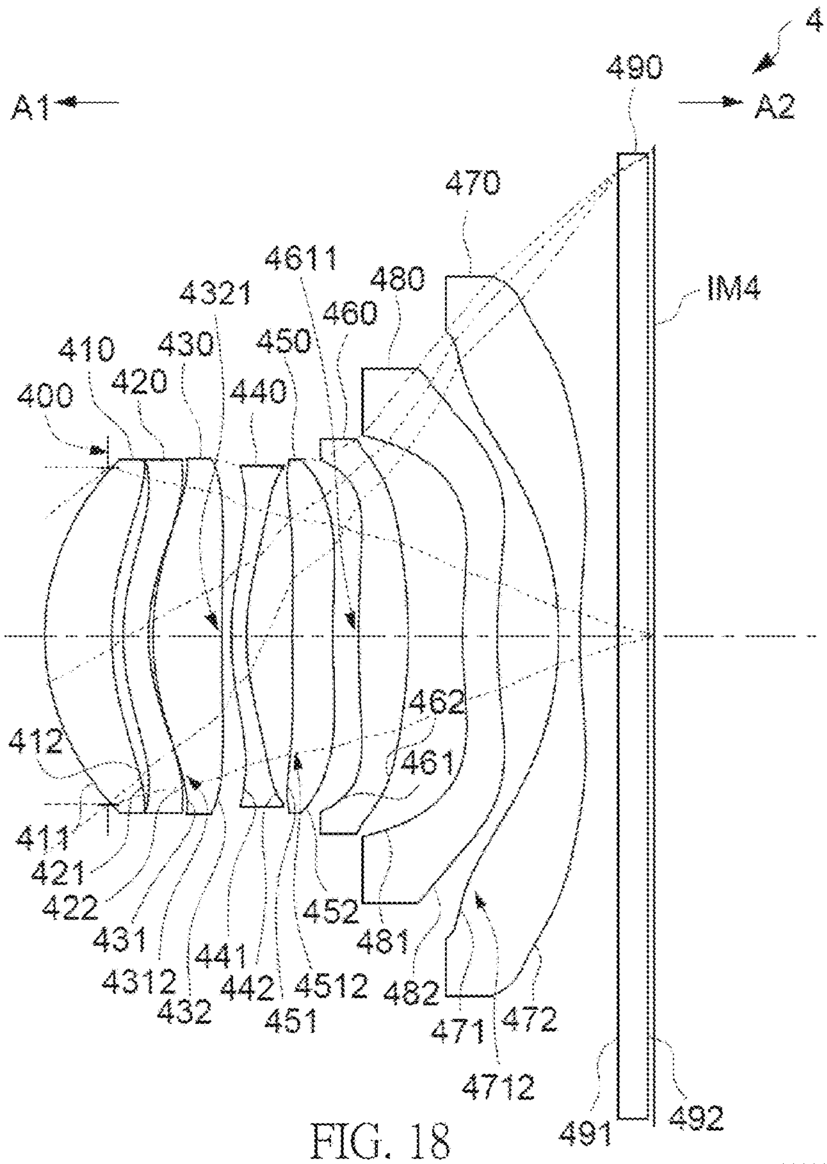
FIG. 18 depicts a cross-sectional view of a fourth embodiment of an optical imaging lens having eight lens elements according to the present disclosure.
Figure 19:
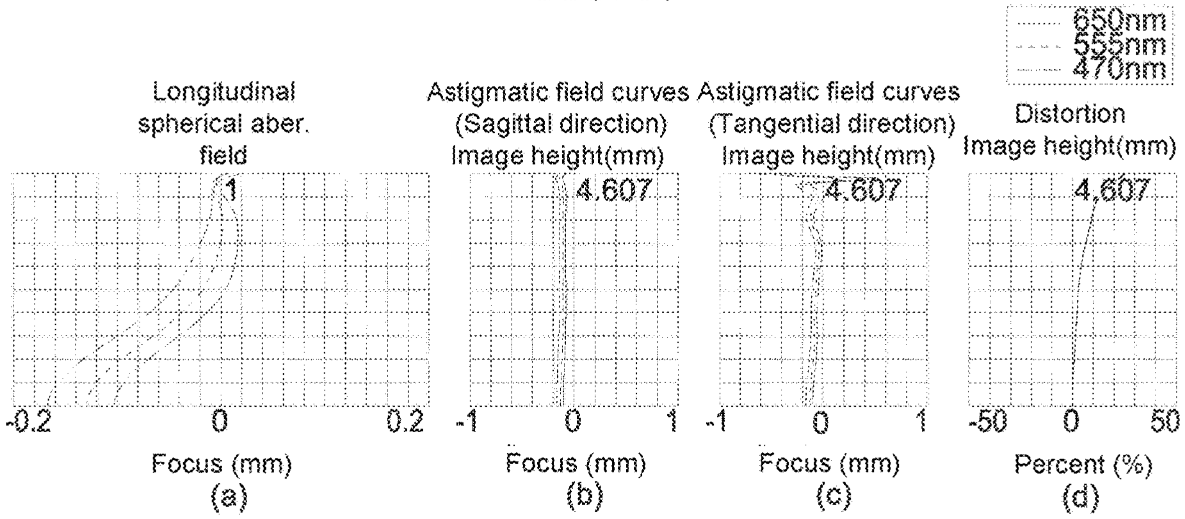
FIG. 19 depicts a chart of longitudinal spherical aberration and other kinds of optical aberrations of a fourth embodiment of an optical imaging lens according the present disclosure.

Reference is now made to FIGS. 18-21. FIG. 18 illustrates an example cross-sectional view of an optical imaging lens 4 having eight lens elements according to a fourth example embodiment. FIG. 19 shows example charts of longitudinal spherical aberration and other kinds of optical aberrations of the optical imaging lens 4 according to the fourth embodiment. FIG. 20 shows an example table of optical data of each lens element of the optical imaging lens 4 according to the fourth example embodiment. FIG. 21 shows an example table of aspherical data of the optical imaging lens 4 according to the fourth example embodiment. The reference numbers labeled in the present embodiment may be similar to those in the first example embodiment for the similar elements, but here the reference numbers may be initialed with 4; for example, reference number 431 may label the object-side surface of the third lens element 430, reference number 432 may label the image-side surface of the third lens element 430, etc.

As shown in FIG. 18, the optical imaging lens 4 of the present embodiment, in an order from an object side A1 to an image side A2 along an optical axis, may comprise an aperture stop 400, a first lens element 410, a second lens element 420, a third lens element 430, a fourth lens element 440, a fifth lens element 450 a sixth lens element 460, an eighth lens element 480 and a seventh lens element 470.

The arrangements of the convex or concave surface structures, including the object-side surfaces 411, 421, 441, 481 and the image-side surfaces 412, 422, 442, 452, 462, 472, 482 may be generally similar to the optical imaging lens 1, but the differences between the optical imaging lens 1 and the optical imaging lens 4 may include the convex or concave surface of the object-side surfaces 431, 451, 461, 471 and image-side surface 432. Additional differences may include a radius of curvature, a thickness, aspherical data, and an effective focal length of each lens element. More specifically, the object-side surface 431 of the third lens element 430 may comprise a concave portion 4311 in a vicinity of a periphery of the third lens element 430, the image-side surface 432 of the third lens element 430 may comprise a concave portion 4321 in a vicinity of the optical axis, the object-side surface 451 of the fifth lens element 450 may comprise a convex portion 4512 in a vicinity of a periphery of the fifth lens element 450, the object-side surface 461 of the sixth lens element 460 may comprise a convex portion 4611 in a vicinity of the optical axis, the object-side surface 471 of the seventh lens element 470 may comprise a concave portion 4712 in a vicinity of a periphery of the seventh lens element 470.

Here, in the interest of clearly showing the drawings of a particular embodiment, only the surface shapes which are different from that in the first embodiment may be labeled. Please refer to FIG. 20 for the optical characteristics of each lens elements in the optical imaging lens 4 of the present embodiment.

From the vertical deviation of each curve shown in FIG. 19(*a*), the offset of the off-axis light relative to the image point may be within about ±0.18 mm. Referring to FIG. 19(*b*), the focus variation with respect to the three different wavelengths (470 nm, 555 nm, 650 nm) in the whole field may fall within about ±0.02 mm. Referring to FIG. 19(*c*), the focus variation with respect to the three different wavelengths (470 nm, 555 nm, 650 nm) in the whole field may fall within about ±0.08 mm. Referring to FIG. 19(*d*), the variation of the distortion aberration of the optical imaging lens 4 may be within about +25%.

The values of EFL、T1、G12、T2、G23、T3、G34、T4、G45、T5、G56、T6、G67、T7、G7F、TF、GFP、BFL、ALT、AAG、TL、TTL、EFL/ALT、EFL/ImgH、TTL/ImgH、TL/ImgH、TL/AAG、(T1+T4+T7)/T2、(T1+T4+T7)/T5、(G23+T4+G45)/(G12+T2)、(G23+T4+G45)/(G34+T4)、(G23+G45+T5+G56)/T1、(G23+G45+T5+G56)/T7、(T1+T2+T3+T4+T5)/T6、(T1+T2+T4+T5+T6)/T3、(G12+G23+G34+BFL)/T2、(G12+G23+G34+BFL)/T5、ALT/G67、(AAG+BFL)/G67、ALT*Fno/(T3+G34)、ALT*Fno/(G12+T6) of this embodiment may be referred to FIG. 78A.

In comparison with the first embodiment, this embodiment may have a larger value of HFOV, and the difference between the thickness in a vicinity of the optical axis and the thickness in a vicinity of a periphery region may be smaller when compared to the first embodiment, so that this embodiment may be manufactured more easily and the yield rate may be higher when compared to the first embodiment.

Figure 22:
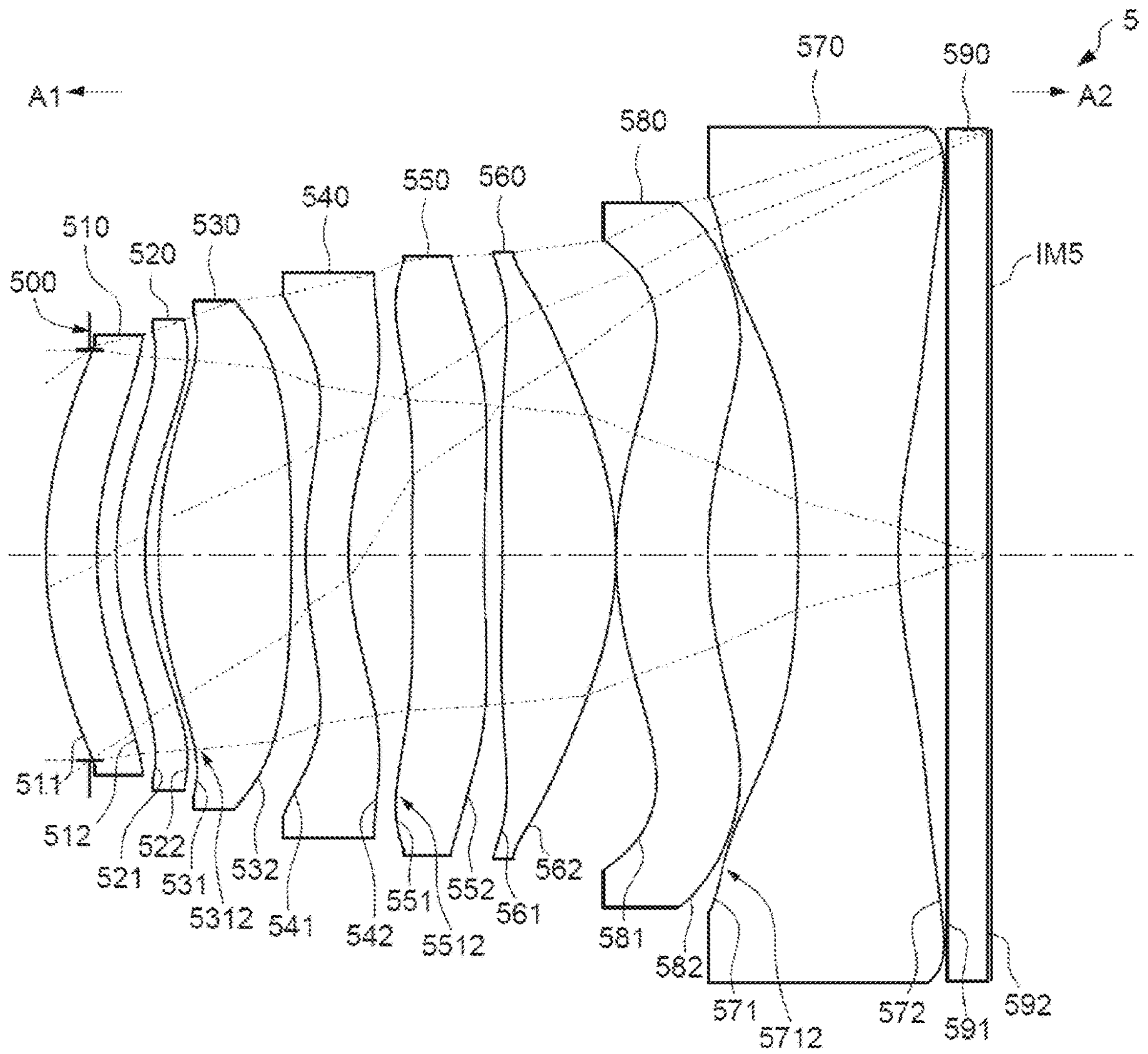
FIG. 22 depicts a cross-sectional view of a fifth embodiment of an optical imaging lens having eight lens elements according to the present disclosure.
Figure 23:
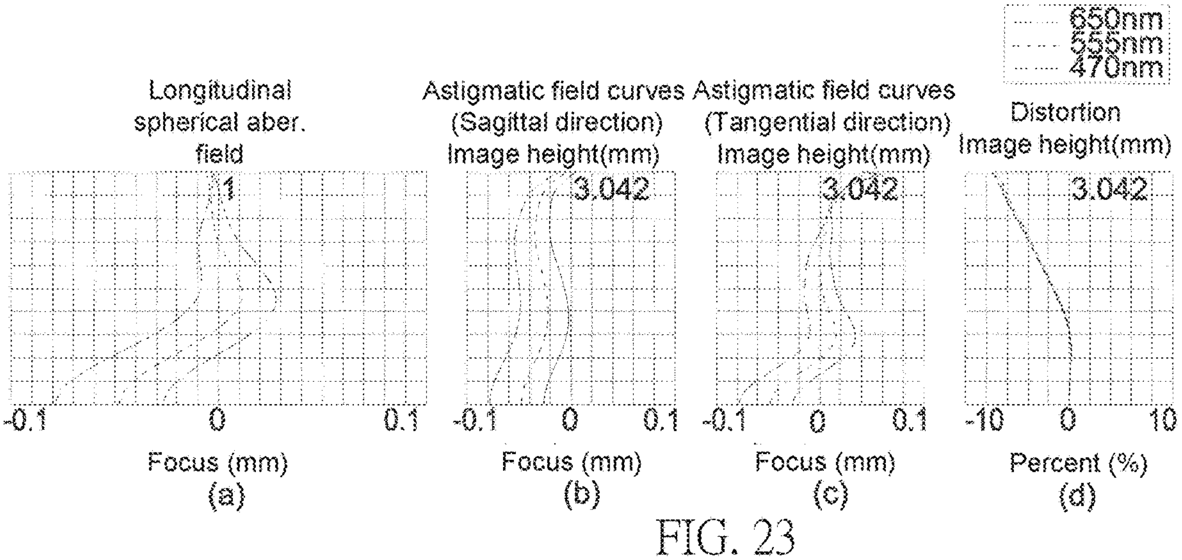
FIG. 23 depicts a chart of longitudinal spherical aberration and other kinds of optical aberrations of a fifth embodiment of the optical imaging lens according the present disclosure.

Reference is now made to FIGS. 22-25. FIG. 22 illustrates an example cross-sectional view of an optical imaging lens 5 having eight lens elements according to a fifth example embodiment. FIG. 23 shows example charts of longitudinal spherical aberration and other kinds of optical aberrations of the optical imaging lens 5 according to the fifth embodiment. FIG. 24 shows an example table of optical data of each lens element of the optical imaging lens 5 according to the fifth example embodiment. FIG. 25 shows an example table of aspherical data of the optical imaging lens 5 according to the fifth example embodiment. The reference numbers labeled in the present embodiment may be similar to those in the first embodiment for the similar elements, but here the reference numbers may be initialed with 5; for example, reference number 531 may label the object-side surface of the third lens element 530, reference number 532 may label the image-side surface of the third lens element 530, etc.

As shown in FIG. 22, the optical imaging lens 5 of the present embodiment, in an order from an object side A1 to an image side A2 along an optical axis, may comprise an aperture stop 500, a first lens element 510, a second lens element 520, a third lens element 530, a fourth lens element 540, a fifth lens element 550, a sixth lens element 560, an eighth lens element 580 and a seventh lens element 570.

The arrangements of the convex or concave surface structures, including the object-side surfaces 511, 521, 541, 581 and the image-side surfaces 512, 522, 532, 542, 552, 562, 572, 582 may be generally similar to the optical imaging lens 1, but the differences between the optical imaging lens 1 and the optical imaging lens 5 may include the convex or concave surface of the object-side surfaces 531, 551, 571. Additional differences may include a radius of curvature, a thickness, refracting power, aspherical data, and an effective focal length of each lens element. More specifically, the first lens element may have negative refracting power, the object-side surface 531 of the third lens element 530 may comprise a concave portion 5312 in a vicinity of a periphery of the third lens element 530, the object-side surface 551 of the fifth lens element 550 may comprise a convex portion 5512 in a vicinity of a periphery of the fifth lens element 550, the object-side surface 571 of the seventh lens element 570 may comprise a concave portion 5712 in a vicinity of ta periphery of the seventh lens element 570.

Here, in the interest of clearly showing the drawings of a particular embodiment, only the surface shapes which are different from that in the first embodiment may be labeled. FIG. 24 depicts the optical characteristics of each lens elements in the optical imaging lens 5 of the present embodiment.

From the vertical deviation of each curve shown in FIG. 23(*a*), the offset of the off-axis light relative to the image point may be within about ±0.08 mm. Referring to FIG. 23(*b*), the focus variation with respect to the three different wavelengths (470 nm, 555 nm, 650 nm) in the whole field may fall within about ±0.08 mm. Referring to FIG. 23(*c*), the focus variation with respect to the three different wavelengths (470 nm, 555 nm, 650 nm) in the whole field may fall within about ±0.08 mm. Referring to FIG. 23(*d*), the variation of the distortion aberration of the optical imaging lens 5 may be within about ±8%.

The values of EFL、T1、G12、T2、G23、T3、G34、T4、G45、T5、G56、T6、G67、T7、G7F、TF、GFP、BFL、ALT、AAG、TL、TTL、EFL/ALT、EFL/ImgH、TTL/ImgH、TL/ImgH、TL/AAG、(T1+T4+T7)/T2、(T1+T4+T7)/T5、(G23+T4+G45)/(G12+T2)、(G23+T4+G45)/(G34+T4)、(G23+G45+T5+G56)/T1、(G23+G45+T5+G56)/T7、(T1+T2+T3+T4+T5)/T6、(T1+T2+T4+T5+T6)/T3、(G12+G23+G34+BFL)/T2、(G12+G23+G34+BFL)/T5、ALT/G67、(AAG+BFL)/G67、ALT*Fno/(T3+G34)、ALT*Fno/(G12+T6) of this embodiment may be referred to FIG. 78A.

In comparison with the first embodiment, this embodiment may have a larger value of HFOV, and the difference between the thickness in a vicinity of the optical axis and the thickness in a vicinity of a periphery region may be smaller when compared to the first embodiment, so that this embodiment may be manufactured more easily and the yield rate may be higher when compared to the first embodiment.

Figure 26:
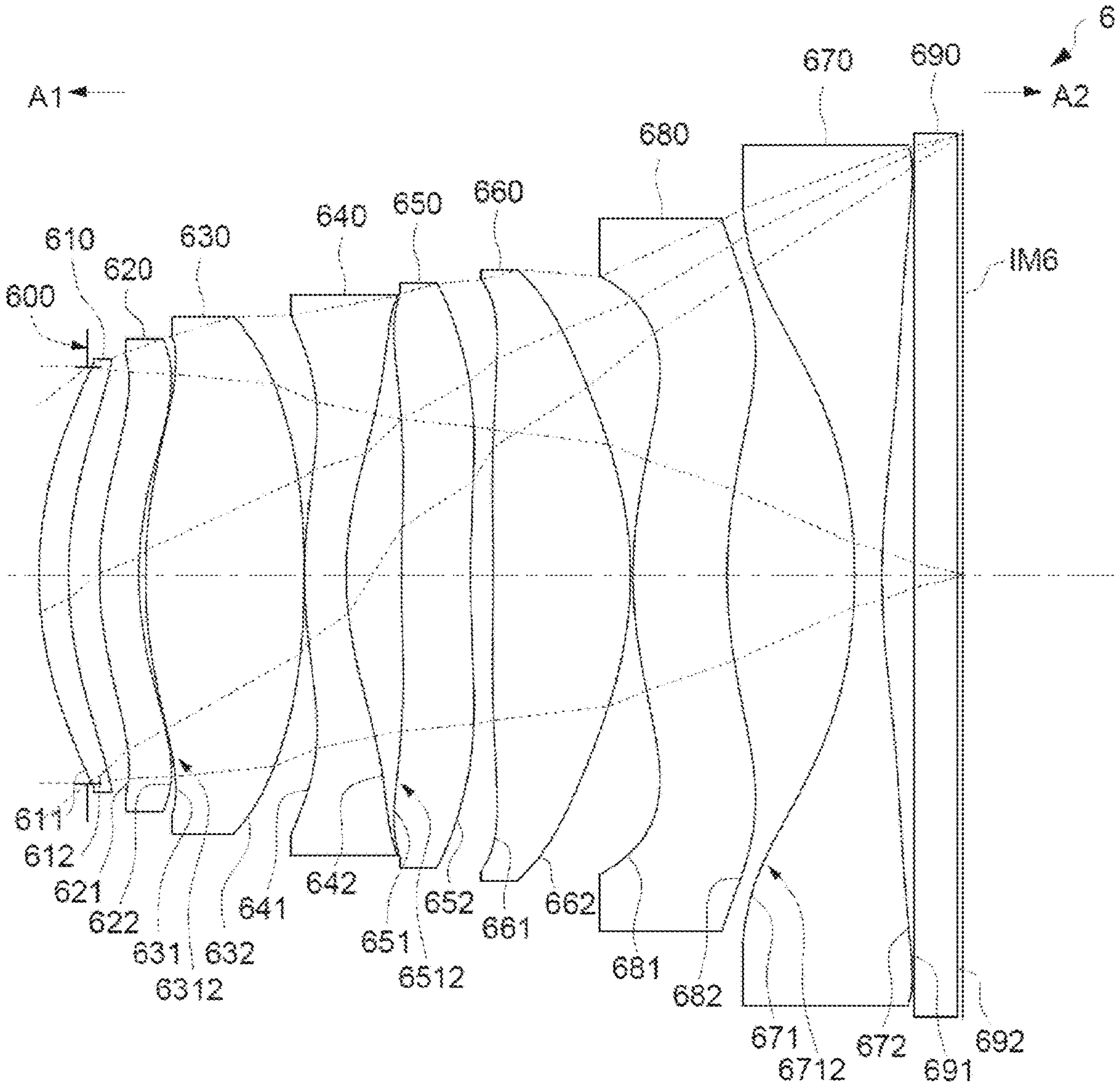
FIG. 26 depicts a cross-sectional view of a sixth embodiment of an optical imaging lens having eight lens elements according to the present disclosure.
Figure 27:
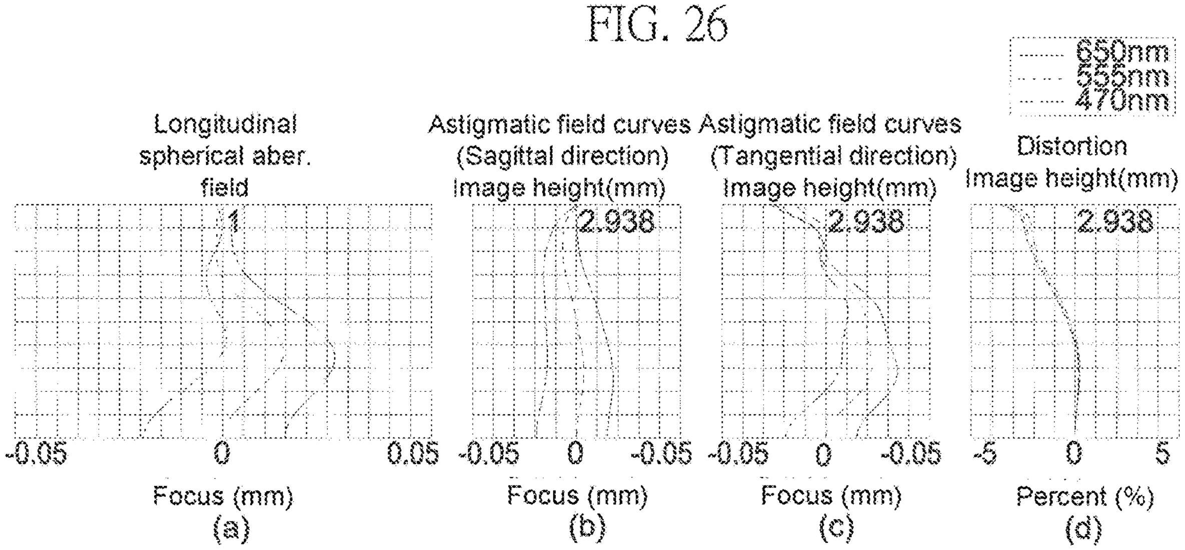
FIG. 27 depicts a chart of longitudinal spherical aberration and other kinds of optical aberrations of a sixth embodiment of the optical imaging lens according to the present disclosure.

Reference is now made to FIGS. 26-29. FIG. 26 illustrates an example cross-sectional view of an optical imaging lens 6 having eight lens elements according to a sixth example embodiment. FIG. 27 shows example charts of longitudinal spherical aberration and other kinds of optical aberrations of the optical imaging lens 6 according to the sixth embodiment. FIG. 28 shows an example table of optical data of each lens element of the optical imaging lens 6 according to the sixth example embodiment. FIG. 29 shows an example table of aspherical data of the optical imaging lens 6 according to the sixth example embodiment. The reference numbers labeled in the present embodiment are similar to those in the first embodiment for the similar elements, but here the reference numbers are initialed with 6; for example, reference number 631 may label the object-side surface of the third lens element 630, reference number 632 may label the image-side surface of the third lens element 630, etc.

As shown in FIG. 26, the optical imaging lens 6 of the present embodiment, in an order from an object side A1 to an image side A2 along an optical axis, may comprise an aperture stop 600, a first lens element 610, a second lens element 620, a third lens element 630, a fourth lens element 640, a fifth lens element 650, a sixth lens element 660, an eighth lens element 680 and a seventh lens element 670.

The arrangements of the convex or concave surface structures, including the object-side surfaces 611, 621, 641, 661, 681 and the image-side surfaces 612, 622, 632, 642, 652, 662, 672, 682 may be generally similar to the optical imaging lens 1 (FIG. 6 depicting the first example embodiment), but the differences between the optical imaging lens 1 and the optical imaging lens 6 may include the convex or concave surface of the object-side surfaces 631, 651, 671. Additional differences may include a radius of curvature, a thickness, aspherical data, and an effective focal length of each lens element. More specifically, the object-side surface 631 of the third lens element 630 may comprise a concave portion 6312 in a vicinity of a periphery of the third lens element 630, the object-side surface 651 of the fifth lens element 650 may comprise a convex portion 6512 in a vicinity of a periphery of the fifth lens element 650, the object-side surface 671 of the seventh lens element 670 may comprise a concave portion 6712 in a vicinity of a periphery of the seventh lens element 670.

Here, in the interest of clearly showing the drawings of a particular embodiment, only the surface shapes which are different from that in the first embodiment may be labeled. Please refer to FIG. 28 for the optical characteristics of each lens elements in the optical imaging lens 6 of the present embodiment.

From the vertical deviation of each curve shown in FIG. 27(*a*), the offset of the off-axis light relative to the image point may be within about ±0.03 mm. Referring to FIG. 27(*b*), the focus variation with respect to the three different wavelengths (470 nm, 555 nm, 650 nm) in the whole field may fall within about ±0.02 mm. Referring to FIG. 23(*c*), the focus variation with respect to the three different wavelengths (470 nm, 555 nm, 650 nm) in the whole field may fall within about ±0.035 mm. Referring to FIG. 27(*d*), the variation of the distortion aberration of the optical imaging lens 6 may be within about ±4%.

The values of EFL、T1、G12、T2、G23、T3、G34、T4、G45、T5、G56、T6、G67、T7、G7F、TF、GFP、BFL、ALT、AAG、TL、TTL、EFL/ALT、EFL/ImgH、TTL/ImgH、TL/ImgH、TL/AAG、(T1+T4+T7)/T2、(T1+T4+T7)/T5、(G23+T4+G45)/(G12+T2)、(G23+T4+G45)/(G34+T4)、(G23+G45+T5+G56)/T1、(G23+G45+T5+G56)/T7、(T1+T2+T3+T4+T5)/T6、(T1+T2+T4+T5+T6)/T3、(G12+G23+G34+BFL)/T2、(G12+G23+G34+BFL)/T5、ALT/G67、(AAG+BFL)/G67、ALT*Fno/(T3+G34)、ALT*Fno/(G12+T6) of this embodiment may be referred to FIG. 78A In comparison with the first embodiment, this embodiment may have a larger value of HFOV and smaller values of longitudinal spherical aberration and astigmatism aberration.

Figure 30:
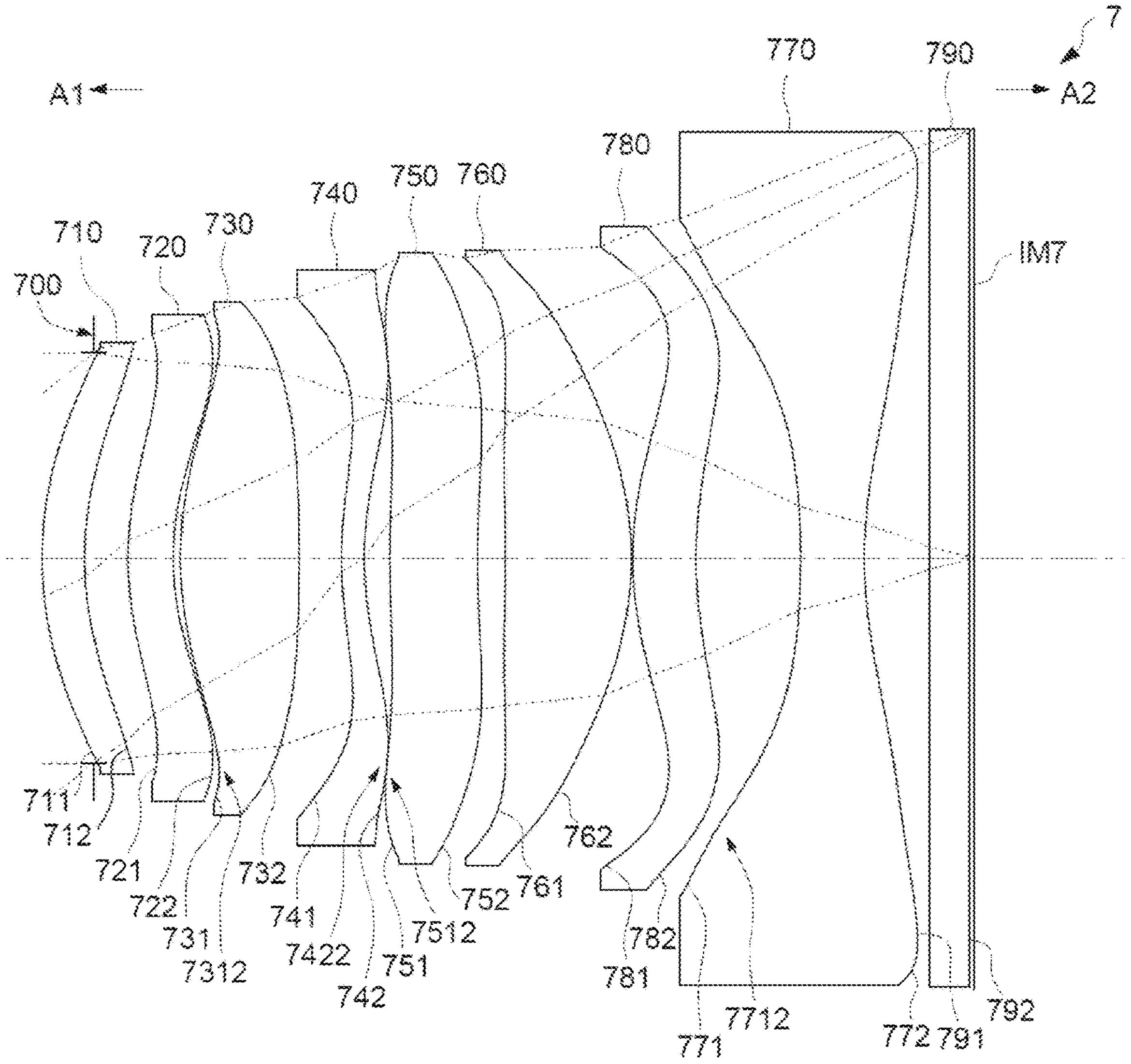
FIG. 30 depicts a cross-sectional view of a seventh embodiment of an optical imaging lens having eight lens elements according to the present disclosure.
Figure 31:
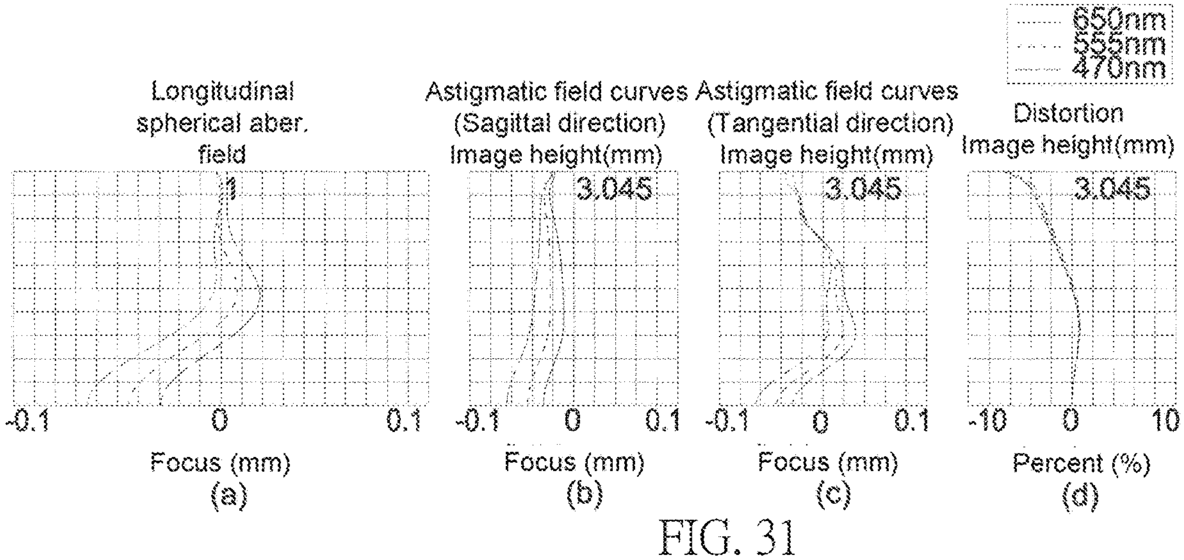
FIG. 31 depicts a chart of longitudinal spherical aberration and other kinds of optical aberrations of a seventh embodiment of the optical imaging lens according to the present disclosure.

Reference is now made to FIGS. 30-33. FIG. 30 illustrates an example cross-sectional view of an optical imaging lens 7 having eight lens elements according to a seventh example embodiment. FIG. 31 shows example charts of longitudinal spherical aberration and other kinds of optical aberrations of the optical imaging lens 7 according to the seventh embodiment. FIG. 32 shows an example table of optical data of each lens element of the optical imaging lens 7 according to the seventh example embodiment. FIG. 33 shows an example table of aspherical data of the optical imaging lens 7 according to the seventh example embodiment. The reference numbers labeled in the present embodiment are similar to those in the first embodiment for the similar elements, but here the reference numbers are initialed with 7; for example, reference number 731 may label the object-side surface of the third lens element 730, reference number 732 may label the image-side surface of the third lens element 730, etc.

As shown in FIG. 30, the optical imaging lens 7 of the present embodiment, in an order from an object side A1 to an image side A2 along an optical axis, may comprise an aperture stop 700, a first lens element 710, a second lens element 720, a third lens element 730, a fourth lens element 740, a fifth lens element 750, a sixth lens element 760, an eighth lens element 780 and a seventh lens element 770.

The arrangements of the convex or concave surface structures, including the object-side surfaces 711, 721, 741, 761, 781 and the image-side surfaces 712, 722, 732, 752, 762, 772, 782 may be generally similar to the optical imaging lens 1 (FIG. 6 depicting the first example embodiment), but the differences between the optical imaging lens 1 and the optical imaging lens 7 may include the convex or concave surface structures of the object-side surfaces 751, 771 and the image-side surface 742. Additional differences may include a radius of curvature, refracting power, a thickness, aspherical data, and an effective focal length of each lens element. More specifically, the first lens element 710 may have negative refracting power, the object-side surface 731 of the third lens element 730 may comprise a concave portion 7312 in a vicinity of a periphery of the third lens element 730, the image-side surface 742 of the fourth lens element 740 may comprise a convex portion 7422 in a vicinity of a periphery of the fourth lens element 740, and the object-side surface 751 of the fifth lens element 750 may comprise a convex portion 7512 in a vicinity of a periphery of the fifth lens element 750, and the object-side surface 771 of the seventh lens element 770 may comprise a concave portion 7712 in a vicinity of a periphery of the seventh lens element 770.

Here, in the interest of clearly showing the drawings of a particular embodiment, only the surface shapes which are different from that in the first embodiment may be labeled. Please refer to FIG. 32 for the optical characteristics of each lens elements in the optical imaging lens 7 of the present embodiment.

From the vertical deviation of each curve shown in FIG. 31(*a*), the offset of the off-axis light relative to the image point may be within about ±0.07 mm. Referring to FIG. 31(*b*), the focus variation with respect to the three different wavelengths (470 nm, 555 nm, 650 nm) in the whole field may fall within about ±0.07 mm. Referring to FIG. 31(*c*), the focus variation with respect to the three different wavelengths (470 nm, 555 nm, 650 nm) in the whole field may fall within about ±0.07 mm. Referring to FIG. 31(*d*), the variation of the distortion aberration of the optical imaging lens 7 may be within about ±7%.

The values of EFL、T1、G12、T2、G23、T3、G34、T4、G45、T5、G56、T6、G67、T7、G7F、TF、GFP、BFL、ALT、AAG、TL、TTL、EFL/ALT、EFL/ImgH、TTL/ImgH、TL/ImgH、TL/AAG、(T1+T4+T7)/T2、(T1+T4+T7)/T5、(G23+T4+G45)/(G12+T2)、(G23+T4+G45)/(G34+T4)、(G23+G45+T5+G56)/T1、(G23+G45+T5+G56)/T7、(T1+T2+T3+T4+T5)/T6、(T1+T2+T4+T5+T6)/T3、(G12+G23+G34+BFL)/T2、(G12+G23+G34+BFL)/T5、ALT/G67、(AAG+BFL)/G67、ALT*Fno/(T3+G34)、ALT*Fno/(G12+T6) of this embodiment may be referred to FIG. 78A.

In comparison with the first embodiment, this embodiment may have a larger value of HFOV, and the difference between the thickness in a vicinity of the optical axis and the thickness in a vicinity of a periphery region may be smaller when compared to the first embodiment, so that this embodiment may be manufactured more easily and the yield rate may be higher when compared to the first embodiment.

Figure 34:
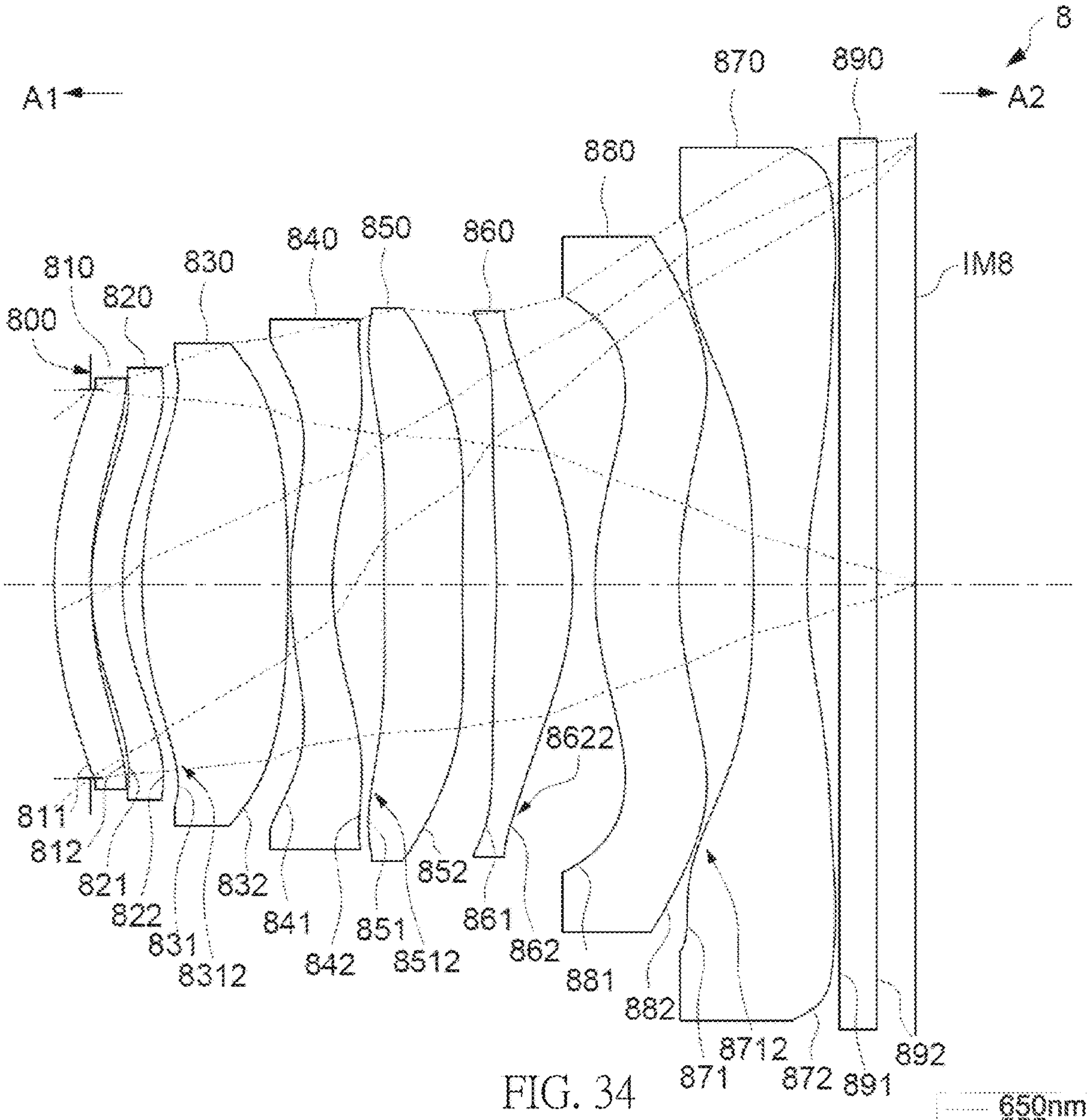
FIG. 34 depicts a cross-sectional view of an eighth embodiment of an optical imaging lens having eight lens elements according to the present disclosure.
Figure 35:
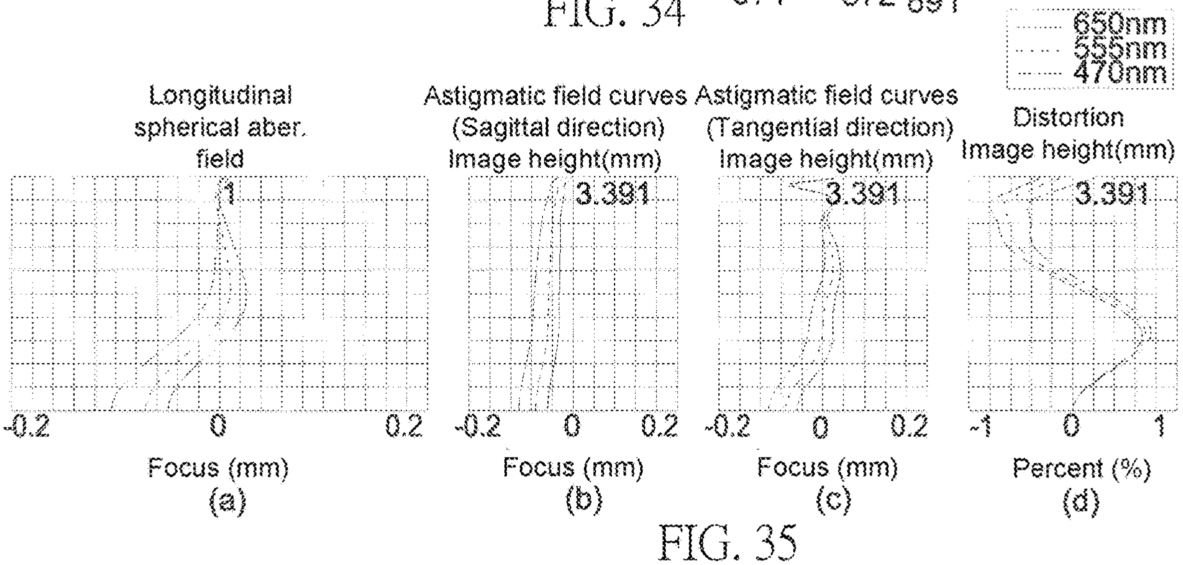
FIG. 35 depicts a chart of longitudinal spherical aberration and other kinds of optical aberrations of an eighth embodiment of the optical imaging lens according to the present disclosure.

Reference is now made to FIGS. 34-37. FIG. 34 illustrates an example cross-sectional view of an optical imaging lens 8 having eight lens elements according to an eighth example embodiment. FIG. 35 shows example charts of longitudinal spherical aberration and other kinds of optical aberrations of the optical imaging lens 8 according to the eighth embodiment. FIG. 36 shows an example table of optical data of each lens element of the optical imaging lens 8 according to the eighth example embodiment. FIG. 37 shows an example table of aspherical data of the optical imaging lens 8 according to the eighth example embodiment. The reference numbers labeled in the present embodiment are similar to those in the first embodiment for the similar elements, but here the reference numbers are initialed with 8; for example, reference number 831 may label the object-side surface of the third lens element 830, reference number 832 may label the image-side surface of the third lens element 830, etc.

As shown in FIG. 34, the optical imaging lens 8 of the present embodiment, in an order from an object side A1 to an image side A2 along an optical axis, may comprise an aperture stop 800, a first lens element 810, a second lens element 820, a third lens element 830, a fourth lens element 840, a fifth lens element 850, a sixth lens element 860, an eighth lens element 880 and a seventh lens element 870.

The arrangements of the convex or concave surface structures, including the object-side surfaces 811, 821, 841, 861, 881 and the image-side surfaces 812, 822, 832, 842, 852, 872, 882 may be generally similar to the optical imaging lens 1 (FIG. 6 depicting the first example embodiment), but the differences between the optical imaging lens 1 and the optical imaging lens 8 may include the convex or concave surface structures of the object-side surfaces 831, 851, 871 and image-side surface 862. Additional differences may include a radius of curvature, refracting power, a thickness, aspherical data, and an effective focal length of each lens element. More specifically, the first lens element 810 may have negative refracting power, the object-side surface 831 of the third lens element 830 may comprise a concave portion 8312 in a vicinity of a periphery of the third lens element 830, the object-side surface 851 of the fifth lens element 850 may comprise a convex portion 8512 in a vicinity of a periphery of the fifth lens element 850, the image-side surface 862 of the sixth lens element 860 may comprise a concave portion 8622 in a vicinity of a periphery of the sixth lens element 860, the object-side surface 871 of the seventh lens element 870 may comprise a concave portion 8712 in a vicinity of a periphery of the seventh lens element 870.

Here, in the interest of clearly showing the drawings of a particular embodiment, only the surface shapes which are different from that in the first embodiment may be labeled. Please refer to FIG. 36 for the optical characteristics of each lens elements in the optical imaging lens 8 of the present embodiment.

From the vertical deviation of each curve shown in FIG. 35(*a*), the offset of the off-axis light relative to the image point may be within about ±0.12 mm. Referring to FIG. 35(*b*), the focus variation with respect to the three different wavelengths (470 nm, 555 nm, 650 nm) in the whole field may fall within about ±0.12 mm. Referring to FIG. 35(*c*), the focus variation with respect to the three different wavelengths (470 nm, 555 nm, 650 nm) in the whole field may fall within about ±0.12 mm. Referring to FIG. 35(*d*), the variation of the distortion aberration of the optical imaging lens 8 may be within about ±0.8%.

The values of EFL、T1、G12、T2、G23、T3、G34、T4、G45、T5、G56、T6、G67、T7、G7F、TF、GFP、BFL、ALT、AAG、TL、TTL、EFL/ALT、EFL/ImgH、TTL/ImgH、TL/ImgH、TL/AAG、(T1+T4+T7)/T2、(T1+T4+T7)/T5、(G23+T4+G45)/(G12+T2)、(G23+T4+G45)/(G34+T4)、(G23+G45+T5+G56)/T1、(G23+G45+T5+G56)/T7、(T1+T2+T3+T4+T5)/T6、(T1+T2+T4+T5+T6)/T3、(G12+G23+G34+BFL)/T2、(G12+G23+G34+BFL)/T5、ALT/G67、(AAG+BFL)/G67、ALT*Fno/(T3+G34)、ALT*Fno/(G12+T6) of this embodiment may be referred to FIG. 78A.

In comparison with the first embodiment, this embodiment may have a bigger value of HFOV and a smaller value of distortion aberration.

Figure 38:
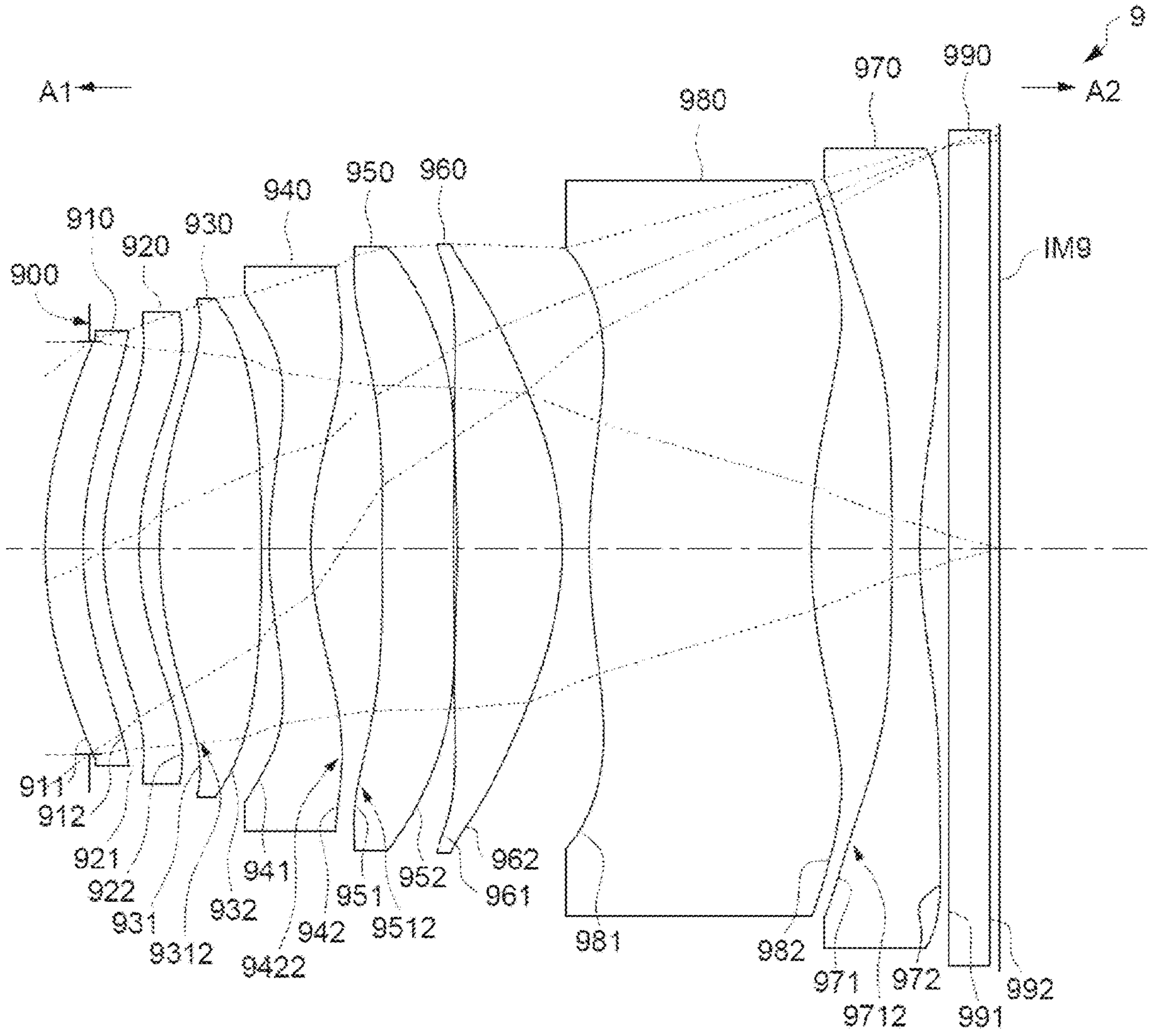
FIG. 38 depicts a cross-sectional view of a ninth embodiment of an optical imaging lens having eight lens elements according to the present disclosure.
Figure 39:
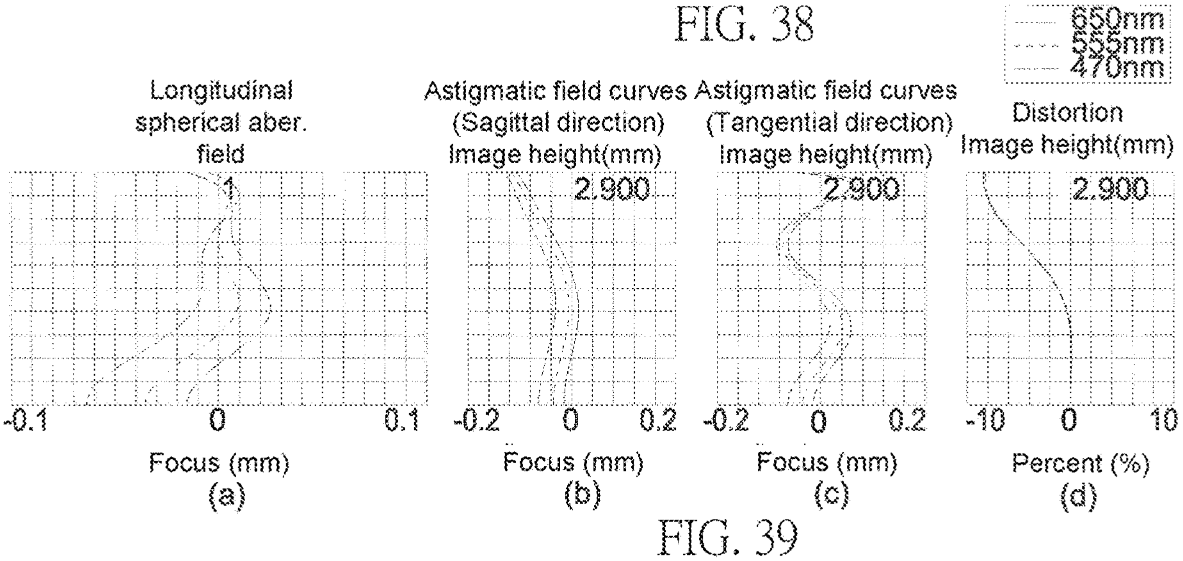
FIG. 39 depicts a chart of longitudinal spherical aberration and other kinds of optical aberrations of a ninth embodiment of the optical imaging lens according to the present disclosure.

Reference is now made to FIGS. 38-41. FIG. 38 illustrates an example cross-sectional view of an optical imaging lens 9 having eight lens elements according to an ninth example embodiment. FIG. 39 shows example charts of longitudinal spherical aberration and other kinds of optical aberrations of the optical imaging lens 9 according to the ninth embodiment. FIG. 40 shows an example table of optical data of each lens element of the optical imaging lens 9 according to the ninth example embodiment. FIG. 41 shows an example table of aspherical data of the optical imaging lens 9 according to the ninth example embodiment. The reference numbers labeled in the present embodiment are similar to those in the first embodiment for the similar elements, but here the reference numbers are initialed with 9; for example, reference number 931 may label the object-side surface of the third lens element 930, reference number 932 may label the image-side surface of the third lens element 930, etc.

As shown in FIG. 38, the optical imaging lens 9 of the present embodiment, in an order from an object side A1 to an image side A2 along an optical axis, may comprise an aperture stop 900, a first lens element 910, a second lens element 920, a third lens element 930, a fourth lens element 940, a fifth lens element 950, a sixth lens element 960, an eighth lens element 980 and a seventh lens element 970.

The arrangements of the convex or concave surface structures, including the object-side surfaces 911, 921, 941, 961, 981 and the image-side surfaces 912, 922, 932, 952, 962, 972, 982 may be generally similar to the optical imaging lens 1 (FIG. 6 depicting the first example embodiment), but the differences between the optical imaging lens 1 and the optical imaging lens 9 may include the convex or concave surface structures of the object-side surfaces 931, 951, 971 and image-side surface 942. Additional differences may include a radius of curvature, refracting power, a thickness, an aspherical data, and an effective focal length of each lens element. More specifically, the first lens element 910 may have negative refracting power, the object-side surface 931 of the third lens element 930 may comprise a concave portion 9312 in a vicinity of a periphery of the third lens element 930, the image-side surface 942 of the fourth lens element 940 may comprise a convex portion 9422 in a vicinity of a periphery of the fourth lens element 940, the object-side surface 951 of the fifth lens element 950 may comprise a convex portion 9512 in a vicinity of a periphery of the fifth lens element 950, the object-side surface 971 of the seventh lens element 970 may comprise a concave portion 9712 in a vicinity of a periphery of the seventh lens element 970.

Here, in the interest of clearly showing the drawings of a particular embodiment, only the surface shapes which are different from that in the first embodiment may be labeled. Please refer to FIG. 40 for the optical characteristics of each lens elements in the optical imaging lens 9 of the present embodiment.

From the vertical deviation of each curve shown in FIG. 39(*a*), the offset of the off-axis light relative to the image point may be within about ±0.07 mm. Referring to FIG. 39(*b*), the focus variation with respect to the three different wavelengths (470 nm, 555 nm, 650 nm) in the whole field may fall within about ±0.14 mm. Referring to FIG. 39(*c*), the focus variation with respect to the three different wavelengths (470 nm, 555 nm, 650 nm) in the whole field may fall within about ±0.12 mm. Referring to FIG. 39(*d*), the variation of the distortion aberration of the optical imaging lens 9 may be within about ±10%.

The values of EFL、T1、G12、T2、G23、T3、G34、T4、G45、T5、G56、T6、G67、T7、G7F、TF、GFP、BFL、ALT、AAG、TL、TTL、EFL/ALT、EFL/ImgH、TTL/ImgH、TL/ImgH、TL/AAG、(T1+T4+T7)/T2、(T1+T4+T7)/T5、(G23+T4+G45)/(G12+T2)、(G23+T4+G45)/(G34+T4)、(G23+G45+T5+G56)/T1、(G23+G45+T5+G56)/T7、(T1+T2+T3+T4+T5)/T6、(T1+T2+T4+T5+T6)/T3、(G12+G23+G34+BFL)/T2、(G12+G23+G34+BFL)/T5、ALT/G67、(AAG+BFL)/G67、ALT*Fno/(T3+G34)、ALT*Fno/(G12+T6) of this embodiment may be referred to FIG. 78A.

In comparison with the first embodiment, this embodiment may have a larger value of HFOV, and the difference between the thickness in a vicinity of the optical axis and the thickness in a vicinity of a periphery region may be smaller when compared to the first embodiment, so that this embodiment may be manufactured more easily and the yield rate may be higher when compared to the first embodiment.

Figure 42:
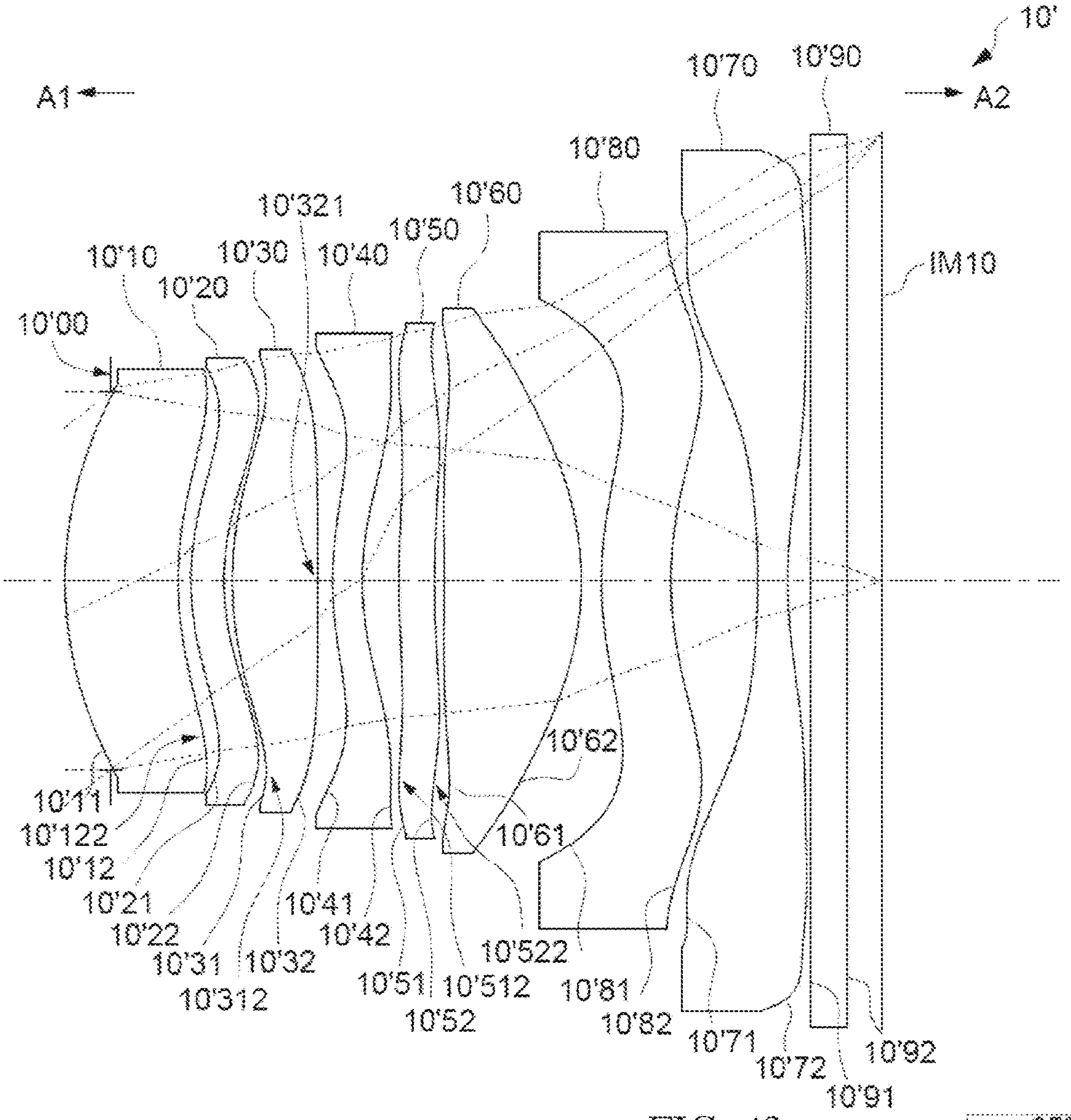
FIG. 42 depicts a cross-sectional view of a tenth embodiment of an optical imaging lens having eight lens elements according to the present disclosure.
Figure 43:
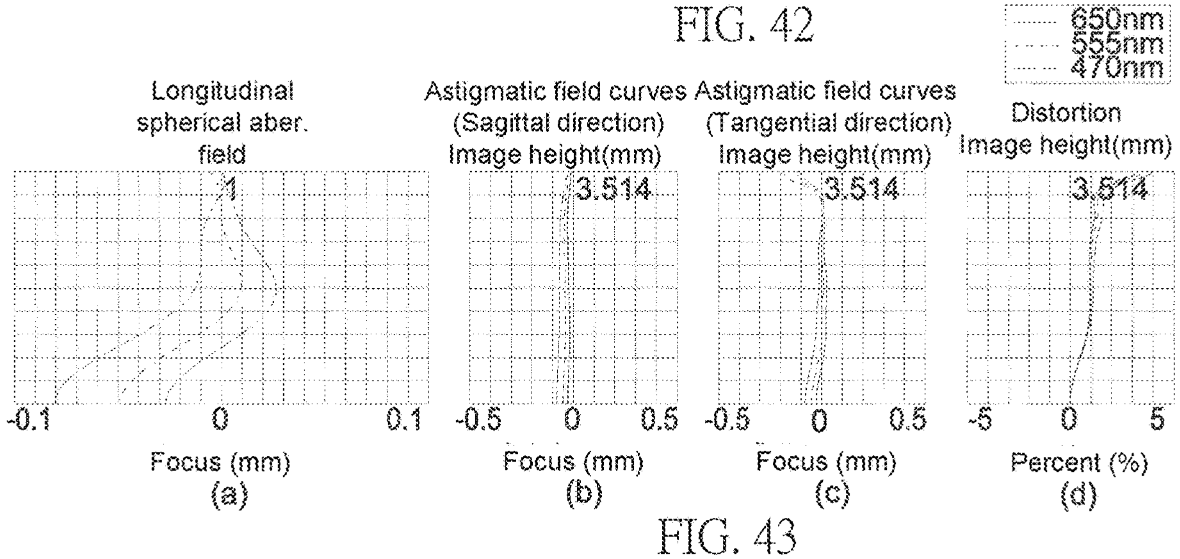
FIG. 43 depicts a chart of longitudinal spherical aberration and other kinds of optical aberrations of a tenth embodiment of the optical imaging lens according to the present disclosure.

Reference is now made to FIGS. 42-45. FIG. 42 illustrates an example cross-sectional view of an optical imaging lens 10' having eight lens elements according to an tenth example embodiment. FIG. 43 shows example charts of longitudinal spherical aberration and other kinds of optical aberrations of the optical imaging lens 10' according to the tenth embodiment. FIG. 44 shows an example table of optical data of each lens element of the optical imaging lens 10' according to the tenth example embodiment. FIG. 45 shows an example table of aspherical data of the optical imaging lens 10' according to the tenth example embodiment. The reference numbers labeled in the present embodiment are similar to those in the first embodiment for the similar elements, but here the reference numbers are initialed with 10'; for example, reference number 10'31 may label the object-side surface of the third lens element 10'30, reference number 10'32 may label the image-side surface of the third lens element 10'30, etc.

As shown in FIG. 42, the optical imaging lens 10' of the present embodiment, in an order from an object side A1 to an image side A2 along an optical axis, may comprise an aperture stop 10'00, a first lens element 10'10, a second lens element 10'20, a third lens element 10'30, a fourth lens element 10'40, a fifth lens element 10'50, a sixth lens element 10'60, an eighth lens element 10'80 and a seventh lens element 10'70.

The arrangements of the convex or concave surface structures, including the object-side surfaces 10'11, 10'21, 10'41, 10'61, 10'81 and the image-side surfaces 10'22, 10'42, 10'62, 10'72, 10'82 may be generally similar to the optical imaging lens 1 (FIG. 6 depicting the first example embodiment), but the differences between the optical imaging lens 1 and the optical imaging lens 10' may include the convex or concave surface structures of the object-side surfaces 10'31, 10'51 and the image-side surfaces 10'12, 10'32, 10'52. Additional differences may include a radius of curvature, a thickness, refracting power, aspherical data, and an effective focal length of each lens element. More specifically, the image-side surface 10'12 of the first lens element 10'10 may comprise a convex portion 10'122 in a vicinity of a periphery of the first lens element 10'10, the object-side surface 10'31 of the third lens element 10'30 may comprise a concave portion 10'312 in a vicinity of a periphery of the third lens element 10'30, the image-side surface 10'32 of the third lens element 10'30 may comprise a concave portion 10'321 in a vicinity of the optical axis, the fifth lens element 10'50 may have positive refracting power, the object-side surface 10'51 of the fifth lens element 10'50 may comprise a convex portion 10'512 in a vicinity of a periphery of the fifth lens element 10'50, the image-side surface 10'52 of the fifth lens element 10'50 may comprise a concave portion 10'522 in a vicinity of a periphery of the fifth lens element 10'50.

Here, in the interest of clearly showing the drawings of a particular embodiment, only the surface shapes which are different from that in the first embodiment may be labeled. Please refer to FIG. 44 for the optical characteristics of each lens elements in the optical imaging lens 10' of the present embodiment.

From the vertical deviation of each curve shown in FIG. 43(*a*), the offset of the off-axis light relative to the image point may be within about ±0.09 mm. Referring to FIG. 43(*b*), the focus variation with respect to the three different wavelengths (470 nm, 555 nm, 650 nm) in the whole field may fall within about ±0.1 mm. Referring to FIG. 43(*c*), the focus variation with respect to the three different wavelengths (470 nm, 555 nm, 650 nm) in the whole field may fall within about ±0.2 mm. Referring to FIG. 43(*d*), the variation of the distortion aberration of the optical imaging lens 10' may be within about ±4%.

The values of EFL、T1、G12、T2、G23、T3、G34、T4、G45、T5、G56、T6、G67、T7、G7F、TF、GFP、BFL、ALT、AAG、TL、TTL、EFL/ALT、EFL/ImgH、TTL/ImgH、TL/ImgH、TL/AAG、(T1+T4+T7)/T2、(T1+T4+T7)/T5、(G23+T4+G45)/(G12+T2)、(G23+T4+G45)/(G34+T4)、(G23+G45+T5+G56)/T1、(G23+G45+T5+G56)/T7、(T1+T2+T3+T4+T5)/T6、(T1+T2+T4+T5+T6)/T3、(G12+G23+G34+BFL)/T2、(G12+G23+G34+BFL)/T5、ALT/G67、(AAG+BFL)/G67、ALT*Fno/(T3+G34)、ALT*Fno/(G12+T6) of this embodiment may be referred to FIG. 78B.

In comparison with the first embodiment, this embodiment may have a bigger value of HFOV and a smaller value of astigmatism aberration.

Figure 46:
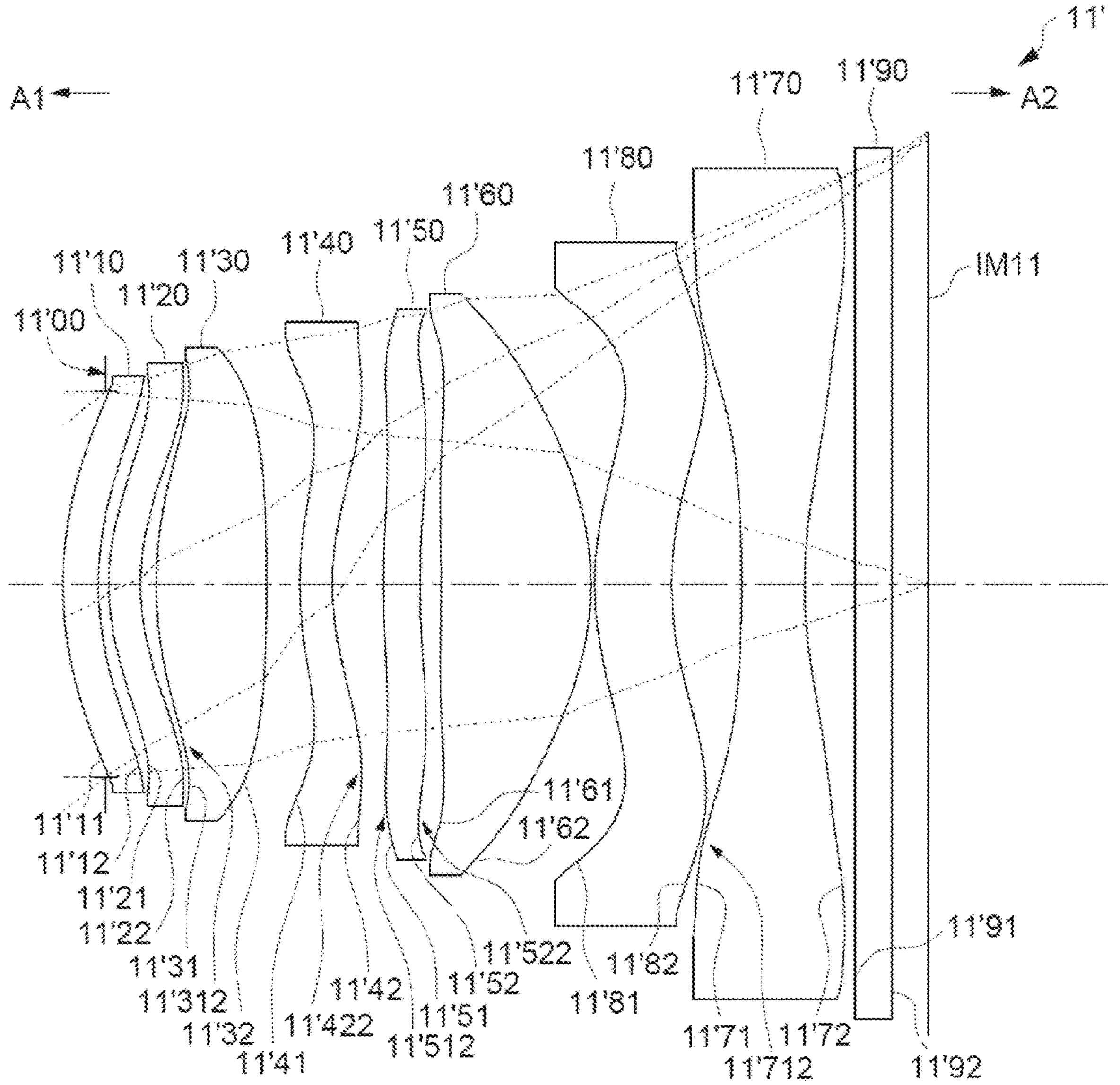
FIG. 46 depicts a cross-sectional view of an eleventh embodiment of an optical imaging lens having eight lens elements according to the present disclosure.
Figure 47:
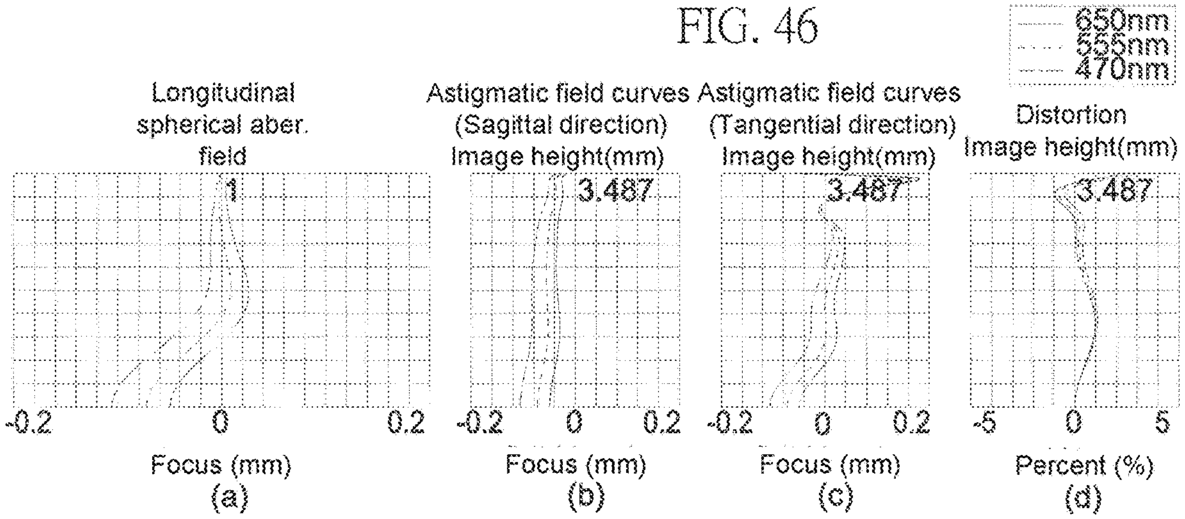
FIG. 47 depicts a chart of longitudinal spherical aberration and other kinds of optical aberrations of an eleventh embodiment of the optical imaging lens according to the present disclosure.

Reference is now made to FIGS. 46-49. FIG. 46 illustrates an example cross-sectional view of an optical imaging lens 11' having eight lens elements according to an eleventh example embodiment. FIG. 47 shows example charts of longitudinal spherical aberration and other kinds of optical aberrations of the optical imaging lens 11' according to the eleventh embodiment. FIG. 48 shows an example table of optical data of each lens element of the optical imaging lens 11' according to the eleventh example embodiment. FIG. 49 shows an example table of aspherical data of the optical imaging lens 11' according to the eleventh example embodiment. The reference numbers labeled in the present embodiment are similar to those in the first embodiment for the similar elements, but here the reference numbers are initialed with 11'; for example, reference number 11'31 may label the object-side surface of the third lens element 11'30, reference number 11'32 may label the image-side surface of the third lens element 11'30, etc.

As shown in FIG. 46, the optical imaging lens 11' of the present embodiment, in an order from an object side A1 to an image side A2 along an optical axis, may comprise an aperture stop 11'00, a first lens element 11'10, a second lens element 11'20, a third lens element 11'30, a fourth lens element 11'40, a fifth lens element 11'50, a sixth lens element 11'60, an eighth lens element 11'80 and a seventh lens element 11'70.

The arrangements of the convex or concave surface structures, including the object-side surfaces 11'11, 11'21, 11'41, 11'61, 11'81 and the image-side surfaces 11'12, 11'22, 11'32, 11'62, 11'72, 11'82 may be generally similar to the optical imaging lens 1 (FIG. 6 depicting the first example embodiment), but the differences between the optical imaging lens 1 and the optical imaging lens 11' may include the convex or concave surface structures of the object-side surfaces 11'31, 11'51, 11'71 and the image-side surfaces 11'42, 11'52. Additional differences may include a radius of curvature, a thickness, refracting power, aspherical data, and an effective focal length of each lens element. More specifically, the first lens element 11'10 may have negative refracting power, the object-side surface 11'31 of the third lens element 11'30 may comprise a concave portion 11'312 in a vicinity of a periphery of the third lens element 11'30, the image-side surface 11'42 of the fourth lens element 11'40 may comprise a convex portion 11'422 in a vicinity of a periphery of the fourth lens element 11'40, the object-side surface 11'51 of the fifth lens element 11'50 may comprise a convex portion 11'512 in a vicinity of a periphery of the fifth lens element 11'50, the image-side surface 11'52 of the fifth lens element 11'50 may comprise a concave portion 11'522 in a vicinity of a periphery of the fifth lens element 11'50, the object-side surface 11'71 of the seventh lens element 11'70 may comprise a concave portion 11'712 in a vicinity of a periphery of the seventh lens element 11'70.

Here, in the interest of clearly showing the drawings of a particular embodiment, only the surface shapes which are different from that in the first embodiment may be labeled. Please refer to FIG. 48 for the optical characteristics of each lens elements in the optical imaging lens 11' of the present embodiment.

From the vertical deviation of each curve shown in FIG. 47(*a*), the offset of the off-axis light relative to the image point may be within about ±0.12 mm. Referring to FIG. 47(*b*), the focus variation with respect to the three different wavelengths (470 nm, 555 nm, 650 nm) in the whole field may fall within about ±0.12 mm. Referring to FIG. 47(*c*), the focus variation with respect to the three different wavelengths (470 nm, 555 nm, 650 nm) in the whole field may fall within about ±0.2 mm. Referring to FIG. 47(*d*), the variation of the distortion aberration of the optical imaging lens 11' may be within about ±3%.

The values of EFL、T1、G12、T2、G23、T3、G34、T4、G45、T5、G56、T6、G67、T7、G7F、TF、GFP、BFL、ALT、AAG、TL、TTL、EFL/ALT、EFL/ImgH、TTL/ImgH、TL/ImgH、TL/AAG、(T1+T4+T7)/T2、(T1+T4+T7)/T5、(G23+T4+G45)/(G12+T2)、(G23+T4+G45)/(G34+T4)、(G23+G45+T5+G56)/T1、(G23+G45+T5+G56)/T7、(T1+T2+T3+T4+T5)/T6、(T1+T2+T4+T5+T6)/T3、(G12+G23+G34+BFL)/T2、(G12+G23+G34+BFL)/T5、ALT/G67、(AAG+BFL)/G67、ALT*Fno/(T3+G34)、ALT*Fno/(G12+T6) of this embodiment may be referred to FIG. 78B.

In comparison with the first embodiment, this embodiment may have a larger value of HFOV, and the difference between the thickness in a vicinity of the optical axis and the thickness in a vicinity of a periphery region may be smaller when compared to the first embodiment, so that this embodiment may be manufactured more easily and the yield rate may be higher when compared to the first embodiment.

Figure 50:
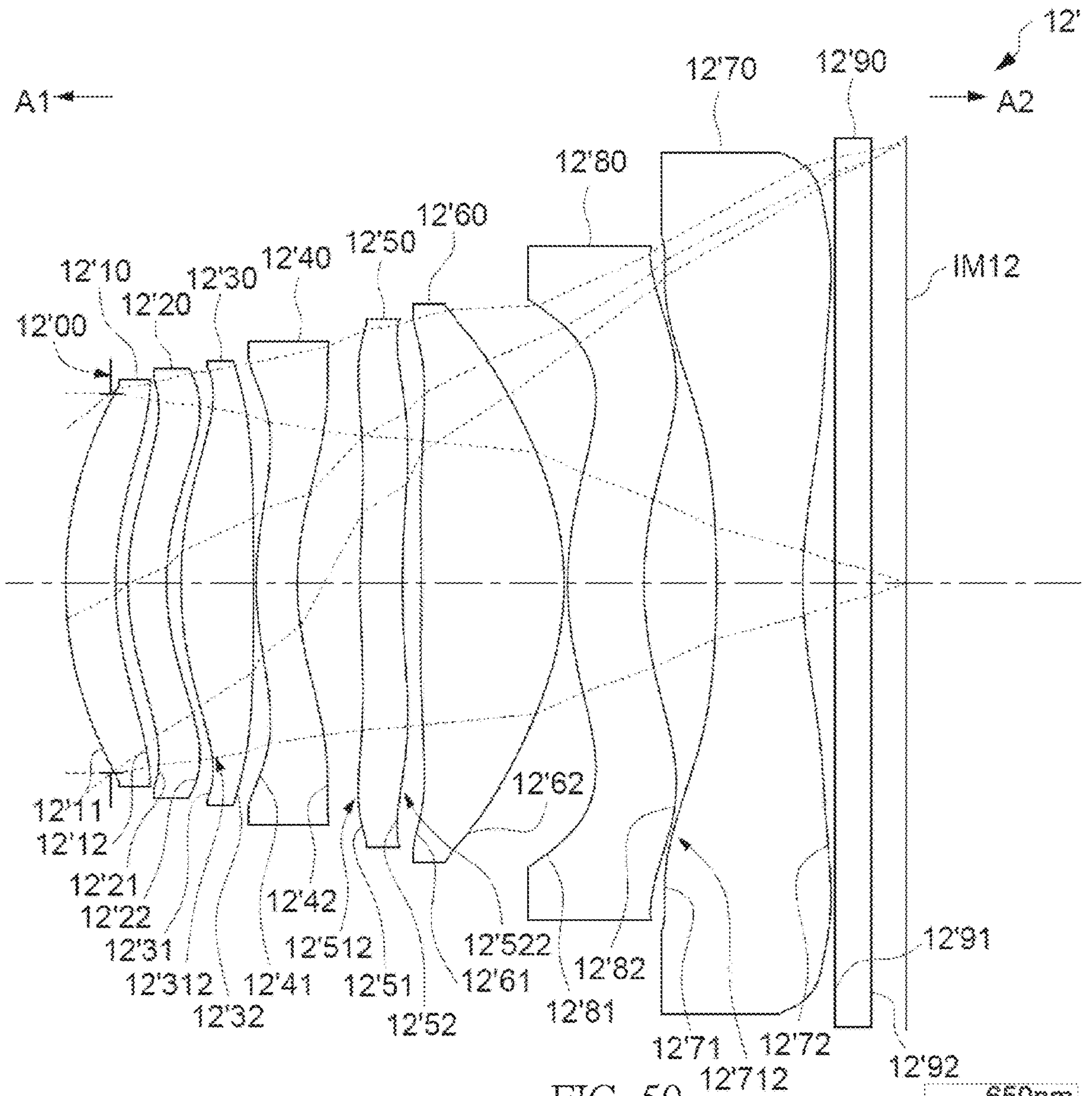
FIG. 50 depicts a cross-sectional view of a twelfth embodiment of an optical imaging lens having eight lens elements according to the present disclosure.
Figure 51:
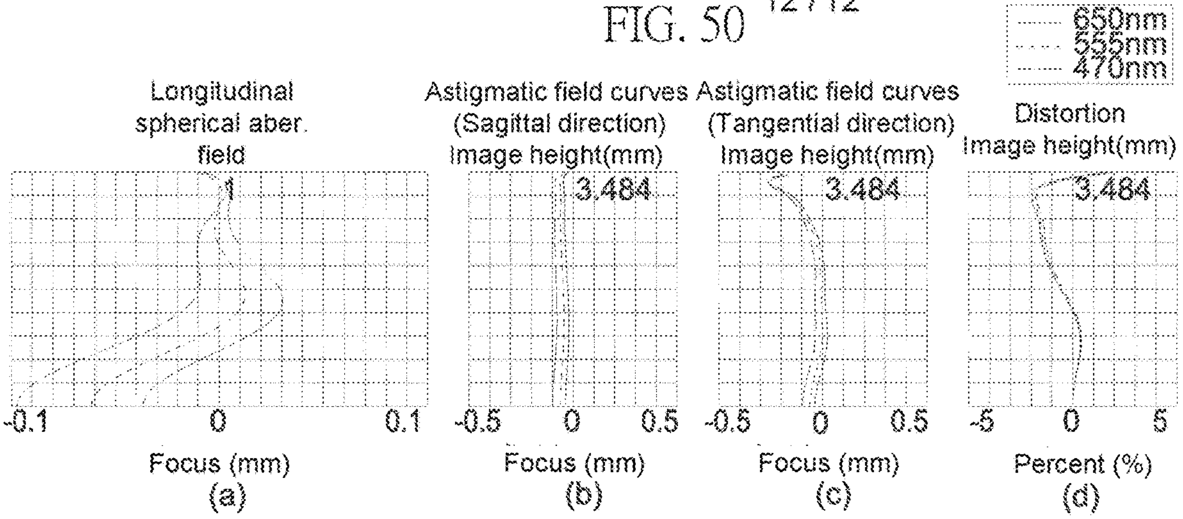
FIG. 51 depicts a chart of longitudinal spherical aberration and other kinds of optical aberrations of a twelfth embodiment of the optical imaging lens according to the present disclosure.

Reference is now made to FIGS. 50-53. FIG. 50 illustrates an example cross-sectional view of an optical imaging lens 12' having eight lens elements according to an twelfth example embodiment. FIG. 51 shows example charts of longitudinal spherical aberration and other kinds of optical aberrations of the optical imaging lens 12' according to the twelfth embodiment. FIG. 52 shows an example table of optical data of each lens element of the optical imaging lens 12' according to the twelfth example embodiment. FIG. 53 shows an example table of aspherical data of the optical imaging lens 12' according to the twelfth example embodiment. The reference numbers labeled in the present embodiment are similar to those in the first embodiment for the similar elements, but here the reference numbers are initialed with 12'; for example, reference number 12'31 may label the object-side surface of the third lens element 12'30, reference number 12'32 may label the image-side surface of the third lens element 12'30, etc.

As shown in FIG. 50, the optical imaging lens 12' of the present embodiment, in an order from an object side A1 to an image side A2 along an optical axis, may comprise an aperture stop 12'00, a first lens element 12'10, a second lens element 12'20, a third lens element 12'30, a fourth lens element 12'40, a fifth lens element 12'50, a sixth lens element 12'60, an eighth lens element 12'80 and an seventh lens element 12'70.

The arrangements of the convex or concave surface structures, including the object-side surfaces 12'11, 12'21, 12'41, 12'61, 12'81 and the image-side surfaces 12'12, 12'22, 12'32, 12'42, 12'62, 12'72, 12'82 may be generally similar to the optical imaging lens 1 (FIG. 6 depicting the first example embodiment), but the differences between the optical imaging lens 1 and the optical imaging lens 12' may include the convex or concave surface structures of the object-side surfaces 12'31, 12'51, 12'71 and image-side surface 12'52. Additional differences may include a radius of curvature, refracting power, a thickness, an aspherical data, and an effective focal length of each lens element. More specifically, the first lens element 12'10 may have negative refracting power, the object-side surface 12'31 of the third lens element 12'30 may comprise a concave portion 12'312 in a vicinity of a periphery of the third lens element 12'30, the object-side surface 12'51 of the fifth lens element 12'50 may comprise a convex portion 12'512 in a vicinity of a periphery of the fifth lens element 12'50, the image-side surface 12'52 of the fifth lens element 12'50 may comprise a concave portion 12'522 in a vicinity of a periphery of the fifth lens element 12'50, the object-side surface 12'71 of the seventh lens element 12'70 may comprise a concave portion 12'712 in a vicinity of a periphery of the seventh lens element 12'70.

Here, in the interest of clearly showing the drawings of a particular embodiment, only the surface shapes which are different from that in the first embodiment may be labeled. Please refer to FIG. 52 for the optical characteristics of each lens elements in the optical imaging lens 12' of the present embodiment.

From the vertical deviation of each curve shown in FIG. 51(*a*), the offset of the off-axis light relative to the image point may be within about ±0.1 mm. Referring to FIG. 51(*b*), the focus variation with respect to the three different wavelengths (470 nm, 555 nm, 650 nm) in the whole field may fall within about ±0.1 mm. Referring to FIG. 51(*c*), the focus variation with respect to the three different wavelengths (470 nm, 555 nm, 650 nm) in the whole field may fall within about ±0.3 mm. Referring to FIG. 51(*d*), the variation of the distortion aberration of the optical imaging lens 12' may be within about ±2%.

The values of EFL、T1、G12、T2、G23、T3、G34、T4、G45、T5、G56、T6、G67、T7、G7F、TF、GFP、BFL、ALT、AAG、TL、TTL、EFL/ALT、EFL/ImgH、TTL/ImgH、TL/ImgH、TL/AAG、(T1+T4+T7)/T2、(T1+T4+T7)/T5、(G23+T4+G45)/(G12+T2)、(G23+T4+G45)/(G34+T4)、(G23+G45+T5+G56)/T1、(G23+G45+T5+G56)/T7、(T1+T2+T3+T4+T5)/T6、(T1+T2+T4+T5+T6)/T3、(G12+G23+G34+BFL)/T2、(G12+G23+G34+BFL)/T5、ALT/G67、(AAG+BFL)/G67、ALT*Fno/(T3+G34)、ALT*Fno/(G12+T6) of this embodiment may be referred to FIG. 78B.

In comparison with the first embodiment, this embodiment may have a bigger value of HFOV, and the difference between the thickness in a vicinity of the optical axis and the thickness in a vicinity of a periphery region may be smaller when compared to the first embodiment, so that this embodiment may be manufactured more easily and the yield rate may be higher when compared to the first embodiment.

Figure 54:
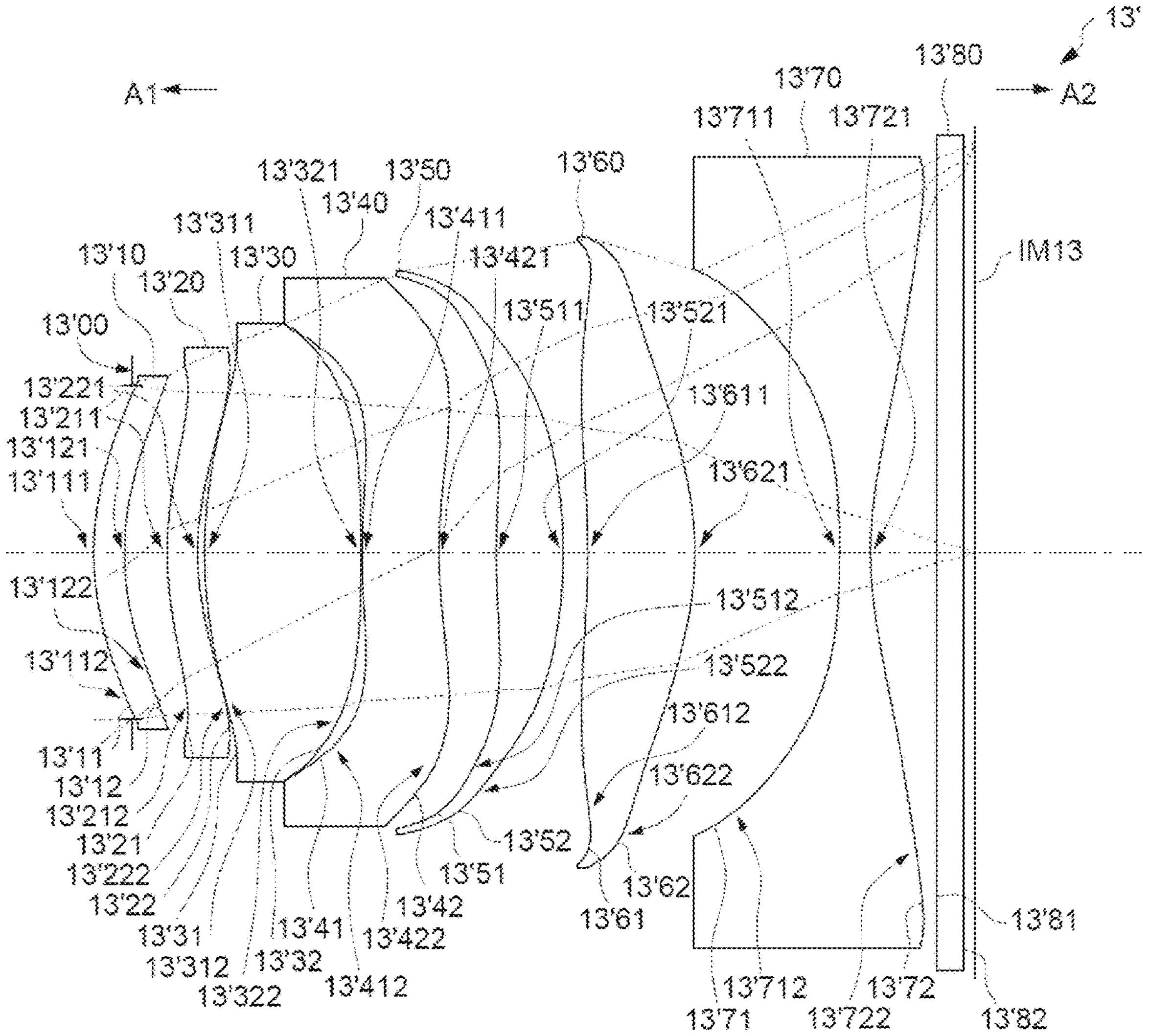
FIG. 54 depicts a cross-sectional view of a thirteenth embodiment of an optical imaging lens having seven lens elements according to the present disclosure.
Figure 55:
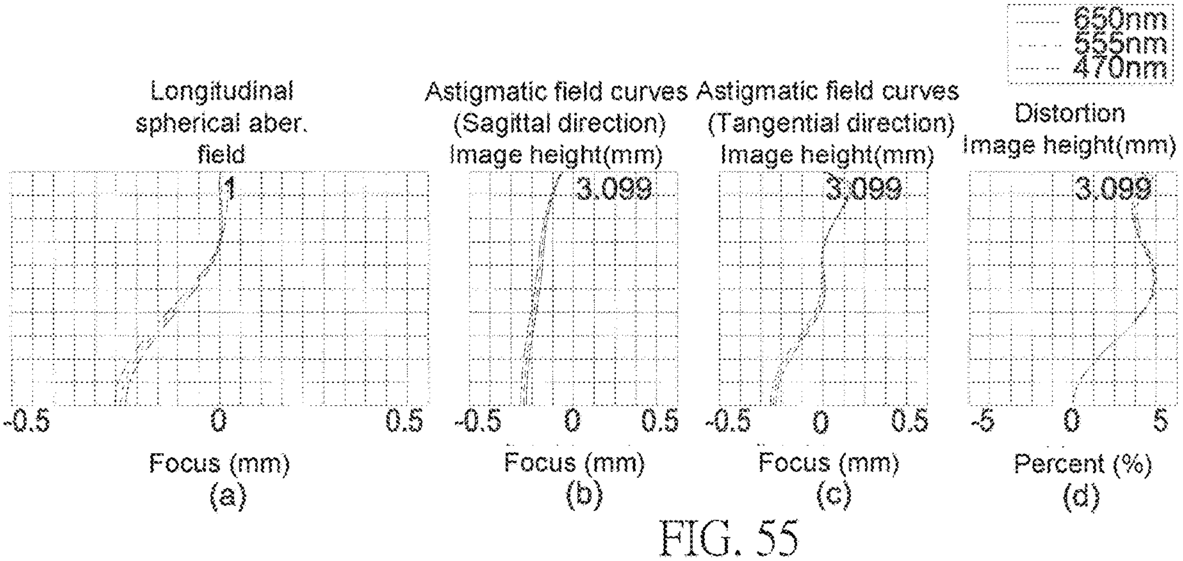
FIG. 55 depicts a chart of longitudinal spherical aberration and other kinds of optical aberrations of a thirteenth embodiment of the optical imaging lens according to the present disclosure.

Reference is now made to FIGS. 54-57. FIG. 54 illustrates an example cross-sectional view of an optical imaging lens 13' having eight lens elements according to an thirteenth example embodiment. FIG. 55 shows example charts of longitudinal spherical aberration and other kinds of optical aberrations of the optical imaging lens 13' according to the thirteenth embodiment. FIG. 56 shows an example table of optical data of each lens element of the optical imaging lens 13' according to the thirteenth example embodiment. FIG. 57 shows an example table of aspherical data of the optical imaging lens 13' according to the thirteenth example embodiment. The reference numbers labeled in the present embodiment are similar to those in the first embodiment for the similar elements, but here the reference numbers are initialed with 13'; for example, reference number 13'31 may label the object-side surface of the third lens element 13'30, reference number 13'32 may label the image-side surface of the third lens element 13'30, etc.

As shown in FIG. 54, the optical imaging lens 13' of the present embodiment, in an order from an object side A1 to an image side A2 along an optical axis, may comprise an aperture stop 13'00, a first lens element 13'10, a second lens element 13'20, a third lens element 13'30, a fourth lens element 13'40, a fifth lens element 13'50, a sixth lens element 13'60 and a seventh lens element 13'70, the first lens element 13'10 being arranged to be a lens element having refracting power in a first order from the object side A1 to the image side A2, the second lens element 13'20 being arranged to be a lens element having refracting power in a second order from the object side A1 to the image side A2, the third lens element 13'30 being arranged to be a lens element having refracting power in a third order from the object side A1 to the image side A2, the fourth lens element 13'40 being arranged to be a lens element having refracting power in a fourth order from the object side A1 to the image side A2, the fifth lens element 13'50 being arranged to be a lens element having refracting power in a fifth order from the object side A1 to the image side A2, the sixth lens element 13'60 being arranged to be a lens element having refracting power in a sixth order from the object side A1 to the image side A2, the seventh lens element 13'70 being arranged to be a lens element having refracting power in a last order from the object side A1 to the image side A2. A filtering unit 13'80 and an image plane IM13 of an image sensor (not shown) may be positioned at the image side A2 of the optical imaging lens 13'. Each of the first, second, third, fourth, fifth sixth and seventh lens elements 13'10, 13'20, 13'30, 13'40, 13'50, 13'60, 13'70 and the filtering unit 13'80 may comprise an object-side surface 13'11/13'21/13'31/13'41/13'51/13'61/13'71/13'81 facing toward the object side A1 and an image-side surface 13'12/13'22/13'32/13'42/13'52/13'62/13'72/13'82 facing toward the image side A2. The example embodiment of the filtering unit 13'80 illustrated may be an IR cut filter (infrared cut filter) positioned between the seventh lens element 13'70 and the image plane IM13. The filtering unit 13'80 may selectively absorb light passing optical imaging lens 13' that has a specific wavelength. For example, if IR light is absorbed, IR light which is not seen by human eyes may be prohibited from producing an image on the image plane IM13.

Exemplary embodiments of each lens element of the optical imaging lens 13' will now be described with reference to the drawings. The lens elements of the optical imaging lens 13' may be constructed using plastic materials in this embodiment.

An example embodiment of the first lens element 13'10 may have negative refracting power. The object-side surface 13'11 may comprise a convex portion 13'111 in a vicinity of an optical axis and a convex portion 13'112 in a vicinity of a periphery of the first lens element 13'10. The image-side surface 13'12 may comprise a concave portion 13'121 in a vicinity of the optical axis and a concave portion 13'122 in a vicinity of the periphery of the first lens element 13'10.

An example embodiment of the second lens element 13'20 may have negative refracting power. The object-side surface 13'21 may comprise a convex portion 13'211 in a vicinity of the optical axis and a concave portion 13'212 in a vicinity of a periphery of the second lens element 13'20. The image-side surface 13'22 may comprise a concave portion 13'221 in a vicinity of the optical axis and a convex portion 13'222 in a vicinity of the periphery of the second lens element 13'20.

An example embodiment of the third lens element 13'30 may have positive refracting power. The object-side surface 13'31 may comprise a convex portion 13'311 in a vicinity of the optical axis and a convex portion 13'312 in a vicinity of a periphery of the third lens element 13'30. The image-side surface 13'32 may comprise a convex portion 13'321 in a vicinity of the optical axis and a convex portion 13'322 in a vicinity of the periphery of the third lens element 13'30.

An example embodiment of the fourth lens element 13'40 may have negative refracting power. The object-side surface 13'41 may comprise a convex portion 13'411 in a vicinity of the optical axis and a concave portion 13'412 in a vicinity of a periphery of the fourth lens element 13'40. The image-side surface 13'42 may comprise a concave portion 13'421 in a vicinity of the optical axis and a convex portion 13'422 in a vicinity of the periphery of the fourth lens element 13'40.

An example embodiment of the fifth lens element 13'50 may have positive refracting power. The object-side surface 13'51 may comprise a convex portion 13'511 in a vicinity of the optical axis and a concave portion 13'512 in a vicinity of a periphery of the fifth lens element 13'50. The image-side surface 13'52 may comprise a convex portion 13'521 in a vicinity of the optical axis and a convex portion 13'522 in a vicinity of the periphery of the fifth lens element 13'50.

An example embodiment of the sixth lens element 13'60 may have positive refracting power. The object-side surface 13'61 may comprise a concave portion 13'611 in a vicinity of the optical axis and a concave portion 13'612 in a vicinity of a periphery of the sixth lens element 13'60. The image-side surface 13'62 may comprise a convex portion 13'621 in a vicinity of the optical axis and a convex portion 13'622 in a vicinity of the periphery of the sixth lens element 13'60.

An example embodiment of the seventh lens element 13'70 may have negative refracting power. The object-side surface 13'71 may comprise a concave portion 13'711 in a vicinity of the optical axis and a concave portion 13'712 in a vicinity of a periphery of the seventh lens element 13'70. The image-side surface 13'72 may comprise a concave portion 13'721 in a vicinity of the optical axis and a convex portion 13'722 in a vicinity of the periphery of the seventh lens element 13'70.

The aspherical surfaces including the object-side surface 13'11 and the image-side surface 13'12 of the first lens element 13'10, the object-side surface 13'21 and the image-side surface 13'22 of the second lens element 13'20, the object-side surface 13'31 and the image-side surface 13'32 of the third lens element 13'30, the object-side surface 13'41 and the image-side surface 13'42 of the fourth lens element 13'40, the object-side surface 13'51 and the image-side surface 13'52 of the fifth lens element 13'50, the object-side surface 13'61 and the image-side surface 13'62 of the sixth lens element 13'60, and the object-side surface 13'71 and the image-side surface 13'72 of the seventh lens element 13'70 may all be defined by the following aspherical formula (1):

$$Z(Y) = \frac{Y^2}{R} \Bigg/ \left(1 + \sqrt{1 - (1 + K)\frac{Y^2}{R^2}}\right) + \sum_{i=1}^{n} a_{2i} \times Y^{2i} \qquad \text{formula (1)}$$

wherein,

- R represents the radius of curvature of the surface of the lens element;
- Z represents the depth of the aspherical surface (i.e., the perpendicular distance between the point of the aspherical surface at a distance Y from the optical axis and the tangent plane of the vertex on the optical axis of the aspherical surface);
- Y represents the perpendicular distance between the point of the aspherical surface and the optical axis;
- K represents a conic constant; and
- $a_{2i}$ represents an aspherical coefficient of $2i^{th}$ level.

Here, in the interest of clearly showing the drawings of a particular embodiment, only the surface shapes which are different from that in the first embodiment may be labeled. Please refer to FIG. 56 for the optical characteristics of each lens elements in the optical imaging lens 13' of the present embodiment.

From the vertical deviation of each curve shown in FIG. 55(*a*), the offset of the off-axis light relative to the image point may be within about ±0.3 mm. Referring to FIG. 55(*b*), the focus variation with respect to the three different wavelengths (470 nm, 555 nm, 650 nm) in the whole field may fall within about ±0.3 mm. Referring to FIG. 55(*c*), the focus variation with respect to the three different wavelengths (470 nm, 555 nm, 650 nm) in the whole field may fall within about ±0.3 mm. Referring to FIG. 55(*d*), the variation of the distortion aberration of the optical imaging lens 13' may be within about ±4%.

The values of EFL、T1、G12、T2、G23、T3、G34、T4、G45、T5、G56、T6、G67、T7、G7F、TF、GFP、BFL、ALT、AAG、TL、TTL、EFL/ALT、EFL/ImgH、TTL/ImgH、TL/ImgH、TL/AAG、(T1+T4+T7)/T2、(T1+T4+T7)/T5、(G23+T4+G45)/(G12+T2) (G23+T4+G45)/(G34+T4) (G23+G45+T5+G56)/T1 (G23+G45+T5+G56)/T7、(T1+T2+T3+T4+T5)/T6、(T1+T2+T4+T5+T6)/T3、(G12+G23+G34+BFL)/T2、(G12+G23+G34+BFL)/T5、ALT/G67、(AAG+BFL)/G67、ALT*Fno/(T3+G34)、ALT*Fno/(G12+T6) of this embodiment may be referred to FIG. 78B.

In this embodiment, the distance from the object-side surface 13'11 of the first lens element 13'10 to the image plane IM13 along the optical axis (TTL) may be about 6.731 mm, the value of Fno is 1.4, the half field of view (HFOV) is 38.295 degree. In accordance with aberration values described above, the present embodiment may provide an optical imaging lens 13' having a good imaging quality, moreover, the length of the optical imaging lens 13' may be shortened to about 7 mm or less and the optical imaging lens 13' may have a larger aperture and a bigger half field of view.

Figure 58:
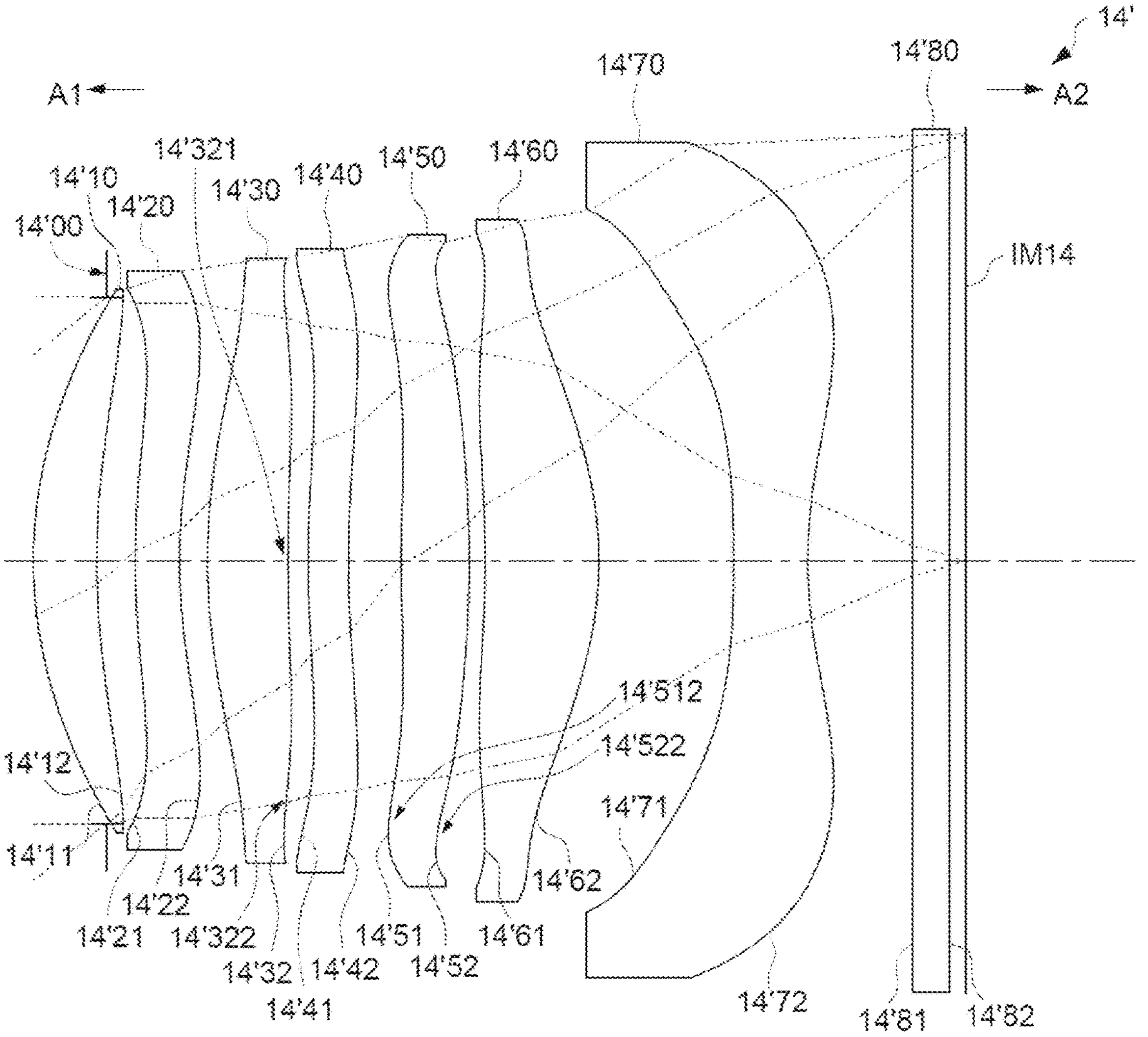
FIG. 58 depicts a cross-sectional view of a fourteenth embodiment of an optical imaging lens having seven lens elements according to the present disclosure.
Figure 59:
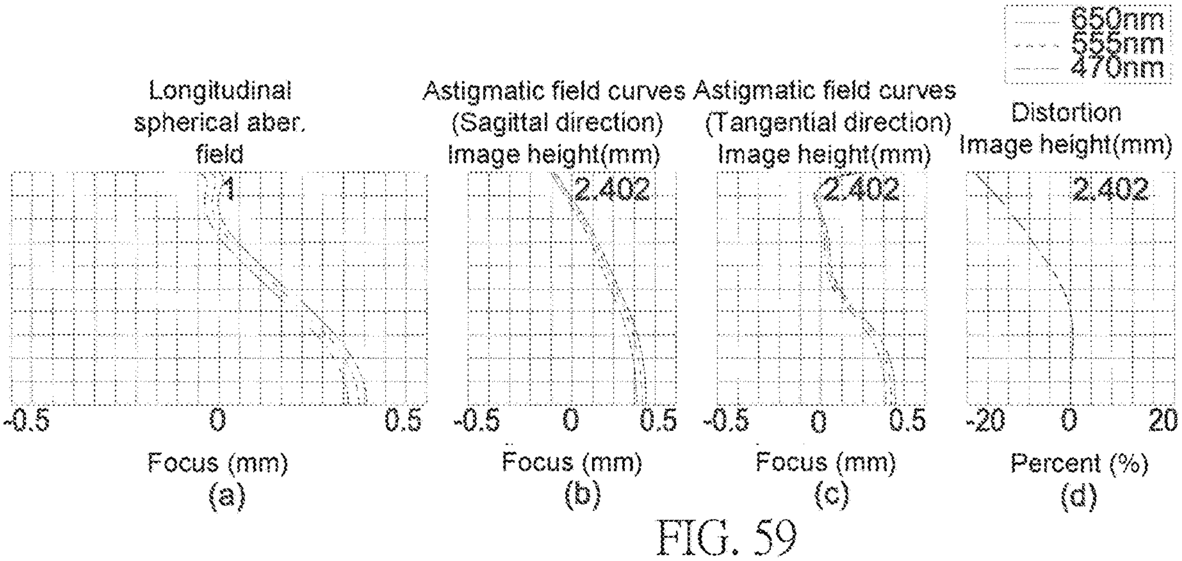
FIG. 59 depicts a chart of longitudinal spherical aberration and other kinds of optical aberrations of a fourteenth embodiment of the optical imaging lens according to the present disclosure.

Reference is now made to FIGS. 58-61. FIG. 58 illustrates an example cross-sectional view of an optical imaging lens 14' having seven lens elements according to an fourteenth example embodiment. FIG. 59 shows example charts of longitudinal spherical aberration and other kinds of optical aberrations of the optical imaging lens 14' according to the fourteenth embodiment. FIG. 60 shows an example table of optical data of each lens element of the optical imaging lens 14' according to the fourteenth example embodiment. FIG. 61 shows an example table of aspherical data of the optical imaging lens 14' according to the fourteenth example embodiment. The reference numbers labeled in the present embodiment are similar to those in the thirteenth embodiment for the similar elements, but here the reference numbers are initialed with 14'; for example, reference number 14'31 may label the object-side surface of the third lens element 14'30, reference number 14'32 may label the image-side surface of the third lens element 14'30, etc.

As shown in FIG. 58, the optical imaging lens 14' of the present embodiment, in an order from an object side A1 to an image side A2 along an optical axis, may comprise an aperture stop 14'00, a first lens element 14'10, a second lens element 14'20, a third lens element 14'30, a fourth lens element 14'40, a fifth lens element 14'50, a sixth lens element 14'60 and a seventh lens element 14'70.

The arrangements of the convex or concave surface structures, including the object-side surfaces 14'11, 14'21, 14'31, 14'41, 14'61, 14'71 and the image-side surfaces 14'12, 14'22, 14'42, 14'62, 14'72 may be generally similar to the optical imaging lens 13', but the differences between the optical imaging lens 13' and the optical imaging lens 14' may include the convex or concave surface structures of the object-side surface 14'51 and image-side surfaces 14'32, 14'52. Additional differences may include a radius of curvature, refracting power, a thickness, an aspherical data, and an effective focal length of each lens element. More specifically, the first lens element 14'10 may have positive refracting power, the image-side surface 14'32 of the third lens element 14'30 may comprise a concave portion 14'321 in a vicinity of the optical axis and a concave portion 14'322 in a vicinity of a periphery of the third lens element 14'30, the object-side surface 14'51 of the fifth lens element 14'50 may comprise a convex portion 14'512 in a vicinity of a periphery of the fifth lens element 14'50, the image-side surface 14'52 of the fifth lens element 14'50 may comprise a concave portion 14'522 in a vicinity of a periphery of the fifth lens element 14'50.

Here, in the interest of clearly showing the drawings of a particular embodiment, only the surface shapes which are different from that in the thirteenth embodiment may be labeled. Please refer to FIG. 60 for the optical characteristics of each lens elements in the optical imaging lens 14' of the present embodiment.

From the vertical deviation of each curve shown in FIG. 59(*a*), the offset of the off-axis light relative to the image point may be within about ±0.4 mm. Referring to FIG. 59(*b*), the focus variation with respect to the three different wavelengths (470 nm, 555 nm, 650 nm) in the whole field may fall within about ±0.4 mm. Referring to FIG. 59(*c*), the focus variation with respect to the three different wavelengths (470 nm, 555 nm, 650 nm) in the whole field may fall within about ±0.4 mm. Referring to FIG. 59(*d*), the variation of the distortion aberration of the optical imaging lens 14' may be within about ±20%.

The values of EFL、T1、G12、T2、G23、T3、G34、T4、G45、T5、G56、T6、G67、T7、G7F、TF、GFP、BFL、ALT、AAG、TL、TTL、EFL/ALT、EFL/ImgH、TL/ImgH、TTL/ImgH、TL/AAG、(T1+T4+T7)/T2、(T1+T4+T7)/T5、(G23+T4+G45)/(G12+T2)、(G23+T4+G45)/(G34+T4)、(G23+G45+T5+G56)/T1、(G23+G45+T5+G56)/T7、(T1+T2+T3+T4+T5)/T6、(T1+T2+T4+T5+T6)/T3、(G12+G23+G34+BFL)/T2、(G12+G23+G34+BFL)/T5、ALT/G67、(AAG+BFL)/G67、ALT*Fno/(T3+G34)、ALT*Fno/(G12+T6) of this embodiment may be referred to FIG. 78B.

In comparison with the thirteenth embodiment, this embodiment may have a smaller value of TTL, and the difference between the thickness in a vicinity of the optical axis and the thickness in a vicinity of a periphery region may be smaller when compared to the thirteenth embodiment, so that this embodiment may be manufactured more easily and the yield rate may be higher when compared to the thirteenth embodiment.

Figure 62:
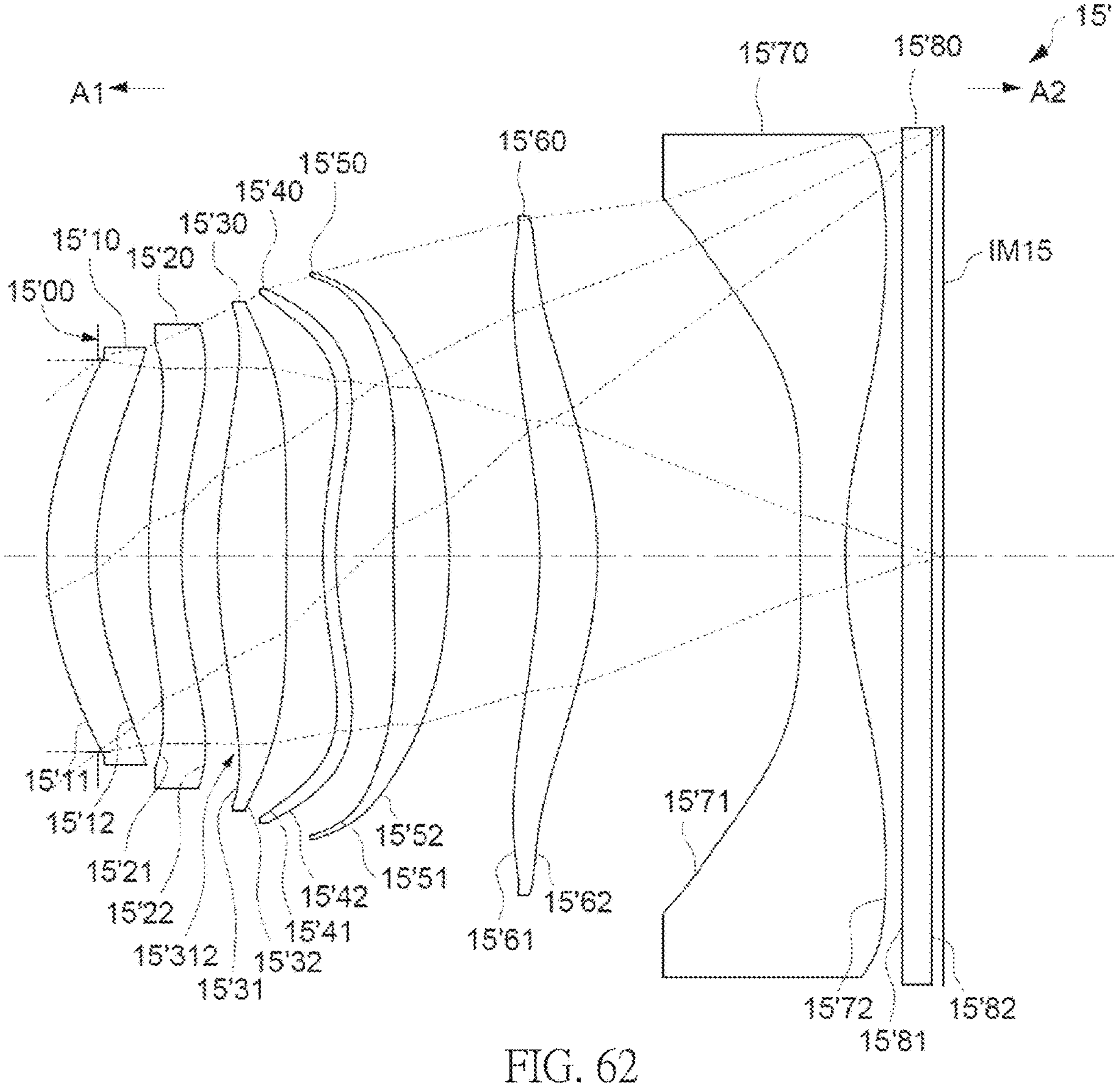
FIG. 62 depicts a cross-sectional view of a fifteenth embodiment of an optical imaging lens having seven lens elements according to the present disclosure.
Figure 63:
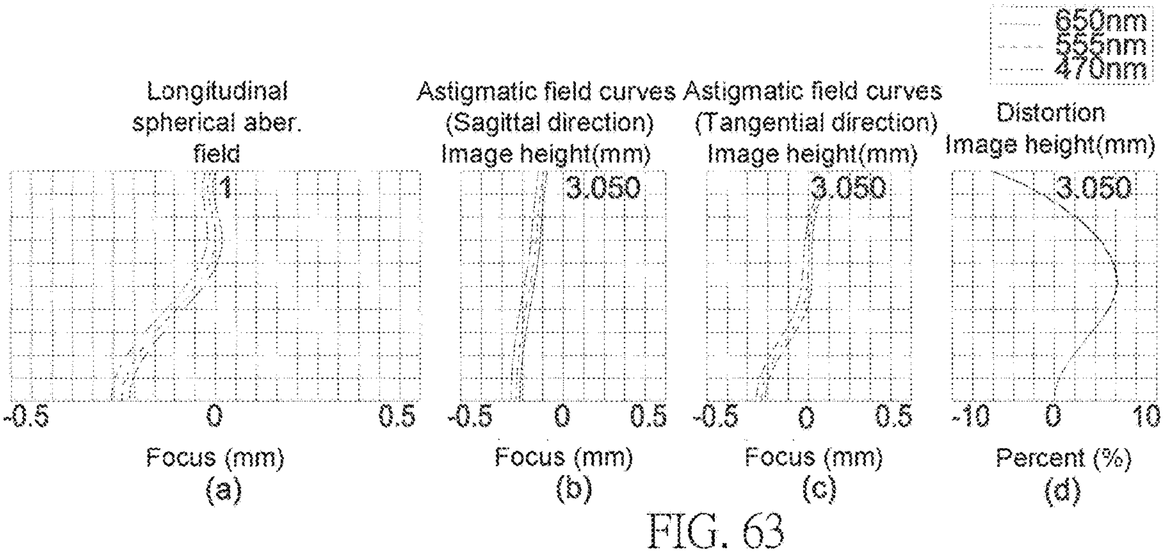
FIG. 63 depicts a chart of longitudinal spherical aberration and other kinds of optical aberrations of a fifteenth embodiment of the optical imaging lens according to the present disclosure.

Reference is now made to FIGS. 62-65. FIG. 62 illustrates an example cross-sectional view of an optical imaging lens 15' having seven lens elements according to an fifteenth example embodiment. FIG. 63 shows example charts of longitudinal spherical aberration and other kinds of optical aberrations of the optical imaging lens 15' according to the fifteenth embodiment. FIG. 64 shows an example table of optical data of each lens element of the optical imaging lens 15' according to the fifteenth example embodiment. FIG. 65 shows an example table of aspherical data of the optical imaging lens 15' according to the fifteenth example embodiment. The reference numbers labeled in the present embodiment are similar to those in the thirteenth embodiment for the similar elements, but here the reference numbers are initialed with 15'; for example, reference number 15'31 may label the object-side surface of the third lens element 15'30, reference number 15'32 may label the image-side surface of the third lens element 15'30, etc.

As shown in FIG. 62, the optical imaging lens 15' of the present embodiment, in an order from an object side A1 to an image side A2 along an optical axis, may comprise an aperture stop 15'00, a first lens element 15'10, a second lens element 15'20, a third lens element 15'30, a fourth lens element 15'40, a fifth lens element 15'50, a sixth lens element 15'60 and a seventh lens element 15'70.

The arrangements of the convex or concave surface structures, including the object-side surfaces 15'11, 15'21, 15'41, 15'51, 15'61, 15'71 and the image-side surfaces 15'12, 15'22, 15'32, 15'42, 15'52, 15'62, 15'72 may be generally similar to the optical imaging lens 13', but the differences between the optical imaging lens 13' and the optical imaging lens 15' may include the convex or concave surface structures of the object-side surface 15'31. Additional differences may a radius of curvature, a thickness, refracting power, aspherical data, and an effective focal length of each lens element. More specially, the first lens element 15'10 have positive refracting power, the object-side surface 15'31 of the third lens element 15'30 may comprise a concave portion 15'312 in a vicinity of a periphery of the third lens element 15'30.

Here, in the interest of clearly showing the drawings of a particular embodiment, only the surface shapes which are different from that in the thirteenth embodiment may be labeled. Please refer to FIG. 64 for the optical characteristics of each lens elements in the optical imaging lens 15' of the present embodiment.

From the vertical deviation of each curve shown in FIG. 63(*a*), the offset of the off-axis light relative to the image point may be within about ±0.3 mm. Referring to FIG. 63(*b*), the focus variation with respect to the three different wavelengths (470 nm, 555 nm, 650 nm) in the whole field may fall within about ±0.3 mm. Referring to FIG. 63(*c*), the focus variation with respect to the three different wavelengths (470 nm, 555 nm, 650 nm) in the whole field may fall within about ±0.3 mm. Referring to FIG. 63(*d*), the variation of the distortion aberration of the optical imaging lens 15' may be within about ±6%.

The values of EFL、T1、G12、T2、G23、T3、G34、T4、G45、T5、G56、T6、G67、T7、G7F、TF、GFP、BFL、ALT、AAG、TL、TTL、EFL/ALT、EFL/ImgH、TTL/ImgH、TL/ImgH、TL/AAG、(T1+T4+T7)/T2、(T1+T4+T7)/T5、(G23+T4+G45)/(G12+T2)、(G23+T4+G45)/(G34+T4)、(G23+G45+T5+G56)/T1、(G23+G45+T5+G56)/T7、(T1+T2+T3+T4+T5)/T6、(T1+T2+T4+T5+T6)/T3、(G12+G23+G34+BFL)/T2、(G12+G23+G34+BFL)/T5、ALT/G67、(AAG+BFL)/G67、ALT*Fno/(T3+G34)、ALT*Fno/(G12+T6) of this embodiment may be referred to FIG. 78B.

In comparison with the thirteenth embodiment, this embodiment may have a smaller value of TTL, and the difference between the thickness in a vicinity of the optical axis and the thickness in a vicinity of a periphery region may be smaller when compared to the thirteenth embodiment, so that this embodiment may be manufactured more easily and the yield rate may be higher when compared to the thirteenth embodiment.

Figure 66:
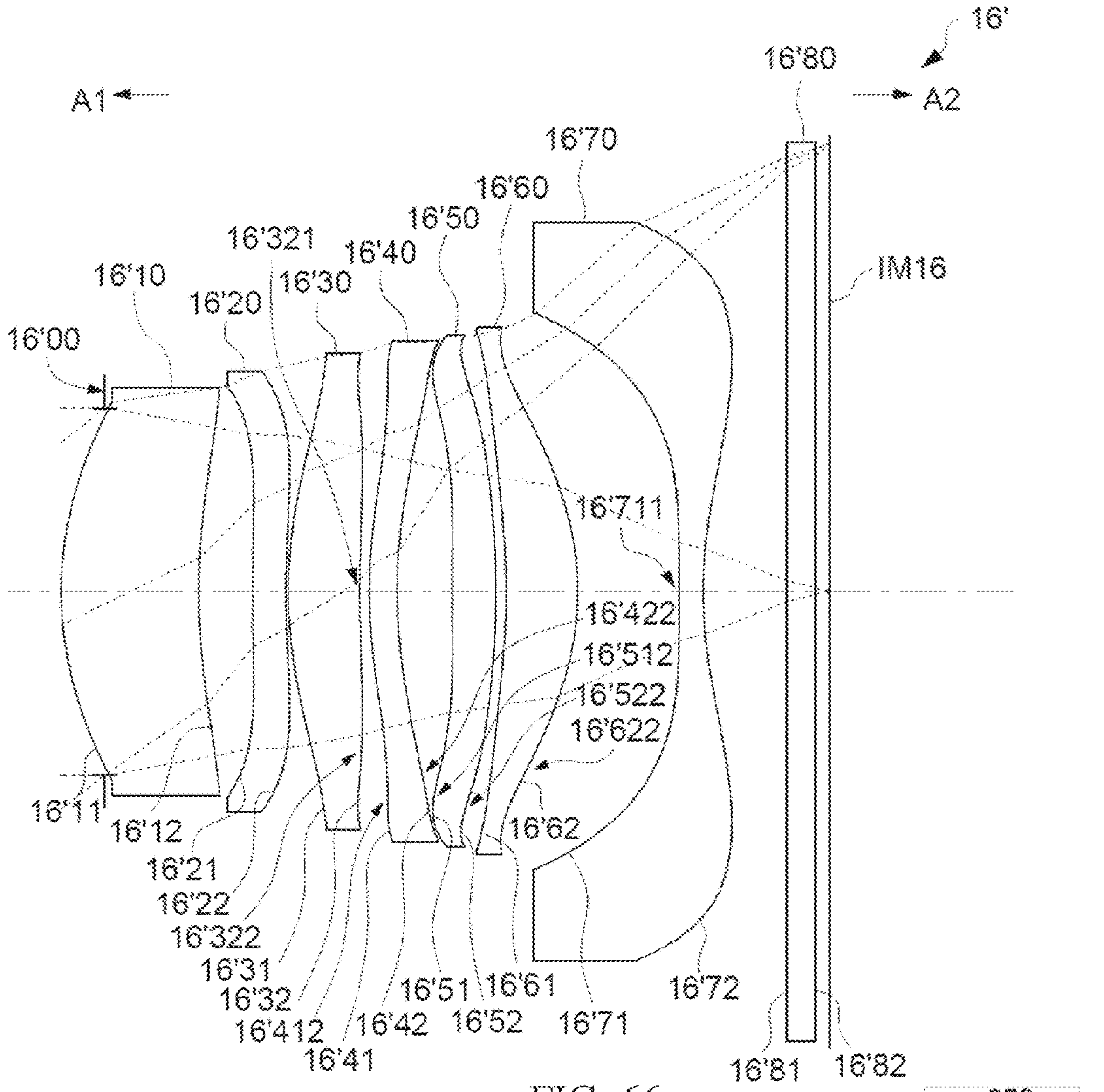
FIG. 66 depicts a cross-sectional view of a sixteenth embodiment of an optical imaging lens having seven lens elements according to the present disclosure.
Figure 67:
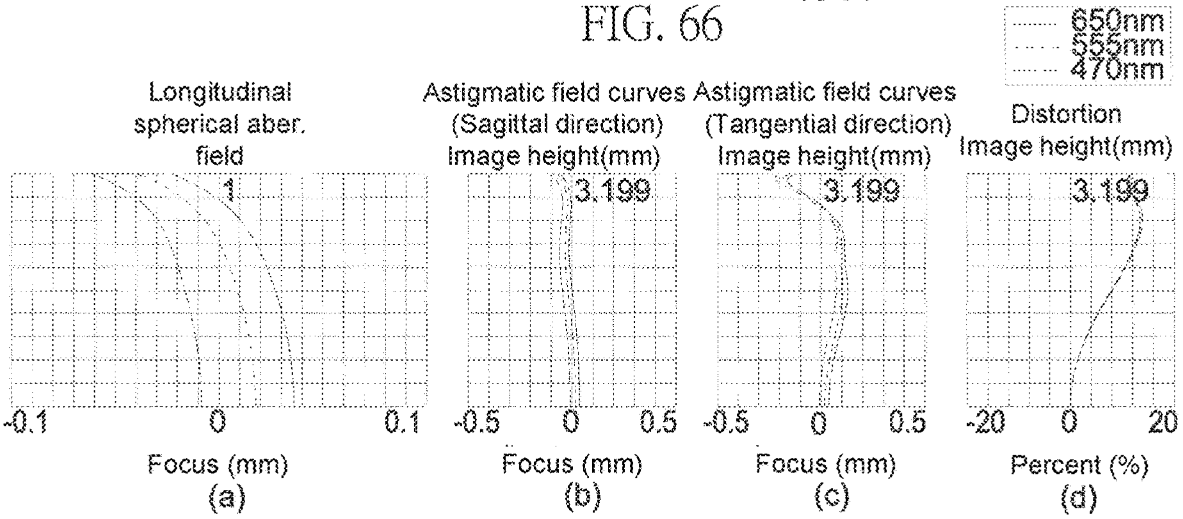
FIG. 67 depicts a chart of longitudinal spherical aberration and other kinds of optical aberrations of a sixteenth embodiment of the optical imaging lens according to the present disclosure.

Reference is now made to FIGS. 66-69. FIG. 66 illustrates an example cross-sectional view of an optical imaging lens 16' having seven lens elements according to an sixteenth example embodiment. FIG. 67 shows example charts of longitudinal spherical aberration and other kinds of optical aberrations of the optical imaging lens 16' according to the sixteenth embodiment. FIG. 68 shows an example table of optical data of each lens element of the optical imaging lens 16' according to the sixteenth example embodiment. FIG. 69 shows an example table of aspherical data of the optical imaging lens 16' according to the sixteenth example embodiment. The reference numbers labeled in the present embodiment are similar to those in the thirteenth embodiment for the similar elements, but here the reference numbers are initialed with 16'; for example, reference number 16'31 may label the object-side surface of the third lens element 16'30, reference number 16'32 may label the image-side surface of the third lens element 16'30, etc.

As shown in FIG. 66, the optical imaging lens 16' of the present embodiment, in an order from an object side A1 to an image side A2 along an optical axis, may comprise a first lens element 16'10, an aperture stop 16'00, a second lens element 16'20, a third lens element 16'30, a fourth lens element 16'40, a fifth lens element 16'50, a sixth lens element 16'60 and a seventh lens element 16'70.

The arrangements of the convex or concave surface structures, including the object-side surfaces 16'11, 16'21, 16'31, 16'61 and the image-side surfaces 16'12, 16'22, 16'62, 16'72 may be generally similar to the optical imaging lens 13', but the differences between the optical imaging lens 13' and the optical imaging lens 16' may include the convex or concave surface structures of the object-side surfaces 16'41, 16'51, 16'71 and the image-side surfaces 16'32, 16'42, 16'52. Additional differences may a radius of curvature, a thickness, refracting power, aspherical data, and an effective focal length of each lens element. More specially, the first lens element 16'10 have positive refracting power, the fourth lens element 16'40 have positive refracting power, the image-side surface 16'32 of the third lens element 16'30 may comprise a concave portion 16'321 in a vicinity of the optical axis and a concave portion 16'322 in a vicinity of a periphery of the third lens element 16'30, the object-side surface 16'41 of the fourth lens element 16'40 may comprise a convex portion 16'412 in a vicinity of a periphery of the fourth lens element 16'40, the object-side surface 16'51 of the fifth lens element 16'50 may comprise a convex portion 16'512 in a vicinity of a periphery of the fifth lens element 16'50, the image-side surface 16'52 of the fifth lens element 16'50 may comprise a concave portion 16'522 in a vicinity of a periphery of the fifth lens element 16'50, the image-side surface 16'62 of the sixth lens element 16'60 may comprise a concave portion 16'622 in a vicinity of a periphery of the sixth lens element 16'60, the object-side surface 16'71 of the seventh lens element 16'70 may comprise a convex portion 16'711 in a vicinity of the optical axis.

Here, in the interest of clearly showing the drawings of a particular embodiment, only the surface shapes which are different from that in the thirteenth embodiment may be labeled. Please refer to FIG. 68 for the optical characteristics of each lens elements in the optical imaging lens 16' of the present embodiment.

From the vertical deviation of each curve shown in FIG. 67(*a*), the offset of the off-axis light relative to the image point may be within about ±0.06 mm. Referring to FIG. 67(*b*), the focus variation with respect to the three different wavelengths (470 nm, 555 nm, 650 nm) in the whole field may fall within about ±0.1 mm. Referring to FIG. 67(*c*), the focus variation with respect to the three different wavelengths (470 nm, 555 nm, 650 nm) in the whole field may fall within about ±0.25 mm. Referring to FIG. 67(*d*), the variation of the distortion aberration of the optical imaging lens 16' may be within about ±16%.

The values of EFL、T1、G12、T2、G23、T3、G34、T4、G45、T5、G56、T6、G67、T7、G7F、TF、GFP、BFL、ALT、AAG、TL、TTL、EFL/

ALT、EFL/ImgH、TTL/ImgH、TL/ImgH、TL/AAG、(T1+T4+T7)/T2、(T1+T4+T7)/T5、(G23+T4+G45)/(G12+T2)、(G23+T4+G45)/(G34+T4)、(G23+G45+T5+G56)/T1、(G23+G45+T5+G56)/T7、(T1+T2+T3+T4+T5)/T6、(T1+T2+T4+T5+T6)/T3、(G12+G23+G34+BFL)/T2、(G12+G23+G34+BFL)/T5、ALT/G67、(AAG+BFL)/G67、ALT*Fno/(T3+G34)、ALT*Fno/(G12+T6) of this embodiment may be referred to FIG. 78B.

In comparison with the thirteenth embodiment, this embodiment may have a smaller values of TTL, longitudinal spherical aberration and astigmatism aberration.

Figure 70:
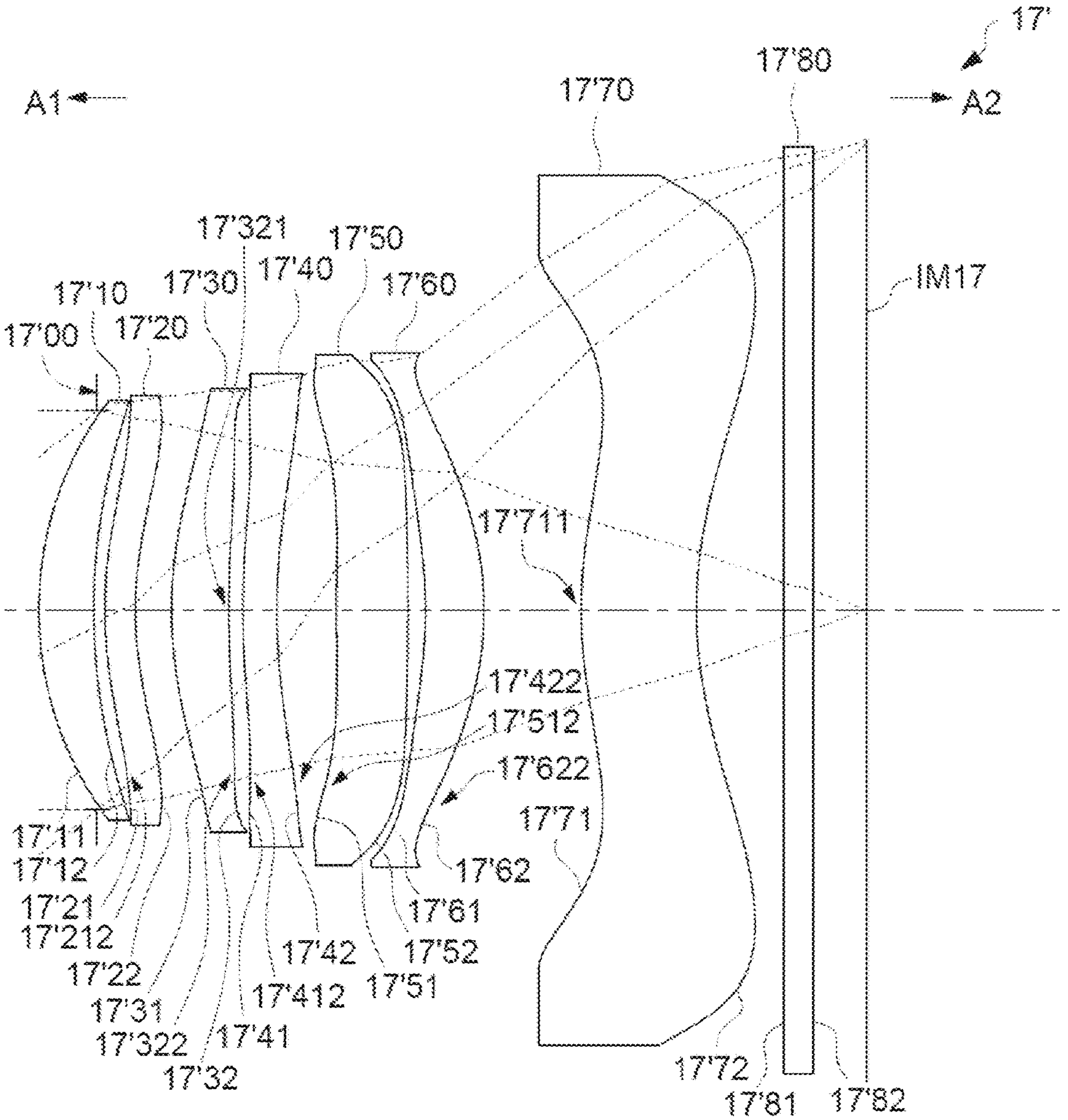
FIG. 70 depicts a cross-sectional view of a seventeenth embodiment of an optical imaging lens having seven lens elements according to the present disclosure.
Figure 71:
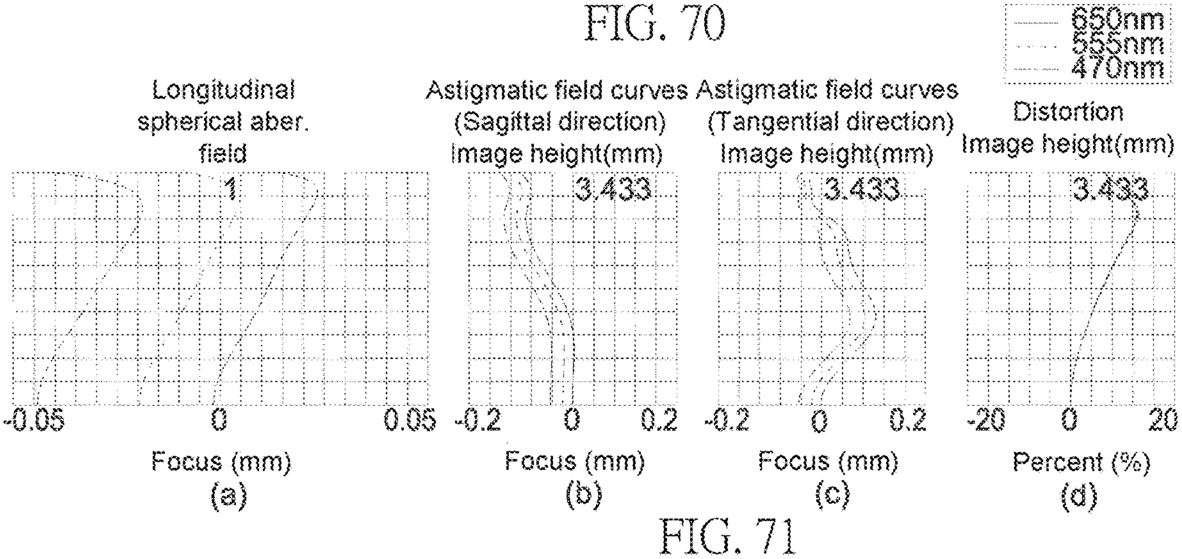
FIG. 71 depicts a chart of longitudinal spherical aberration and other kinds of optical aberrations of a seventeenth embodiment of the optical imaging lens according to the present disclosure.

Reference is now made to FIGS. 70-73. FIG. 70 illustrates an example cross-sectional view of an optical imaging lens 17' having seven lens elements according to an seventeenth example embodiment. FIG. 71 shows example charts of longitudinal spherical aberration and other kinds of optical aberrations of the optical imaging lens 17' according to the seventeenth embodiment. FIG. 72 shows an example table of optical data of each lens element of the optical imaging lens 17' according to the seventeenth example embodiment. FIG. 73 shows an example table of aspherical data of the optical imaging lens 17' according to the seventeenth example embodiment. The reference numbers labeled in the present embodiment are similar to those in the thirteenth embodiment for the similar elements, but here the reference numbers are initialed with 17'; for example, reference number 17'31 may label the object-side surface of the third lens element 17'30, reference number 17'32 may label the image-side surface of the third lens element 17'30, etc.

As shown in FIG. 70, the optical imaging lens 17' of the present embodiment, in an order from an object side A1 to an image side A2 along an optical axis, may comprise an aperture stop 17'00, a first lens element 17'10, a second lens element 17'20, a third lens element 17'30, a fourth lens element 17'40, a fifth lens element 17'50, a sixth lens element 17'60 and a seventh lens element 17'70.

The arrangements of the convex or concave surface structures, including the object-side surfaces 17'11, 17'31, 17'61 and the image-side surfaces 17'12, 17'22, 17'52, 17'72, may be generally similar to the optical imaging lens 13', but the differences between the optical imaging lens 13' and the optical imaging lens 17' may include the convex or concave surface structures of the object-side surfaces 17'41, 17'51, 17'71 and the image-side surfaces 17'32, 17'42, 17'62. Additional differences may a radius of curvature, a thickness, refracting power, aspherical data, and an effective focal length of each lens element. More specially, the first lens element 17'10 have positive refracting power, the seventh lens element 17'70 have positive refracting power, the object-side surface 17'21 of the second lens element 17'20 may comprise a convex portion 17'212 in a vicinity of a periphery of the second lens element 17'20, the image-side surface 17'32 of the third lens element 17'30 may comprise a concave portion 17'321 in a vicinity of the optical axis and a concave portion 17'322 in a vicinity of a periphery of the third lens element 17'30, the object-side surface 17'41 of the fourth lens element 17'40 may comprise a convex portion 17'412 in a vicinity of a periphery of the forth lens element 17'40, the image-side surface 17'42 of the fourth lens element 17'40 may comprise a concave portion 17'422 in a vicinity of a periphery of the fourth lens element 17'40, the object-side surface 17'51 of the fifth lens element 17'50 may comprise a convex portion 17'512 in a vicinity of a periphery of the fifth lens element 17'50, the image-side surface 17'62 of the sixth lens element 17'60 may comprise a concave portion 17'622 in a vicinity of a periphery of the sixth lens element 17'60, the object-side surface 17'71 of the seventh lens element 17'70 may comprise a convex portion 17'711 in a vicinity of the optical axis.

Here, in the interest of clearly showing the drawings of a particular embodiment, only the surface shapes which are different from that in the thirteenth embodiment may be labeled. Please refer to FIG. 72 for the optical characteristics of each lens elements in the optical imaging lens 17' of the present embodiment.

From the vertical deviation of each curve shown in FIG. 71(*a*), the offset of the off-axis light relative to the image point may be within about ±0.05 mm. Referring to FIG. 71(*b*), the focus variation with respect to the three different wavelengths (470 nm, 555 nm, 650 nm) in the whole field may fall within about ±0.16 mm. Referring to FIG. 71(*c*), the focus variation with respect to the three different wavelengths (470 nm, 555 nm, 650 nm) in the whole field may fall within about ±0.12 mm. Referring to FIG. 71(*d*), the variation of the distortion aberration of the optical imaging lens 17' may be within about ±15%.

The values of EFL、T1、G12、T2、G23、T3、G34、T4、G45、T5、G56、T6、G67、T7、G7F、TF、GFP、BFL、ALT、AAG、TL、TTL、EFL/ALT、EFL/ImgH、TTL/ImgH、TL/ImgH、TL/AAG、(T1+T4+T7)/T2、(T1+T4+T7)/T5、(G23+T4+G45)/(G12+T2)、(G23+T4+G45)/(G34+T4)、(G23+G45+T5+G56)/T1、(G23+G45+T5+G56)/T7、(T1+T2+T3+T4+T5)/T6、(T1+T2+T4+T5+T6)/T3、(G12+G23+G34+BFL)/T2、(G12+G23+G34+BFL)/T5、ALT/G67、(AAG+BFL)/G67、ALT*Fno/(T3+G34)、ALT*Fno/(G12+T6) of this embodiment may be referred to FIG. 78B.

In comparison with the thirteenth embodiment, this embodiment may have a smaller value of TTL, longitudinal spherical aberration and astigmatism aberration.

Figure 74:
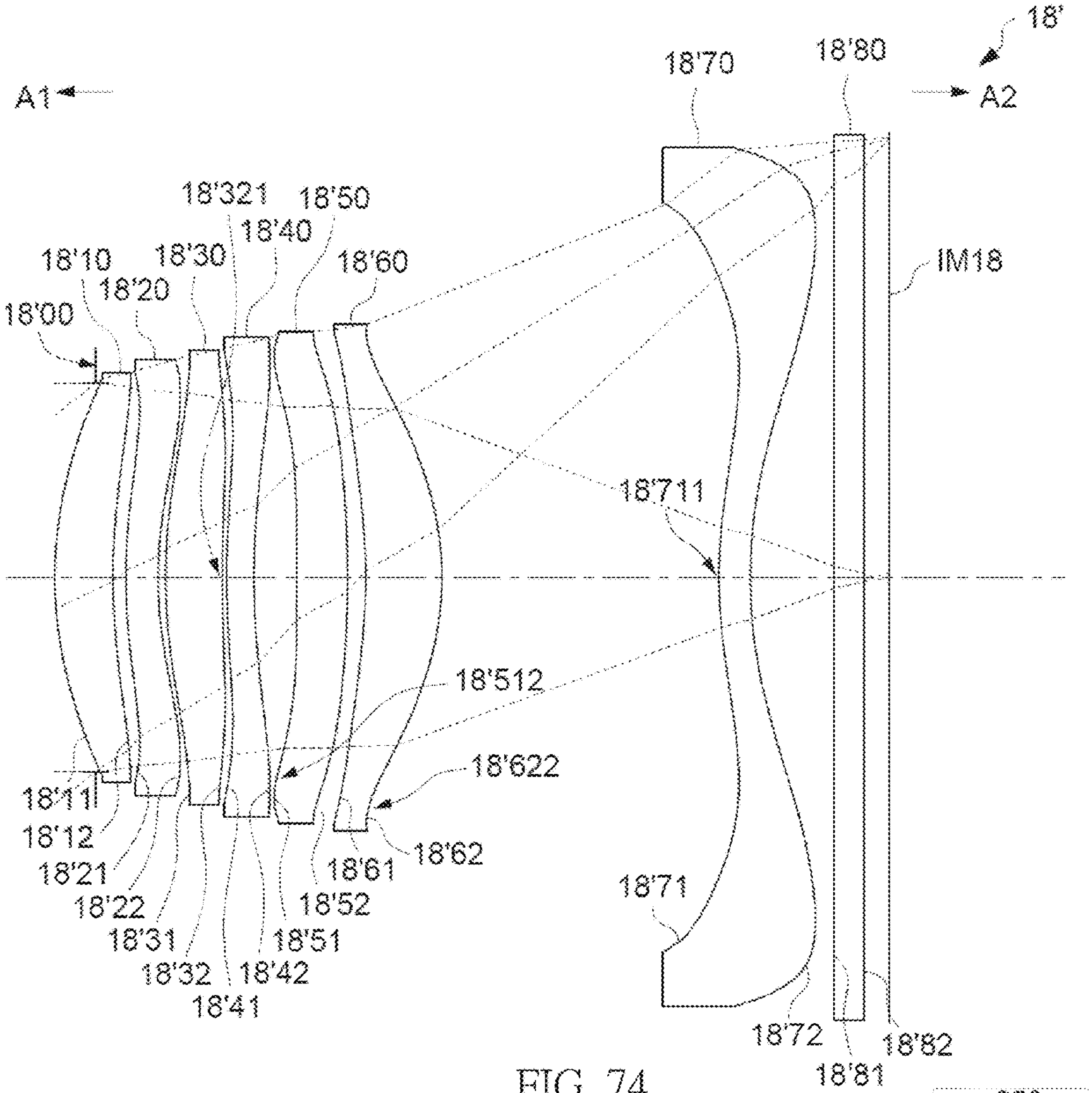
FIG. 74 depicts a cross-sectional view of a eighteenth embodiment of an optical imaging lens having seven lens elements according to the present disclosure.
Figure 75:
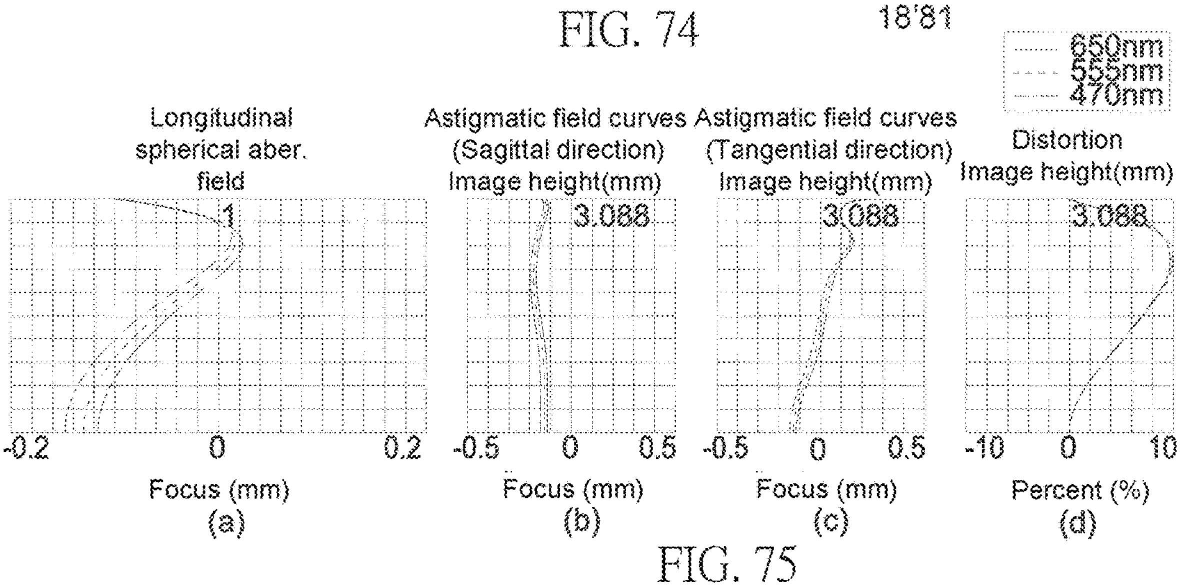
FIG. 75 depicts a chart of longitudinal spherical aberration and other kinds of optical aberrations of a eighteenth embodiment of the optical imaging lens according to the present disclosure.

Reference is now made to FIGS. 74-77. FIG. 74 illustrates an example cross-sectional view of an optical imaging lens 18' having seven lens elements according to an eighteenth example embodiment. FIG. 75 shows example charts of longitudinal spherical aberration and other kinds of optical aberrations of the optical imaging lens 18' according to the eighteenth embodiment. FIG. 76 shows an example table of optical data of each lens element of the optical imaging lens 18' according to the eighteenth example embodiment. FIG. 77 shows an example table of aspherical data of the optical imaging lens 18' according to the eighteenth example embodiment. The reference numbers labeled in the present embodiment are similar to those in the thirteenth embodiment for the similar elements, but here the reference numbers are initialed with 18'; for example, reference number 18'31 may label the object-side surface of the third lens element 18'30, reference number 18'32 may label the image-side surface of the third lens element 18'30, etc.

As shown in FIG. 74, the optical imaging lens 18' of the present embodiment, in an order from an object side A1 to an image side A2 along an optical axis, may comprise an aperture stop 18'00, a first lens element 18'10, a second lens element 18'20, a third lens element 18'30, a fourth lens element 18'40, a fifth lens element 18'50, a sixth lens element 18'60 and a seventh lens element 18'70.

The arrangements of the convex or concave surface structures, including the object-side surfaces 18'11, 18'21, 18'31, 18'41, 18'61 and the image-side surfaces 18'12, 18'22, 18'42, 18'52, 18'72 may be generally similar to the optical imaging lens 13', but the differences between the optical imaging lens 13' and the optical imaging lens 18' may include the convex or concave surface structures of the object-side surfaces 18'51, 18'71 and the image-side surfaces 18'32, 18'62. Additional differences may a radius of curvature, a thickness, refracting power, aspherical data, and an effective focal length of each lens element. More specially, the first lens element 18'10 have positive refracting power, the seventh lens element 18'70 have positive refracting power, the image-side surface 18'32 of the third lens element 18'30 may comprise a concave portion 17'312 in a vicinity of a periphery of the third lens element 18'30, the object-side surface 18'51 of the fifth lens element 18'50 may comprise a convex portion 18'512 in a vicinity of a periphery of the fifth lens element 18'50, the image-side surface 18'62 of the sixth lens element 18'60 may comprise a concave portion 18'622 in a vicinity of a periphery of the sixth lens element 18'60, the object-side surface 18'71 of the seventh lens element 18'70 may comprise a convex portion 18'711 in a vicinity of the optical axis.

Here, in the interest of clearly showing the drawings of a particular embodiment, only the surface shapes which are different from that in the thirteenth embodiment may be labeled. Please refer to FIG. 76 for the optical characteristics of each lens elements in the optical imaging lens 18' of the present embodiment.

From the vertical deviation of each curve shown in FIG. 75(*a*), the offset of the off-axis light relative to the image point may be within about ±0.16 mm. Referring to FIG. 75(*b*), the focus variation with respect to the three different wavelengths (470 nm, 555 nm, 650 nm) in the whole field may fall within about ±0.2 mm. Referring to FIG. 75(*c*), the focus variation with respect to the three different wavelengths (470 nm, 555 nm, 650 nm) in the whole field may fall within about ±0.25 mm. Referring to FIG. 75(*d*), the variation of the distortion aberration of the optical imaging lens 18' may be within about ±10%.

The values of EFL、T1、G12、T2、G23、T3、G34、T4、G45、T5、G56、T6、G67、T7、G7F、TF、GFP、BFL、ALT、AAG、TL、TTL、EFL/ALT、EFL/ImgH、TTL/ImgH、TL/ImgH、TL/AAG、(T1+T4+T7)/T2、(T1+T4+T7)/T5、(G23+T4+G45)/(G12+T2)、(G23+T4+G45)/(G34+T4)、(G23+G45+T5+G56)/T1、(G23+G45+T5+G56)/T7、(T1+T2+T3+T4+T5)/T6、(T1+T2+T4+T5+T6)/T3、(G12+G23+G34+BFL)/T2、(G12+G23+G34+BFL)/T5、ALT/G67、(AAG+BFL)/G67、ALT*Fno/(T3+G34)、ALT*Fno/(G12+T6) of this embodiment may be referred to FIG. 78B.

In comparison with the thirteenth embodiment, this embodiment may have a smaller value of TTL, longitudinal spherical aberration and astigmatism aberration.

The values of EFL、T1、G12、T2、G23、T3、G34、T4、G45、T5、G56、T6、G67、T7、G7F、TF、GFP、BFL、ALT、AAG、TL、TTL、EFL/ALT、EFL/ImgH、TTL/ImgH、TL/ImgH、TL/AAG、(T1+T4+T7)/T2、(T1+T4+T7)/T5、(G23+T4+G45)/(G12+T2)、(G23+T4+G45)/(G34+T4)、(G23+G45+T5+G56)/T1、(G23+G45+T5+G56)/T7、(T1+T2+T3+T4+T5)/T6、(T1+T2+T4+T5+T6)/T3、(G12+G23+G34+BFL)/T2、(G12+G23+G34+BFL)/T5、ALT/G67、(AAG+BFL)/G67、ALT*Fno/(T3+G34)、ALT*Fno/(G12+T6) of all embodiment may be referred to in FIGS. 78A and 78B, and it is clear that the optical imaging lens of any one of the ten embodiments may satisfy the Inequalities (1) to (18).

Combinations of the optical parameters disclosed in the various embodiments of the present disclosure may be represented ranges of values defined by minimum and maximum values of each term. As such, values within the ranges of maximum and/or minimum values of each term may be contemplated and/or otherwise utilized herein.

The first lens element having positive or negative refracting power and cooperating with the arrangements of the convex or concave surface structures described below may advantageously decrease the value of Fno: the second lens element having negative refracting power and the image-side surface of the second lens element comprising a convex portion in a vicinity of a periphery of the second lens element may advantageously increase the half field of view; the third lens element having positive refracting power may advantageously correct aberrations caused by the second lens element; the image-side surface of the fourth lens element comprising a concave portion in a vicinity of the optical axis and cooperating with the object-side surface of the fifth lens element comprising a convex portion in a vicinity of the optical axis may advantageously adjust aberrations caused by the first to the fifth lens elements; the image-side surface of the sixth lens element comprising a convex portion in a vicinity of the optical axis may advantageously shorten the length of the optical imaging lens; the image-side surface of the seventh lens element comprising a concave portion in a vicinity of the optical axis may advantageously correct aberrations caused by the sixth lens element; and the image-side surface of the seventh lens element comprising a convex portion in a vicinity of a periphery of the seventh lens element may advantageously adjust longitudinal spherical aberrations and longitudinal chromatic aberrations.

When the optical imaging lens satisfies the inequality: V5>V2+V4 or V6>V2+V4, may advantageously correct aberrations.

When the value of any one of optical parameters is too big, it may not be advantageous to revise the aberration of the optical imaging lens. When the value of any one of optical parameters is too small, it may be difficult to manufacture the optical imaging lens. For maintaining appropriate values of the focal length and other optical parameters, the optical imaging lens may satisfy any one of inequalities as follows:

$EFL/ALT \leq 1.7$, and $0.860 \leq EFL/ALT \leq 1.700$ is a more advantage range;

$EFL/ImgH \leq 1.8$, and $0.950 \leq EFL/ImgH \leq 1.800$ is a more advantage range.

When the value of any one of optical parameters is too big, it may not be advantageous to decrease the volume of the optical imaging lens. When the value of any one of optical parameters is too small, it may be difficult to manufacture the optical imaging lens. For maintaining appropriate values of the thickness of each lens element and the gap, the optical imaging lens may satisfy any one of inequalities as follows:

$TTL/ImgH \leq 2.300$, and $1.250 \leq TTL/ImgH \leq 2.300$ is a more advantage range;

$TL/AAG \leq 2.800$, and $1.000 \leq TL/AAG \leq 2.800$ is a more advantage range;

$(T1+T4+T7)/T2 \leq 6.800$, and $2.500 \leq (T1+T4+T7)/T2 \leq 6.800$ is a more advantage range;

$(T1+T4+T7)/T5 \leq 4.800$, and $1.400 \leq (T1+T4+T7)/T5 \leq 4.800$ is a more advantage range;

$(G23+T4+G45)/(G12+T2) \leq 3.600$, and $0.600 \leq (G23+T4+G45)/(G12+T2) \leq 3.600$ is a more advantage range;

$(G23+T4+G45)/(G34+T4)\leq 2.700$, and $0.840\leq(G23+T4+G45)/(G34+T4)\leq 2.700$ is a more advantage range;

$(G23+G45+T5+G56)/T1\leq 5.700$, and $0.800\leq(G23+G45+T5+G56)/T1\leq 5.700$ is a more advantage range;

$(G23+G45+T5+G56)/T7\leq 6.000$, and $1.600\leq(G23+G45+T5+G56)/T7\leq 6.000$ is a more advantage range;

$(T1+T2+T3+T4+T5)/T6\leq 4.400$, and $1.6\leq(T1+T2+T3+T4+T5)/T6\leq 4.400$ is a more advantage range;

$(T1+T2+T4+T5+T6)/T3\leq 4.400$, and $1.800\leq(T1+T2+T4+T5+T6)/T3\leq 4.400$ is a more advantage range;

$(G12+G23+G34+BFL)/T2\leq 7.500$, and $2.900\leq(G12+G23+G34+BFL)/T2\leq 7.500$ is a more advantage range;

$(G12+G23+G34+BFL)/T5\leq 5.000$, and $1.600\leq(G12+G23+G34+BFL)/T5\leq 5.000$ is a more advantage range;

$ALT/G67\leq 5.600$, and $1.200\leq ALT/G67\leq 5.600$ is a more advantage range; and $(AAG+BFL)/G67\leq 4.200$, and $1.100\leq(AAG+BFL)/G67\leq 4.200$ is a more advantage range.

When the value of any one of optical parameters is too big, it may not be advantageous to decrease the value of Fno. When the value of any one of optical parameters is too small, it may be difficult to manufacture the optical imaging lens. For maintaining appropriate values of Fno and other optical parameters, the optical imaging lens may satisfy any one of inequalities as follows:

$ALT*Fno/(T3+G34)\leq 8.800$, and $4.000\leq ALT*Fno/(T3+G34)\leq 8.800$ is a more advantage range; and $ALT*Fno/(G12+T6)\leq 8.500$, and $4.000\leq ALT*Fno/(G12+T6)\leq 8.500$ is a more advantage range.

Moreover, the optical parameters according to one embodiment could be selectively incorporated in other embodiments to limit and enhance the structure of the optical lens assembly.

In consideration of the non-predictability of the optical lens assembly, while the optical lens assembly may satisfy any one of inequalities described above, the optical lens assembly herein perfectly may achieve a shorten length, provide an enlarged aperture stop, increase an imaging quality and/or assembly yield, and/or effectively improve drawbacks of a typical optical lens assembly.

Any one of the aforementioned inequalities may be selectively incorporated in other inequalities to apply to the present embodiments, and as such are not limiting. Embodiments according to the present disclosure are not limiting and may be selectively incorporated in other embodiments described herein. In some embodiments, more details about the parameters may be incorporated to enhance the control for the system performance and/or resolution. For example, the object-side surface of the first lens element may comprise a convex portion in a vicinity of the optical axis. It is noted that the details listed here may be incorporated into example embodiments if no inconsistency occurs.

While various embodiments in accordance with the disclosed principles been described above, it should be understood that they are presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. § 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens comprising a first lens element, a second lens element, a third lens element, a fourth lens element, a fifth lens element, a sixth lens element, an eighth lens element, and a seventh lens element sequentially from an object side to an image side along an optical axis, the first lens element being arranged to be a lens element in a first order from the object side to the image side, the second lens element being arranged to be a lens element in a second order from the object side to the image side, the third lens element being arranged to be a lens element in a third order from the object side to the image side, the fourth lens element being arranged to be a lens element in a fourth order from the object side to the image side, the fifth lens element being arranged to be a lens element in a fifth order from the object side to the image side, the sixth lens element being arranged to be a lens element in a sixth order from the object side to the image side, the seventh lens element being arranged to be a lens element in a last order from the object side to the image side, the eighth lens element is located between the sixth lens element and the seventh lens element, the first lens element to the seventh lens element each comprising an object-side surface facing toward the object side and allowing imaging rays to pass through and an image-side surface facing toward the image side and allowing the imaging rays to pass through, and lens elements of this optical imaging lens are only the first to eighth lens elements, wherein:

the image-side surface of the second lens element comprises a concave portion in a vicinity of the optical axis;

the fourth lens element has negative refracting power, and the object-side surface of the fourth lens element comprises a concave portion in a vicinity of a periphery of the fourth lens element;

the object-side surface of the fifth lens element comprises a convex portion in a vicinity of the optical axis;

the eighth lens element has positive refracting power, the object-side surface of the eighth lens element comprises a concave portion in a vicinity of a periphery of the eighth lens element, and the image-side surface of the eighth lens element comprises a convex portion in a vicinity of the periphery of the eighth lens element; and the image-side surface of the seventh lens element comprises a concave portion in a vicinity of the optical axis.

2. The optical imaging lens according to claim 1, wherein a distance between the second lens element and the third lens element along the optical axis is represented by G23, a distance between the fourth lens element and the fifth lens element along the optical axis is represented by G45, a thickness of the fifth lens element along the optical axis is represented by T5, a distance between the fifth lens element and the sixth lens element along the optical axis is represented by G56, a thickness of the seventh lens element along the optical axis is represented by T7, and the optical imaging lens further satisfies an inequality: $(G23+G45+T5+G56)/T7 \leq 6.000$.

3. The optical imaging lens according to claim 1, wherein a distance from the object-side surface of the first lens element to the image-side surface of the seventh lens element along the optical axis is represented by TL, a sum of a distance between the first lens element and the second lens element along the optical axis, a distance between the second lens element and the third lens element along the optical axis, a distance between the third lens element and the fourth lens element along the optical axis, a distance between the fourth lens element and the fifth lens element along the optical axis, a distance between the fifth lens element and the sixth lens element along the optical axis, and a distance between the sixth lens element and the seventh lens element along the optical axis is represented by AAG, and the optical imaging lens further satisfies an inequality: $TL/AAG \leq 2.800$.

4. The optical imaging lens according to claim 1, wherein a distance between the second lens element and the third lens element along the optical axis is represented by G23, a thickness of the fourth lens element along the optical axis is represented by T4, a distance between the fourth lens element and the fifth lens element along the optical axis is represented by G45, a distance between the first lens element and the second lens element along the optical axis is represented by G12, a thickness of the second lens element along the optical axis is represented by T2, and the optical imaging lens further satisfies an inequality: $(G23+T4+G45)/(G12+T2) \leq 3.600$.

5. The optical imaging lens according to claim 1, wherein a sum of a thicknesses of the first lens element, the second element, the third element, the fourth element, the fifth element, the sixth element, and the seventh lens element along the optical axis is represented by ALT, a distance between the sixth lens element and the seventh lens element along the optical axis is represented by G67, and the optical imaging lens further satisfies an inequality: $ALT/G67 \leq 5.600$.

6. The optical imaging lens according to claim 1, wherein a distance between the second lens element and the third lens element along the optical axis is represented by G23, a distance between the fourth lens element and the fifth lens element along the optical axis is represented by G45, a thickness of the fifth lens element along the optical axis is represented by T5, a distance between the fifth lens element and the sixth lens element along the optical axis is represented by G56, a thickness of the first lens element along the optical axis is represented by T1, and the optical imaging lens further satisfies an inequality: $(G23+G45+T5+G56)/T1 \leq 5.700$.

7. The optical imaging lens according to claim 1, wherein a distance between the second lens element and the third lens element along the optical axis is represented by G23, a thickness of the fourth lens element along the optical axis is represented by T4, a distance between the fourth lens element and the fifth lens element along the optical axis is represented by G45, a distance between the third lens element and the fourth lens element along the optical axis is represented by G34, a thickness of the fourth lens element along the optical axis is represented by T4, and the optical imaging lens further satisfies an inequality: $(G23+T4+G45)/(G34+T4) \leq 2.700$.

8. An optical imaging lens comprising a first lens element, a second lens element, a third lens element, a fourth lens element, a fifth lens element, a sixth lens element, an eighth lens element, and a seventh lens element sequentially from an object side to an image side along an optical axis, the first lens element being arranged to be a lens element in a first order from the object side to the image side, the second lens element being arranged to be a lens element in a second order from the object side to the image side, the third lens element being arranged to be a lens element in a third order from the object side to the image side, the fourth lens element being arranged to be a lens element in a fourth order from the object side to the image side, the fifth lens element being arranged to be a lens element in a fifth order from the object side to the image side, the sixth lens element being arranged to be a lens element in a sixth order from the object side to the image side, the seventh lens element being arranged to be a lens element in a last order from the object side to the image side, the eighth lens element is located between the sixth lens element and the seventh lens element, the first lens element to the seventh lens element each comprising an object-side surface facing toward the object side and allowing imaging rays to pass through and an image-side surface facing toward the image side and allowing the imaging rays to pass through, and lens elements of this optical imaging lens are only the first to eighth lens elements, wherein:

the object-side surface of the second lens element comprises a convex portion in a vicinity of the optical axis;

the image-side surface of the third lens element comprises a convex portion in a vicinity of a periphery of the third lens element;

the object-side surface of the fourth lens element comprises a convex portion in a vicinity of the optical axis, and the image-side surface of the fourth lens element comprises a concave portion in a vicinity of the optical axis;

the image-side surface of the sixth lens element comprises a convex portion in a vicinity of the optical axis; and the eighth lens element has positive refracting power.

9. The optical imaging lens according to claim 8, wherein a thickness of the first lens element along the optical axis is represented by T1, a thickness of the second lens element along the optical axis is represented by T2, a thickness of the fourth lens element along the optical axis is represented by T4, a thickness of the seventh lens element along the optical axis is represented by T7, and the optical imaging lens further satisfies an inequality: $(T1+T4+T7)/T2 \leq 6.800$.

10. The optical imaging lens according to claim 8, wherein a distance between the first lens element and the second lens element along the optical axis is represented by G12, a distance between the second lens element and the third lens element along the optical axis is represented by G23, a distance between the third lens element and the fourth lens element along the optical axis is represented by G34, a distance from the image-side surface of the seventh lens element to an image plane along the optical axis is represented by BFL, a thickness of the second lens element along the optical axis is represented by T2, and the optical imaging lens further satisfies an inequality: (G12+G23+G34+BFL)/T2≤7.500.

11. The optical imaging lens according to claim 8, wherein a sum of a distance between the first lens element and the second lens element along the optical axis, a distance between the second lens element and the third lens element along the optical axis, a distance between the third lens element and the fourth lens element along the optical axis, a distance between the fourth lens element and the fifth lens element along the optical axis, a distance between the fifth lens element and the sixth lens element along the optical axis, and a distance between the sixth lens element and the seventh lens element along the optical axis is represented by AAG, a distance from the image-side surface of the seventh lens element to an image plane along the optical axis is represented by BFL, a distance between the sixth lens element and the seventh lens element along the optical axis is represented by G67, and the optical imaging lens further satisfies an inequality: (AAG+BFL)/G67≤4.200.

12. The optical imaging lens according to claim 8, wherein an effective focal length of the optical imaging lens is represented by EFL, an image height of the optical imaging lens is represented by ImgH, and the optical imaging lens further satisfies an inequality: EFL/ImgH≤1.800.

13. The optical imaging lens according to claim 8, wherein a thickness of the first lens element along the optical axis is represented by T1, a thickness of the fourth lens element along the optical axis is represented by T4, a thickness of the fifth lens element along the optical axis is represented by T5, a thickness of the seventh lens element along the optical axis is represented by T7, and the optical imaging lens further satisfies an inequality: (T1+T4+T7)/T5≤4.800.

14. The optical imaging lens according to claim 8, wherein an effective focal length of the optical imaging lens is represented by EFL, a sum of a thicknesses of the first lens element, the second element, the third element, the fourth element, the fifth element, the sixth element, and the seventh lens element along the optical axis is represented by ALT, and the optical imaging lens further satisfies an inequality: EFL/ALT≤1.700.

15. An optical imaging lens comprising a first lens element, a second lens element, a third lens element, a fourth lens element, a fifth lens element, a sixth lens element, an eighth lens element, and a seventh lens element sequentially from an object side to an image side along an optical axis, the first lens element being arranged to be a lens element in a first order from the object side to the image side, the second lens element being arranged to be a lens element in a second order from the object side to the image side, the third lens element being arranged to be a lens element in a third order from the object side to the image side, the fourth lens element being arranged to be a lens element in a fourth order from the object side to the image side, the fifth lens element being arranged to be a lens element in a fifth order from the object side to the image side, the sixth lens element being arranged to be a lens element in a sixth order from the object side to the image side, the seventh lens element being arranged to be a lens element in a last order from the object side to the image side, the eighth lens element is located between the sixth lens element and the seventh lens element, the first lens element to the seventh lens element each comprising an object-side surface facing toward the object side and allowing imaging rays to pass through and an image-side surface facing toward the image side and allowing the imaging rays to pass through, and lens elements of this optical imaging lens are only the first to eighth lens elements, wherein:

the object-side surface of the second lens element comprises a convex portion in a vicinity of the optical axis;

the image-side surface of the third lens element comprises a convex portion in a vicinity of a periphery of the third lens element;

the object-side surface of the fourth lens element comprises a convex portion in a vicinity of the optical axis;

the image-side surface of the sixth lens element comprises a convex portion in a vicinity of the optical axis; and the eighth lens element has positive refracting power, the object-side surface of the eighth lens element comprises a convex portion in a vicinity of the optical axis, and the object-side surface of the eighth lens element comprises a concave portion in a vicinity of a periphery of the eighth lens element.

16. The optical imaging lens according to claim 15, wherein a distance between the object-side surface of the first lens element and an image plane along the optical axis is represented by TTL, an image height of the optical imaging lens is represented by ImgH, and the optical imaging lens further satisfies an inequality: TTL/ImgH≤2.300.

17. The optical imaging lens according to claim 15, wherein a distance between the first lens element and the second lens element along the optical axis is represented by G12, a distance between the second lens element and the third lens element along the optical axis is represented by G23, a distance between the third lens element and the fourth lens element along the optical axis is represented by G34, a distance from the image-side surface of the seventh lens element to an image plane along the optical axis is represented by BFL, a thickness of the fifth lens element along the optical axis is represented by T5, and the optical imaging lens further satisfies an inequality: (G12+G23+G34+BFL)/T5≤5.000.

18. The optical imaging lens according to claim 15, wherein a sum of a thicknesses of the first lens element, the second element, the third element, the fourth element, the fifth element, the sixth element, and the seventh lens element along the optical axis is represented by ALT, a F-number of the optical imaging lens is represented by Fno, a thickness of the third lens element along the optical axis is represented by T3, an distance between the third lens element and the fourth lens element along the optical axis is represented by G34, and the optical imaging lens further satisfies an inequality: ALT*Fno/(T3+G34)≤8.800.

19. The optical imaging lens according to claim 15, wherein a sum of a thicknesses of the first lens element, the second element, the third element, the fourth element, the fifth element, the sixth element, and the seventh lens element along the optical axis is represented by ALT, a F-number of the optical imaging lens is represented by Fno, a distance between the first lens element and the second lens element along the optical axis is represented by G12, a thickness of the sixth lens element along the optical axis is represented by T6, and the optical imaging lens further satisfies an inequality: ALT*Fno/(G12+T6)≤8.500.

20. The optical imaging lens according to claim 15, wherein a thickness of the first lens element along the optical axis is represented by T1, a thickness of the second lens element along the optical axis is represented by T2, a thickness of the third lens element along the optical axis is represented by T3, a thickness of the fourth lens element along the optical axis is represented by T4, a thickness of the fifth lens element along the optical axis is represented by T5, a thickness of the sixth lens element along the optical axis is represented by T6, and the optical imaging lens further satisfies an inequality: $(T1+T2+T3+T4+T5)/T6 \leq 4.400$.

* * * * *